United States Patent
Beshai et al.

(10) Patent No.: US 8,031,598 B2
(45) Date of Patent: Oct. 4, 2011

(54) FLOW-RATE-REGULATED BURST SWITCHES

(75) Inventors: Maged E. Beshai, Stittsville (CA); Bilel N. Jamoussi, Nashua, NH (US)

(73) Assignee: Nortel Networks Limited, Mississauga, Ontario (CA)

( * ) Notice: Subject to any disclaimer, the term of this patent is extended or adjusted under 35 U.S.C. 154(b) by 23 days.

(21) Appl. No.: 12/427,106

(22) Filed: Apr. 21, 2009

(65) Prior Publication Data

US 2009/0207859 A1    Aug. 20, 2009

Related U.S. Application Data

(62) Division of application No. 10/437,628, filed on May 14, 2003, now Pat. No. 7,535,841.

(51) Int. Cl.
*H04L 12/26* (2006.01)
(52) U.S. Cl. ...................... 370/230.1; 370/232
(58) Field of Classification Search ............. 370/395.71, 370/417, 415, 428, 436, 437, 470, 472, 230.1, 370/232
See application file for complete search history.

(56) References Cited

U.S. PATENT DOCUMENTS

| | | | | |
|---|---|---|---|---|
| 5,124,861 A * | 6/1992 | Shimotashiro et al. | ......... | 360/39 |
| 5,517,495 A * | 5/1996 | Lund et al. | .................... | 370/399 |
| 6,907,002 B2 * | 6/2005 | Beshai et al. | ................. | 370/230 |
| 7,313,149 B2 * | 12/2007 | Deleam et al. | ................ | 370/429 |
| 7,369,491 B1 * | 5/2008 | Beshai et al. | ................. | 370/230 |
| 7,397,792 B1 * | 7/2008 | Beshai et al. | ................. | 370/355 |
| 7,453,391 B1 * | 11/2008 | McIntire et al. | ................ | 342/57 |
| 7,535,841 B1 * | 5/2009 | Beshai et al. | .............. | 370/230.1 |
| 7,545,309 B1 * | 6/2009 | McIntire et al. | ................ | 342/57 |
| 7,590,109 B2 * | 9/2009 | Beshai et al. | ................. | 370/360 |
| 7,612,711 B1 * | 11/2009 | McIntire et al. | ............. | 342/195 |
| 7,668,261 B2 * | 2/2010 | Paila | ............................ | 375/326 |
| 7,756,141 B1 * | 7/2010 | Beshai et al. | ................. | 370/400 |
| 7,769,105 B1 * | 8/2010 | McIntire et al. | ............. | 375/309 |
| 7,817,543 B2 * | 10/2010 | Beshai et al. | ................. | 370/230 |
| 7,889,723 B2 * | 2/2011 | Beshai et al. | ................. | 370/355 |
| 2002/0085491 A1 * | 7/2002 | Beshai et al. | ................. | 370/230 |
| 2007/0171900 A1 * | 7/2007 | Beshai et al. | ................. | 370/380 |
| 2008/0232809 A1 * | 9/2008 | Beshai et al. | ................... | 398/98 |

OTHER PUBLICATIONS

Adaptive real-time management of communication and computation resources; R West—Georgia Institute of Technology, Atlanta, GA, 2000.*
Traffic shaping system for ATM networks-supporting PC interface functions; AK Koukos, AF Evagelatos—Communications, 2001.*

* cited by examiner

*Primary Examiner* — Salman Ahmed
(74) *Attorney, Agent, or Firm* — Anderson Gorecki & Manaras LLP

(57) ABSTRACT

Burst-switching nodes using a common-memory or a time shared space switch and employing flow-rate control are disclosed. Within a switching node, data bursts are segmented into data segments of a fixed size with some segments containing information bits as well as null bits. A switching node handles data streams allocated different flow rates and, for any data stream, the internal flow rate through the switching node can be higher than the external flow rate due to null padding of segmented data. The switching node is provided with a sufficient internal capacity expansion in order to offset the effect of null padding. A controller of the switching node is provided with a flow-rate-regulation apparatus to enable scheduling the transfer of data segments across the switching node in a manner that guarantees adherence to the allocated information flow rates.

11 Claims, 32 Drawing Sheets

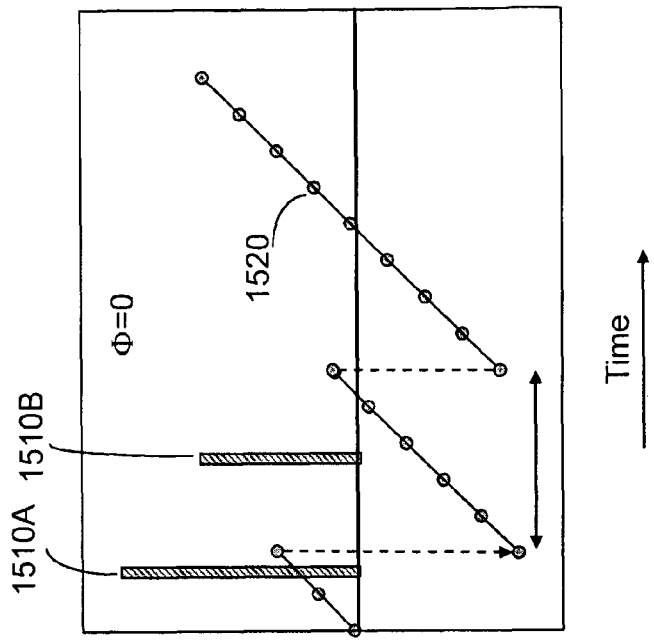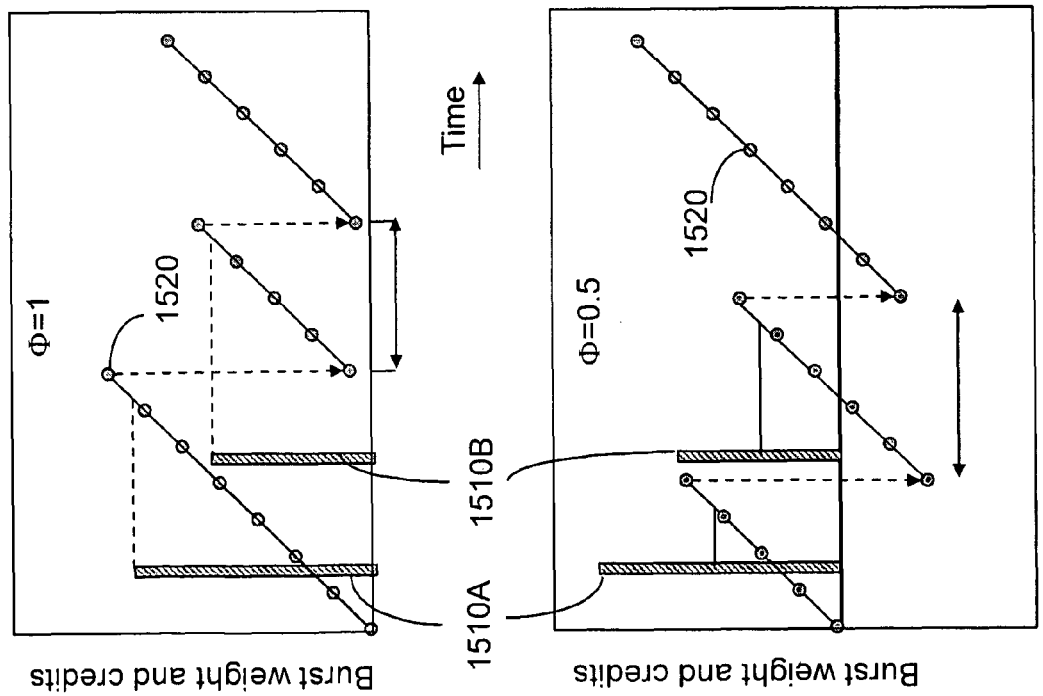
FIG. 15

FIG. 20 POPULATING A CALENDAR

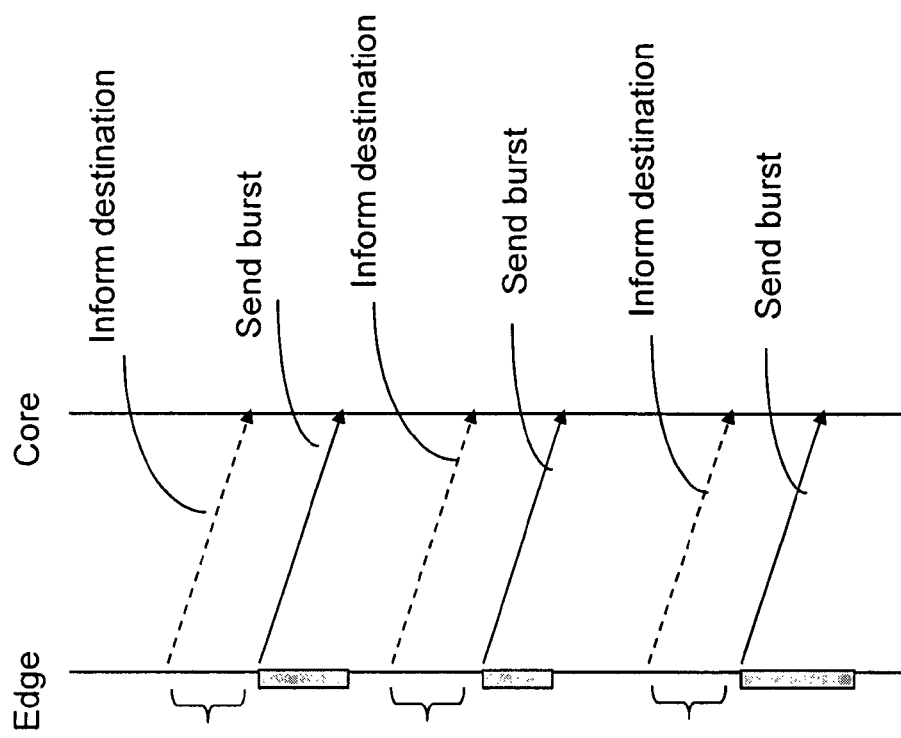
*FIG 26-B*
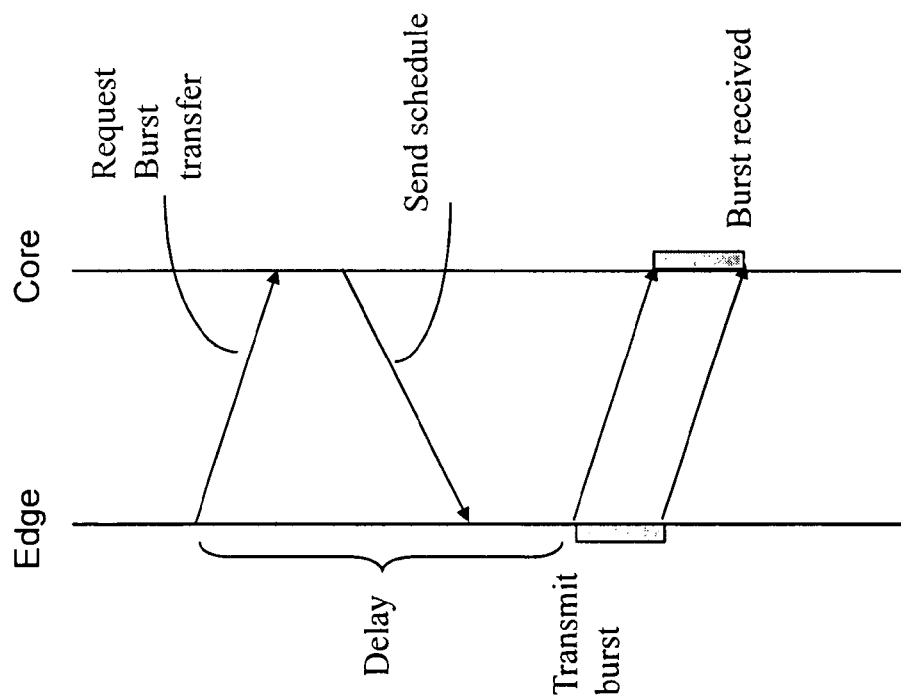
*FIG 26-A*

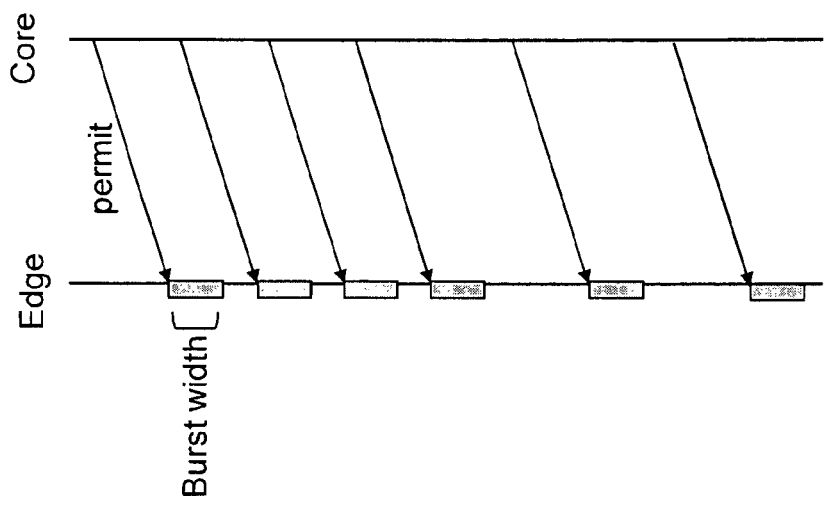
*FIG 28-B*
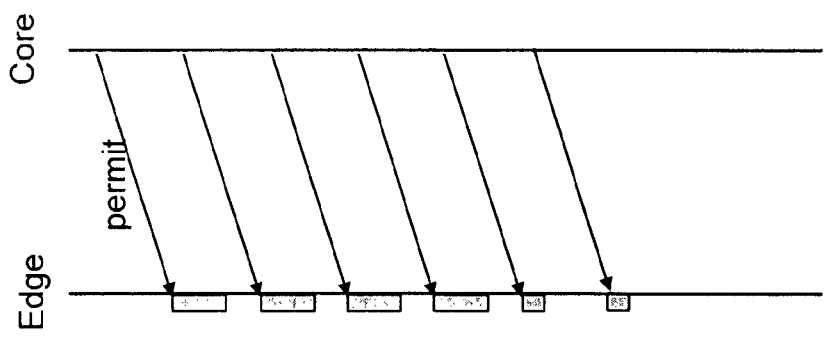
*FIG 28-A*

FLOW-RATE-REGULATED BURST SWITCHES

CROSS-REFERENCE TO RELATED APPLICATIONS

The Application is a Divisional of U.S. patent application Ser. No. 10/437,628, filed May 14, 2003, entitled FLOW-RATE-REGULATED BURST SWITCHES, which is incorporated herein by reference. Application Ser. No. 10/437,628 issued as U.S. Pat. No. 7,535,841 on May 19, 2009.

BACKGROUND TO THE INVENTION

1. Field of Invention

The present invention relates to data networks and, in particular, to a burst-switching network with rate-regulated transfer of data.

2. Description of the Related Prior Art

Since its inception in the nineteenth century, the circuit-switched telephone network provided a high-quality service where a path of fixed capacity, from a traffic source to a traffic sink, is guaranteed during a connection period. Circuit switching, however, was considered unsuitable for data communications. Unlike voice communications, data transfer tends to be sporadic, thus leading to poor utilization of a circuit-switched connection of fixed capacity. This led to the concept of packet switching where data are organized in packets of arbitrary lengths, each packet carrying in its header sufficient information to enable its routing through a packet network. With uncoordinated packet sources and unknown data rates, successful transfer of packets in a packet network cannot be guaranteed and several techniques, well known in the art, were developed to reduce the probability of packet loss en route.

In a network where a data stream traverses intermediate nodes, rate regulation need be applied only at the source node. However, each intermediate node must still forward the individual packets of the data stream. To reduce the packet-forwarding effort, it is beneficial to aggregate the packets of a data stream into data bursts, each data burst comprising a relatively large number of packets; 160 for example. A major justification for packet aggregation is the currently available high-capacity optical channels. A packet of 150 bytes transferred over a channel of 150 Mb/s capacity has a duration of 8 microseconds. A packet of 10,000 bytes has the same duration of 8 microseconds on a 10 Gb/s channel. While aggregation is desirable in a network employing electronic core nodes, it is necessary in a network employing optical core nodes. The switching latency of a fast optical switch is likely to be of the order of 100 nanoseconds while a packet of 150 bytes has a duration of only 120 nanoseconds in a 10 Gb/s channel. Thus, if individual packets are switched in an optical core node, a significant proportion of channel capacity and switch capacity would be wasted. In addition, because optical switches are currently bufferless, the transmission of data packets at the edge nodes must be precisely timed to arrive at an optical switch at pre-calculated instants of time and the use of aggregated packets, i.e., data bursts, would significantly reduce the time-coordination effort.

Providing reliable services in a data network requires end-to-end paths of controllable capacity allocation (flow-rate allocation). Much of the work done in this area focused on the transfer of data blocks of fixed size, as in Asynchronous-transfer mode (ATM) communications where several devices were developed to regulate the transfer of ATM cells. There is a need, however, for a device to realize flow-rate regulation in a network transferring variable size packets or data bursts where each burst may comprise several packets. Such a device must be scalable to handle a very large number of data streams of diverse flow-rate requirements and be adapted for use in an edge node or in a core node. The flow-rate allocations can be dynamic and the envisaged device must, therefore, be adapted to handle time-varying flow-rate allocations.

In U.S. patent application Ser. No. 10/054,509, filed on Nov. 13, 2001 by the present inventors and titled "Rate Regulated Burst Switching", a method and apparatus are provided for low latency loss-free burst switching. Burst-transfer schedules are initiated by controllers of bufferless core nodes and distributed to respective edge nodes. In a composite-star network having edge nodes interconnected by independent core nodes, the burst-transfer schedules are initiated by any of a plurality of bufferless core nodes and distributed to respective edge nodes. Burst formation takes place at source nodes and a burst size is determined according to an allocated flow-rate of a burst stream to which the burst belongs. An allocated flow-rate of a burst stream may be modified according to observed usage of scheduled bursts of a burst stream. A method of control-burst exchange between each of a plurality of edge nodes and each of a plurality of bufferless core nodes enables burst scheduling, time coordination, and loss-free burst switching. The method of the above patent application requires that a controller of each optical core node have a burst-description generator driven by a flow-rate regulator.

A network providing optical burst switching in the core requires flow-rate regulation at the electronic edge nodes to enable contention-free switching at subsequent core nodes. The bursts are generally of arbitrary sizes and switching at the electronic edge nodes requires burst segmentation into data segments of equal size, with a proportion of the data segments including null data. Prior-art flow-rate regulation methods do not take into account the data composition within switched data segments, thus compromising the accuracy of flow-rate control.

There is a need, therefore, for methods and apparatus for regulating the flow of a large number of streams of variable-size data packets or bursts based on flow-rate allocations that are adapted to time-varying traffic conditions. The apparatus need also be coordinated with scheduling devices in both edge nodes and core nodes. Where data packets or bursts are segmented to facilitate switching, the flow control must be based on the actual information content in the switched data segments. Such an apparatus would enable reliable burst switching with service-quality control.

SUMMARY OF THE INVENTION

The invention provides methods and apparatus for regulating the transfer of data bursts across a data network comprising electronic edge nodes, collectively referenced as the edge, interconnected by fast-switching optical core nodes, collectively referenced as the core. To facilitate switching at an electronic edge node, data bursts are organized into data segments of equal size. A data segment may include null data in addition to the information bits. The null data are removed at the output of an edge node and the information data is collated into bursts each carrying only information bits in addition to a header necessary for downstream processing. To ensure loss-free transfer of bursts from the edge to the core, burst transfer permits are generated at controllers of the optical core and sent to respective edge nodes based on flow-rate-allocation requests. Null-padding is not visible outside the edge nodes and only the information content is subject to transfer rate regulation to ensure high efficiency and high service quality.

According to an aspect of the present invention, there is provided a method of temporal switching of a succession of data bursts of variable sizes each of the data bursts containing information bits and belonging to one of a multiplicity of data streams and each of the data streams is granted an allocated flow rate. The method comprising steps of segmenting each of the data bursts into data segments, each of the data segments containing a number of the information bits not exceeding a predefined fixed segment size of W bits, complementing each of the data segments having a number of information bits less than W with null bits, recording the number of the information bits in each of the data segments, writing the resulting succession of data segments in at least one memory device, and reading, from the at least one memory device, data bursts according to the allocated flow rate granted to each data stream. The methods includes the further step of spatial switching wherein the succession of data bursts is received from at least two input channels, each of the at least two input channels having a corresponding input-channel capacity and the at least two input channels accessing the information-memory device in an arbitrary input-access order. The data bursts are read by at least two output channels, each of the at least two output channels having a corresponding output-channel capacity and accessing the information-memory in an arbitrary output-access order.

In accordance with another aspect of the present invention, there is provided a common-memory switch comprising a number M>1 of input ports, a number N≧1 of output ports, a memory device storing data segments each having a segment size of W bits, and a controller including an output bit-rate regulation device. Each of the data segments is associated with one of predefined data streams and at least one of the data segments contains a number of information bits less than the segment size W. The controller is operable to assign a nominal bit-rate to each of said plurality of predefined data streams, and the flow-rate regulation device is operable to use the number of information bits and said nominal flow rate to select at least one of said data segments for dequeueing. Additionally, at least one of the output ports is adapted to time-lock to an external switching node.

In accordance with a further aspect of the present invention, there is provided an edge node comprising a plurality of input-ports, each of said input ports including a rate regulator, a plurality of output ports each of said output ports including a burst-formation device, a space switch connecting said plurality of input ports to said plurality of output ports, and a scheduler to schedule the transfer of variable length packets from said plurality of input ports to said plurality of output ports. Each of said variable length packets belongs to one of a plurality of data streams. The variable-length packets associated with a selected one of said data streams are aggregated at each output port into data bursts and each of said output ports is adapted to transmit continuous concatenated data bursts. Additionally, at least one of the output ports is adapted to time-lock to an external switching node.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate example embodiments of this invention:

FIG. 15 illustrates the process of regulating the dequeueing of data bursts from a data-burst buffer to conform to an allocated flow rate in accordance with an embodiment of the present invention;

FIG. 26-A illustrates a prior art method of burst scheduling based on path reservation for each individual burst;

FIG. 26-B illustrates a prior art method of burst scheduling based on prior notification instead of path reservation;

FIG. 28-A illustrates the use of burst-width modulation to represent flow-rate variation, according to an embodiment of the present invention;

FIG. 28-B illustrates the use of burst-position modulation to represent flow-rate variation, according to an embodiment of the present invention;

DETAILED DESCRIPTION OF THE INVENTION

Figure 1:
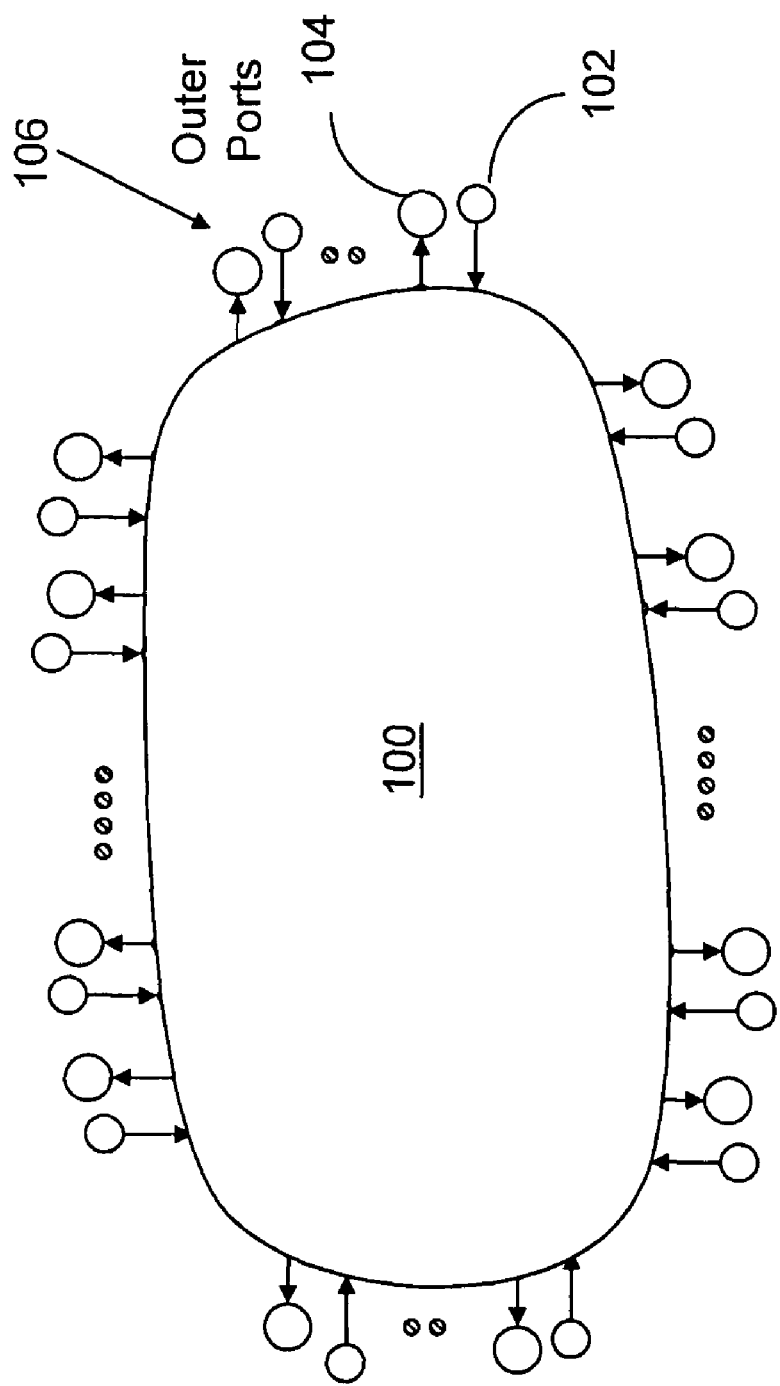
FIG. 1 illustrates the input and output ports of a telecommunication network.

For ease of reference, the terminology used in describing the embodiments of the invention is listed below.

Edge node: A switching node having subtending information sources and sinks and connecting to other nodes is called an edge node.

Core node: A switching node connecting only to other nodes is called a core node.

Outer port: A port receiving signals from a source, or transmitting signals to, a sink is called an outer port.

Inner port: A port receiving signals from, or transmitting signals to, another node is called an inner port.

Input port: A port of a switching node receiving information signals from either a subtending information source or from an external node is called an input port.

Output port: A port of a switching node transmitting information signals to either a subtending information sink or an external node is called an output port.

Ingress port: An input port receiving information signals from subtending information sources is referenced as an ingress port.

Egress port: An output port transmitting information signals to subtending information sinks is referenced as an egress port.

Inbound port: An input port receiving information signals from external nodes is referenced as an inbound port.

Outbound port: An output port transmitting information signals to external nodes is referenced as an outbound port.

Inbound channel: An inbound channel is a communication channel, usually a wavelength channel in a fiber-optic link, connecting an inbound port to an external node.

Outbound channel: An outbound channel is a communication channel, usually a wavelength channel in a fiber-optic link, connecting an outbound port to an external node.

Inlet port: An input port of a core node is herein called an inlet port for ease of distinction.

Outlet port: An output port of a core node is herein called an outlet port for ease of distinction.

Uplink: An uplink is a communication link, usually a multiple-channel link, from an edge node to a core node.

Downlink: A downlink is a communication link, usually a multiple-channel link, from a core node to an edge node Up-channel: An up-channel is a channel, usually a wavelength channel, within an uplink.

Down-channel: A down-channel is a channel, usually a wavelength channel, within a downlink Upstream: The adjective 'upstream' refers to a flow in the direction from an edge node to a core node.

Downstream: The adjective 'downstream' refers to a flow in the direction from a core node to an edge node.

Outer capacity: The outer capacity of a node or a network is the sum of the capacities of ingress ports or the sum of the capacities of egress ports, whichever is smaller.

Inner capacity: The inner capacity of a node is the sum of the capacities of its inner input ports or the sum of the capacities of its outer output ports, whichever is smaller. The inner capacity of a network is the sum of the capacities of the network's inner ports, divided by two. The network's inner ports comprise input ports and output ports, and the sum of the capacities of the input inner ports is equal to the sum of the capacities of the inner output ports, hence the division by two.

Data packet: It is a conventional data block of arbitrary size and having an identifying header.

Data burst: A data burst is an aggregation of data packets having a burst header in addition to the individual packet headers; a data burst may contain only one packet of a large size, in which case only the burst header is required.

Burst-transfer duration: The time required to transfer a data burst along a transmission medium.

Burst weight: Either the number of bits in a burst or the time it takes to transmit the burst over a designated channel defines a 'burst weight'.

Nominal burst size: It is a recommended maximum size of a burst belonging to a given data stream. The actual size of the aggregate of packets constituting the burst may be smaller than the nominal size.

Nominal burst weight: Either a recommended maximum size or a recommended maximum burst transmission duration defines a nominal burst weight.

Data stream: A data stream is a flow of data units having the same destination edge node and, possibly, assigned to the same route towards the destination node.

Packet stream: A packet stream is a data stream where the data units are data packets generally of variable and arbitrary sizes.

Burst stream: A burst stream is a data stream in which data units are aggregated into data bursts. Where distinction is not required, the terms 'data stream', 'packet stream', and 'burst stream' may be used interchangeably.

Segmentation: The process of dividing a data packet or burst into data segments of equal size.

Segmentation waste: It is the proportion of null bits in a segmented packet stream or burst stream, resulting from segmenting packets or bursts of arbitrary sizes.

Internal blocking: The unavailability of a path between an input port and an output port, where both ports have sufficient free capacity for a requested connection, is called internal blocking. Internal blocking is normally a result of contention and may, therefore, be called 'contention loss' or 'matching loss'.

Flow rate: The mean rate, usually in bits per second, of a data stream of any data format.

Nominal flow rate: A flow rate allocated to a data stream and possibly modified with time.

Regulation: The term regulation refers to a process of dequeueing data from a data buffer at regular intervals. When the data buffer contains data belonging to several data streams, it may not be possible to dequeue data units of a given data stream at exactly equal intervals and the regulation process attempts to minimize the variance of successive dequeue intervals.

Scheduling: The term scheduling refers to a process of determining the exact time at which a data unit may be transmitted from a data buffer to meet contention requirements in a subsequent processing stage. In the burst scheduling methods in accordance with the present invention, a regulation process may precede a scheduling process.

Calendar: an array having a predefined number of records, each record corresponding to a time slot and containing an identifier of a data stream and possibly other information related to the data stream.

Calendar slot: an entry in a calendar containing a single record

Calendar record: An entry in a calendar corresponding to a data segment or a data block. The record may include the data segment (data block) itself, or a pointer to the data segment (data block) held in a separate data memory.

Calendar time slot: time taken to read and process a record in a calendar

Calendar period: It is the time taken to read and process each entry in a calendar, the calendar period equals the number of calendar slots multiplied by the duration of a calendar time slot.

Counter: The term is used herein to refer to a clock-driven counter, which can be an up-counter or a down-counter. The counter output takes values between zero and $(K-1)$, $K>1$ being the counter cycle.

Common-memory: It is a memory device shared by at least two input channels and at least one output channel; a common-memory is usually selected to be a wide memory comprising several memory devices that are identically addressed Common-memory cycle: It is a sequence of events where each input channel and each output channel accesses the common memory during a predefined time frame, with each input channel allocated an access interval and each output channel allocated an access interval within the predefined time frame, thus avoiding access contention. The access intervals allocated to the input channels need not be equal and the access intervals allocated to the output channels need not be equal.

Common-memory-switch period: It is the duration of a common-memory cycle.

Linking: A process of tracking data bursts stored in a memory device, where each data burst may contain several data segments.

Chaining: The process of tracking data segments belonging to a data burst and stored in arbitrary addresses in a memory device.

Time Locking: A first controller is time-locked to a second controller if a signal transmitted at an instant of time indicated by a time counter at the first controller arrives at the second controller at the same instant of time as indicated by an identical time counter at the second controller.

Data Network

Figure 2:
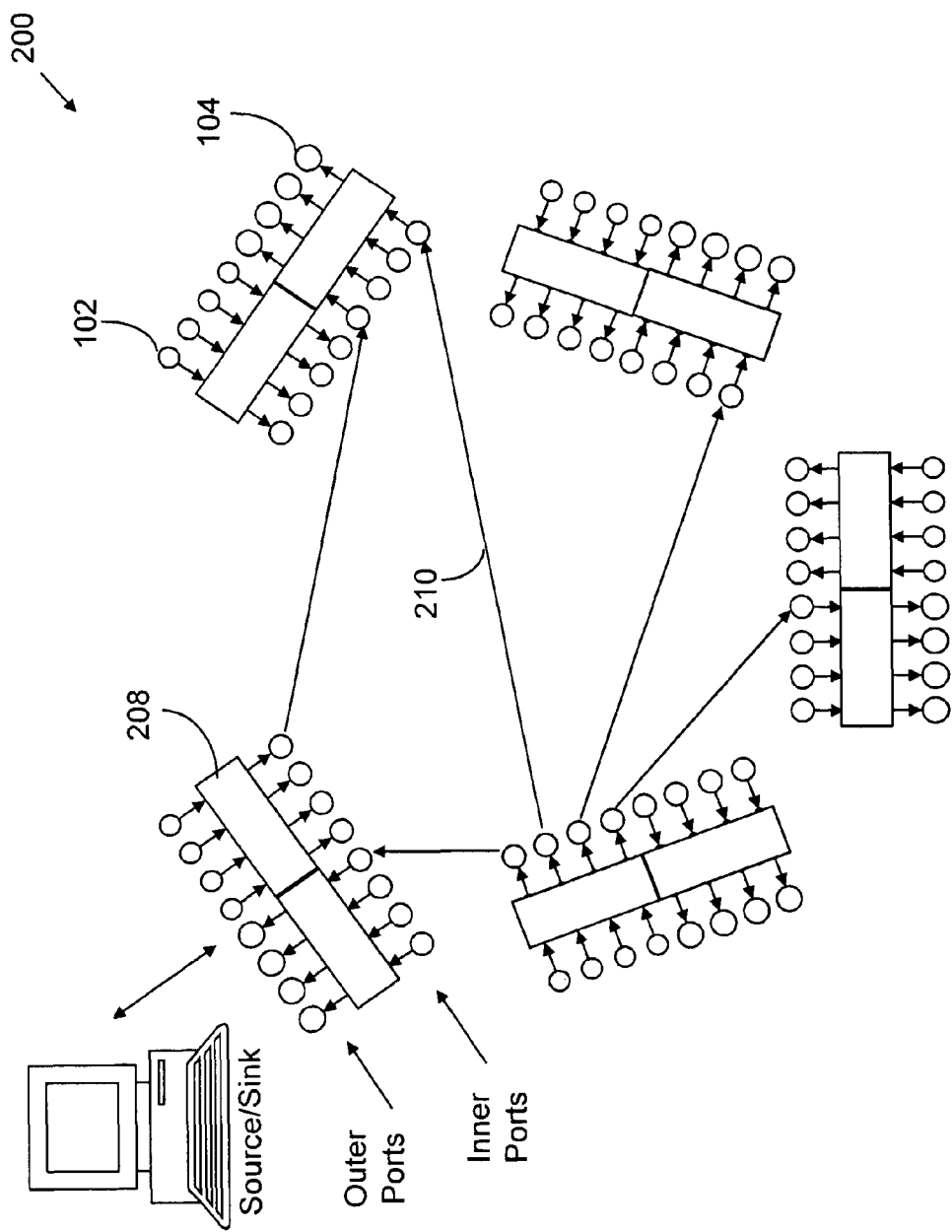
FIG. 2 illustrates the network of FIG. 1 with the network ports grouped in edge nodes interconnected by a static core.

A telecommunication network has outer ports (FIG. 1) and inner ports (FIG. 1 and FIG. 2). The outer ports comprise input ports and output ports. Similarly, the inner ports comprise input ports and output ports. The outer ports are connected to traffic sources and traffic sinks, and the inner ports are connected to each other. The ports are typically grouped into sets, each of which comprising an edge node or a core node. An edge node includes outer ports and inner ports while a core node includes only inner ports. Within an edge node, outer input ports may communicate directly with outer output ports. Outer ports of different edge nodes communicate with each other through their inner ports and possibly also through core nodes. The term "outer capacity" relates to the total capacity of the outer ports of a network and the term "inner capacity" relates to the total capacity of the inner ports of a network. The outer capacity is the capacity available to network users. In an ideal network, the ratio of inner capacity to outer capacity is close to one. A high ratio is generally indicative of an inefficient network.

An edge node comprises a source node and a sink node, with the source node connecting to data sources and the sink node connecting to data sinks. In an edge node, the outer ports connected to data sources are called ingress ports and the outer ports connected to data sinks are called egress ports. The inner ports that receive signals from other nodes are called inbound ports and the inner ports that send signals to other nodes are called outbound ports. A link from a source edge node to a core node is called an uplink and a link from a core node to a sink edge node is called a downlink. A channel in an uplink is called an upstream channel and a channel in a downlink is called a downstream channel.

It is widely accepted that end-to-end data rate regulation is an effective way to reduce packet loss to acceptable levels. This approach has been well articulated in several text books and countless technical papers. Rate regulation ensures that a connection from a traffic source to a traffic sink has a restrained flow rate, or that a path from a source edge node to a sink edge node has a guaranteed flow-rate allocation. The number of simultaneous connections in a network can be considerably high, and attempting to regulate each connection individually has two main drawbacks. The first is the resulting excessive signaling and the second is the reduced utilization of transport resources because the relative flow-rate fluctuation of an individual connection is naturally higher than that of an aggregation of a large number of connections. It is, therefore, more beneficial to use paths of regulated flow-rates, from each source node to each sink node. The aggregate traffic from a source node to a sink node is hereinafter called an aggregate data stream. Individual connections within a path may be regulated exclusively at the source nodes.

Network Description And Definitions

FIG. 1 illustrates a generic view of a connecting network 100 which includes a plurality of ingress ports 102 and a plurality of egress ports 104. The ingress ports 102 and egress ports 104 are paired into dual ports (referenced generally as 106) each dual port 106 comprising an ingress port 102 and an egress port 104. FIG. 2 illustrates the grouping of dual ports 106 into edge nodes 208 where the edge nodes are interconnected by links (e.g., link 210) of fixed capacities. These links can be realized through cross-connecting devices well known in the art (not illustrated in FIG. 2). The capacity of a path from one edge node 208 to another is static, and the connecting network 200 may be used to carry conventional packet data.

Figure 3:
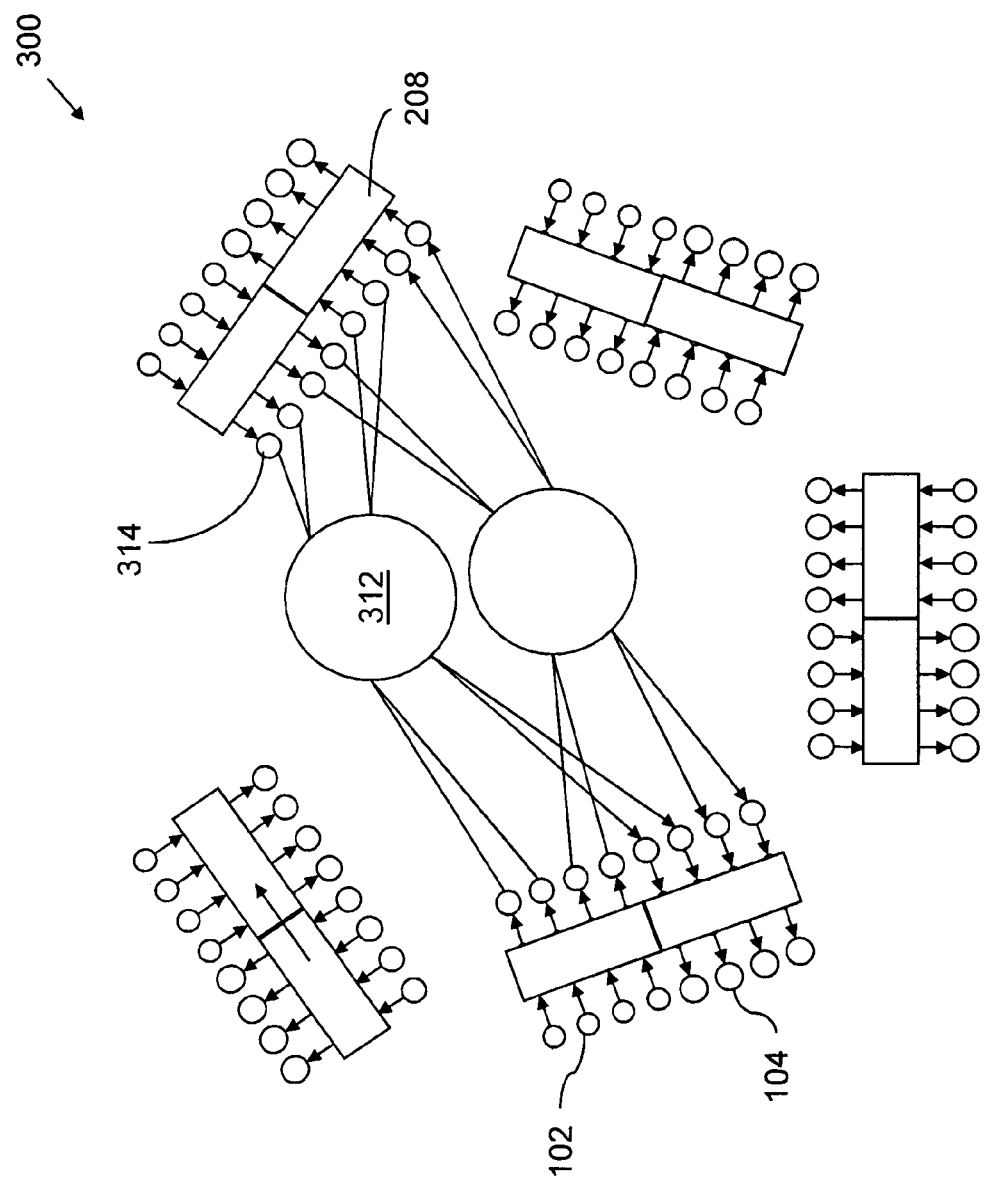
FIG. 3 illustrates the network of FIG. 1 with the network ports grouped in edge nodes interconnected by switching core nodes.

FIG. 3 illustrates an alternative connecting network 300 of the edge nodes 208 of the connecting network 200 of FIG. 2 where the edge nodes 208 are interconnected through fast switching core nodes 312. Thus, a link of adaptive capacity from one edge node 208 to another edge node 208 is realized by switching at a core node 312. The core nodes 312 preferably comprise optical switches adapted for burst switching.

Figure 4:
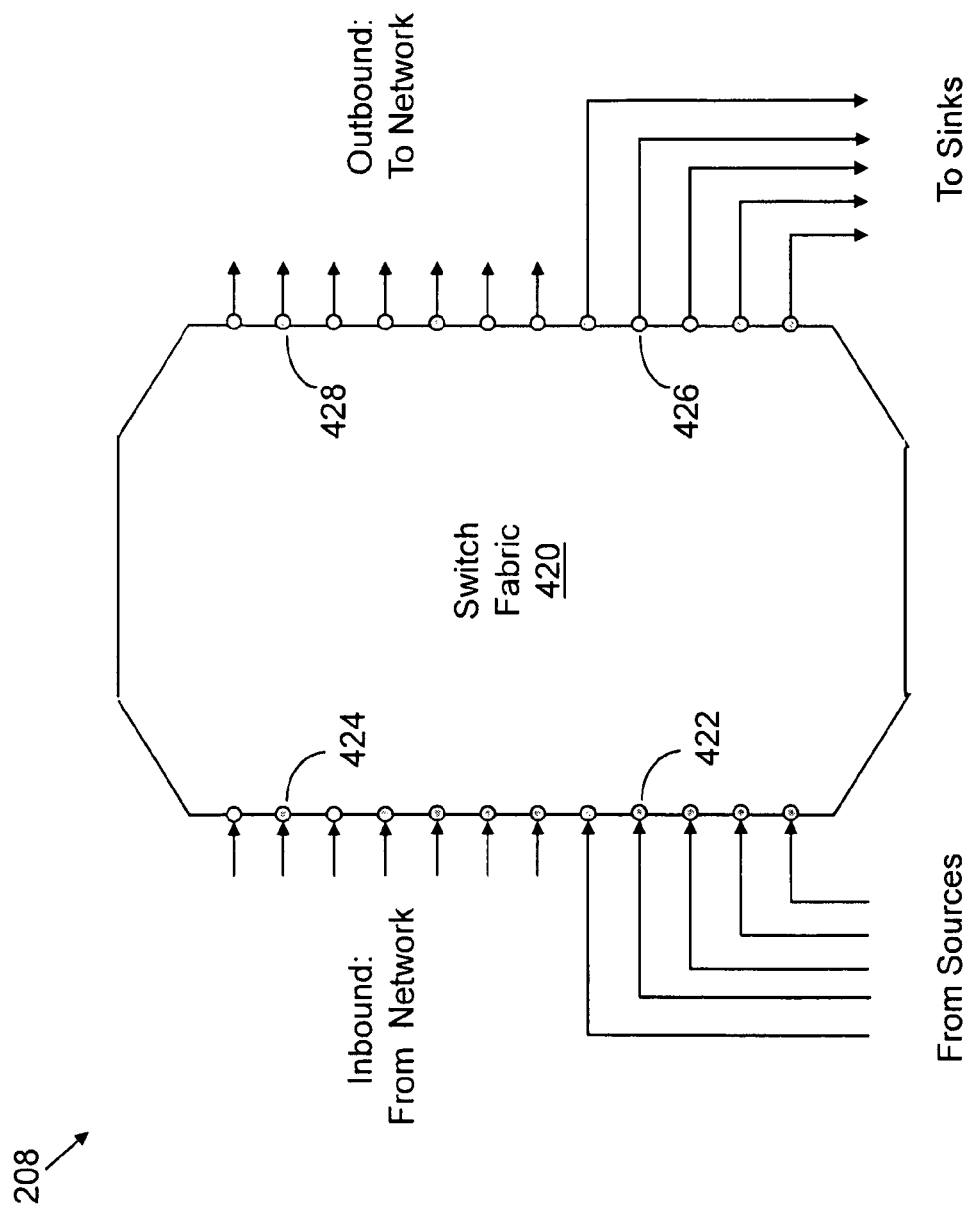
FIG. 4 illustrates an edge node having internal expansion to compensate for idle time-intervals caused by segmentation of variable-size packets into segments of equal size.

FIG. 4 illustrates an edge node 208 comprising a switching fabric 420, ingress ports 422 for receiving signals from subtending sources, inbound ports 424 for receiving signals from core nodes or other edge nodes, egress ports 426 for transmitting signals to subtending sinks, and outbound ports 428 for transmitting signals to core nodes or other edge nodes. The switching fabric 420 provides internal capacity expansion where the inner capacity of the edge node exceeds the input capacity or the output capacity. The expansion is required for two reasons. Firstly, to compensate for segmentation waste where data packets received from serial links at the input ports are segmented into data segments of fixed length (fixed number of bits), thus resulting in a rounding-up waste, also called segmentation waste. Secondly to reduce or eliminate internal blocking within the edge node arising from vacancy misalignment at input and output ports and conventionally called 'mismatch blocking'.

Figure 5:
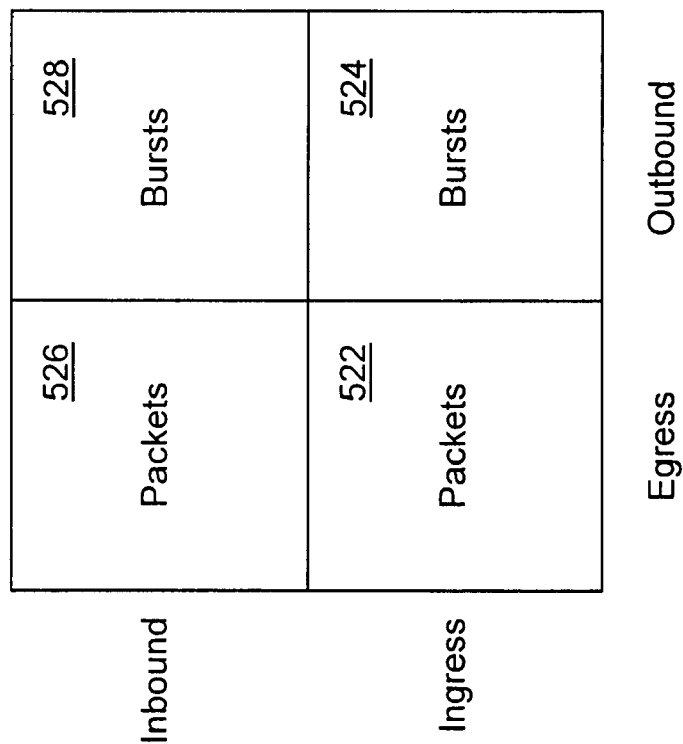
FIG. 5 illustrates the granularity of data transfer across the edge node of FIG. 4.

FIG. 5 illustrates the granularity of data transfer across the edge node of FIG. 4. At each ingress port 422, data packets are received from data sources. The packets are segmented and switched across the switching fabric 420 to egress ports 426 and outbound ports 428. Segmented packets received at the egress ports are assembled into data packets and transmitted to data sinks, as indicated in quadrant 522. At each outbound port 428, packets are aggregated into bursts and transmitted to a core node, or to another edge node, as indicated in quadrant 524. At an inbound port 424, data bursts are received from a core node. Each data burst may comprise data segments belonging to several packets. A data burst may be switched in its entirety to an outbound port 428 as indicated in quadrant 528. Alternatively, at an inbound port, a data burst may be decomposed into individual packets which may be segmented and switched across the switch fabric 420 to egress ports 426 as indicated in quadrant 526. Switching large-size data bursts rather than data packets in the core is necessitated by switching latency in the optical switching fabrics used in the core and by the need to reduce the scheduling effort at the core-node controllers.

Data Structure for Flow-Rate Accounting

At an edge node, data is received from data sources in the form of packets, generally of variable sizes. In order to facilitate switching within the edge node, the data may be segmented into data segments of equal sizes. Each packet is preferably transmitted from the edge node in the same variable-length format in which it was received from the packet source, even though an additional header may be required. Packet segmentation may necessitate null-padding, i.e., adding null data to an incomplete data segment. Null-padding thus increases the data flow rate. The information length (information size) of a segment is defined according to the number of information bits it contains. The flow-rate of the packets transmitted by the edge node is preferably regulated to avoid congestion en route, and it is necessary then to devise a means for regulating the actual packet data within the data segments. Data packets may be aggregated into data bursts which are preferably transmitted without null padding.

Figure 6:
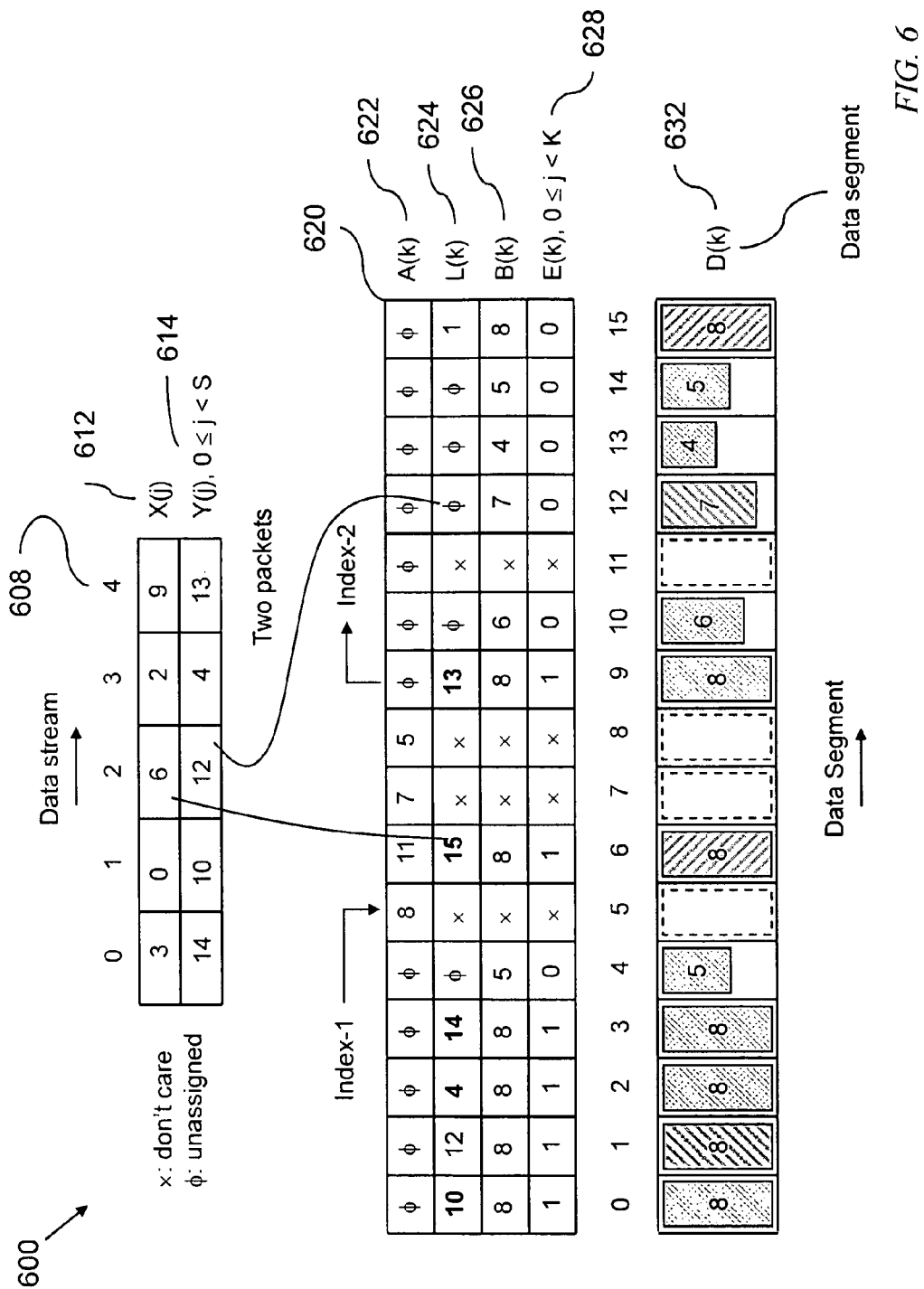
FIG. 6 illustrates a data structure, in accordance with an embodiment of the present invention, containing control data used to manage the rate of transfer of information bits in a buffer holding data segments belonging to multiple data streams at an input port or an output port of the edge node of FIG. 4, where a data segment may carry both information bits and null bits. The data structure can also be used in a controller of the core node of FIG. 3.

FIG. 6 illustrates a data structure 600 for controlling the enqueueing of data segments formed from packets of variable lengths and dequeueing the data segments under rate control where rate control is applied to the received data packets and not necessarily to the segmented data packets. Each packet is segmented into an integer number of segments, the last of which is padded with null data when the packet length is not an integer multiple of a segment length. The segments of a given packet need not occupy consecutive positions in a data buffer. The data structure, containing control data, comprises:

an array X (referenced as 612), having elements X(j), $0 \leq j \leq S$, S being the number of data streams where an element X(j) indicates the position in the data buffer at which the first segment of the next packet belonging to stream j is to be dequeued, an array Y (referenced as 614), having elements Y(j), $0 \leq j \leq S$, where an element Y(j) indicates the position at which the last segment belonging to stream j is written in the data buffer, an array D (referenced as 632), having elements D(k), $0 \leq k \leq K$, where an element D(k) holds a data segment and K is the maximum number of data segments that can be held in the data buffer, a data segment may include bits used for null padding, an array A (referenced as 622), having elements A(k), $0 \leq k \leq K$, where element A(k) contains either an index of a free position in the data buffer or a null value; each element in the array contains a null value if the data buffer is fully occupied, an array B (referenced as 626), having elements B(k), $0 \leq k \leq K$, with element B(k) storing the number of information bits in a data segment stored in position k in the data buffer, an array E (referenced as 628), having elements E(k), $0 \leq k \leq K$, with element E(k) indicating whether position k in the data buffer is unused (E(k)=x), contains a first segment of a packet (E(k)=1), or contains a continuation segment (E(k)=0), x being a null value, and an array L (referenced as 624) having elements L(k), $0 \leq k \leq K$, with element k indicating whether position k in the data buffer is vacant (L(k)=x), contains the last segment of a packet (L(k)=φ, a null value), or a pointer to a position in the data buffer D holding a segment belonging to the same stream to which a segment in position k belongs. The pointer L(k) has a value $0 \leq L(k) < K$.

Two pointers, Index_1 and Index_2, are used to track the vacant positions in the data buffer D. Index_1 is the index of an element in array A which contains the next occupied storage position in the data buffer containing array D. Index_2 is the index of an element in array A which contains the next vacant storage position in the data buffer. When the data buffer is full, Index_1 equals Index_2.

In the example of FIG. 6, there are five streams (S=5), referenced individually or collectively as 608 and labeled 0 to 4. The data buffer can hold 16 segments (K=16) in array D. For data stream 608-2, for example, the next segment to be dequeued is in position 6 in the data buffer (X(2)=6), and the last segment written in the data buffer is in position 12 (Y(2)=12). The segments belonging to stream 608-2 can be determined as follows: The first segment is in position 6. The segment length is B(6)=8 (i.e., the number of information bits is 8) and it is the first segment of a segmented packet because E(6)=1. The second segment is in position 15 (L(6)=15). The second segment has a length of 8 units (B(15)=8) and it is a continuation segment of the segmented packet because E(15) =0. The third segment is in position 1, because L(15)=1. The third segment has a length of 8 (B(1)=8), and it is a first segment of a segmented packet, because E(1)=1. The fourth segment is in position 12 because L(1)=12. Its length is 7 units (B(12)=7), it is a continuation segment (E(12)=0), and it is the last segment in the data buffer belonging to stream 2 (L(12)=φ).

Figure 7:
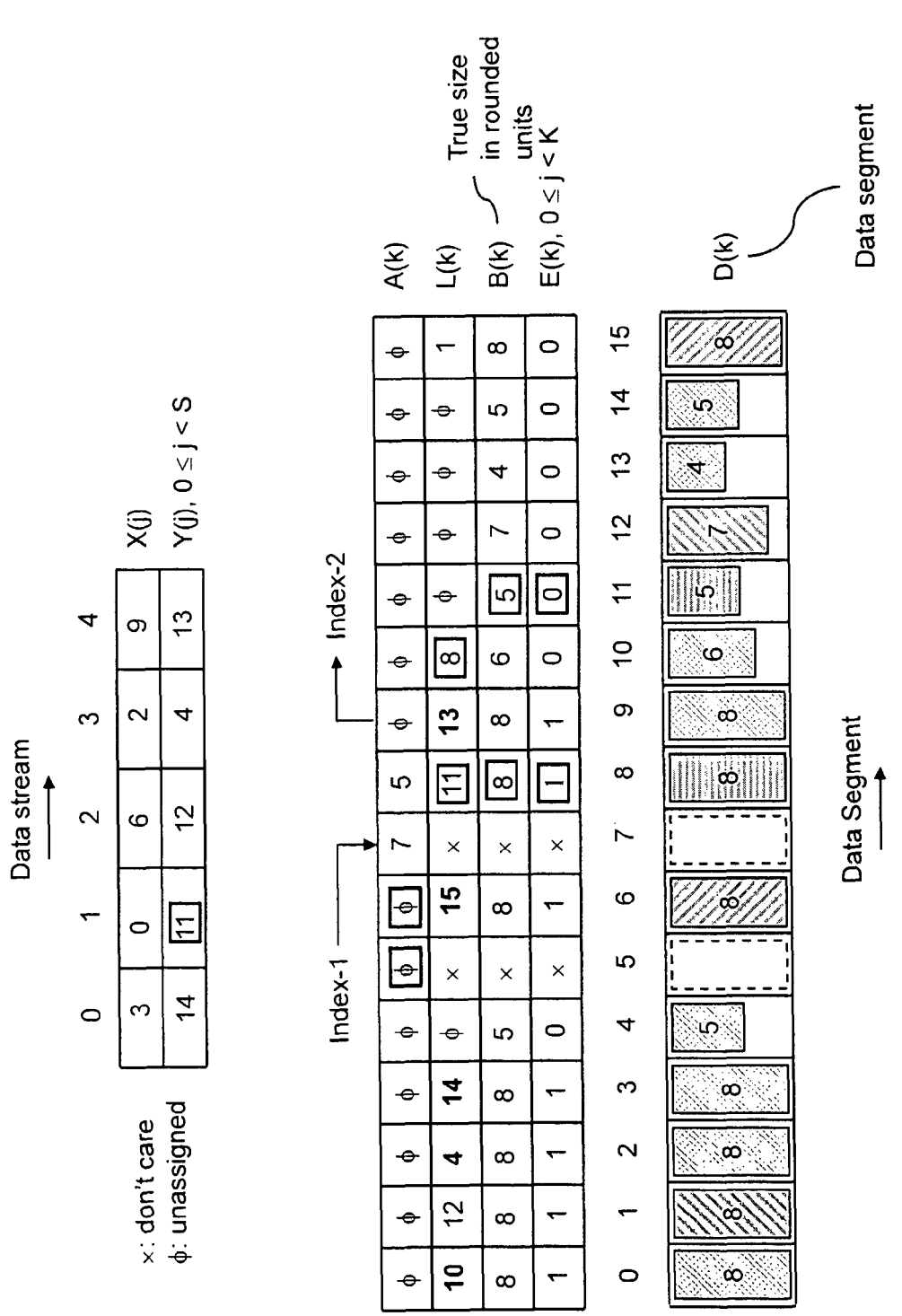
FIG. 7 illustrates a step of updating the data structure of FIG. 6 after inserting a packet in an input buffer.

FIG. 7 illustrates the insertion in the data structure 600 of a new segmented packet belonging to stream 1. The new packet is segmented into two segments of lengths 8 and 5. Index_1 in FIG. 6, which points to the first element in array A containing a free position in the data buffer indicates that position 8 in the data buffer is free. The selected position is then 8, the entry A(index_1) is set to a null value φ (see FIG. 7), and index-1 is increased by unity. As shown in FIG. 6, the last written segment of stream 1 was in position 10 (Y(1)=10). L(10)=φ is now changed to L(10)=8 and the first segment of the new packet is written in D(8) and E(8) is set equal to 1 because the segment is the first in the new packet. To insert the second segment, the value of index_1 is increased by 1 to indicate that the next vacant position in the data buffer is 11. The last written segment of stream 1 was in position 8. Thus L(8) is set to equal 11, and the length of the second segment (5 units) is written in B(11) with E(11)=0 because the second segment is a continuation segment.

Figure 8:
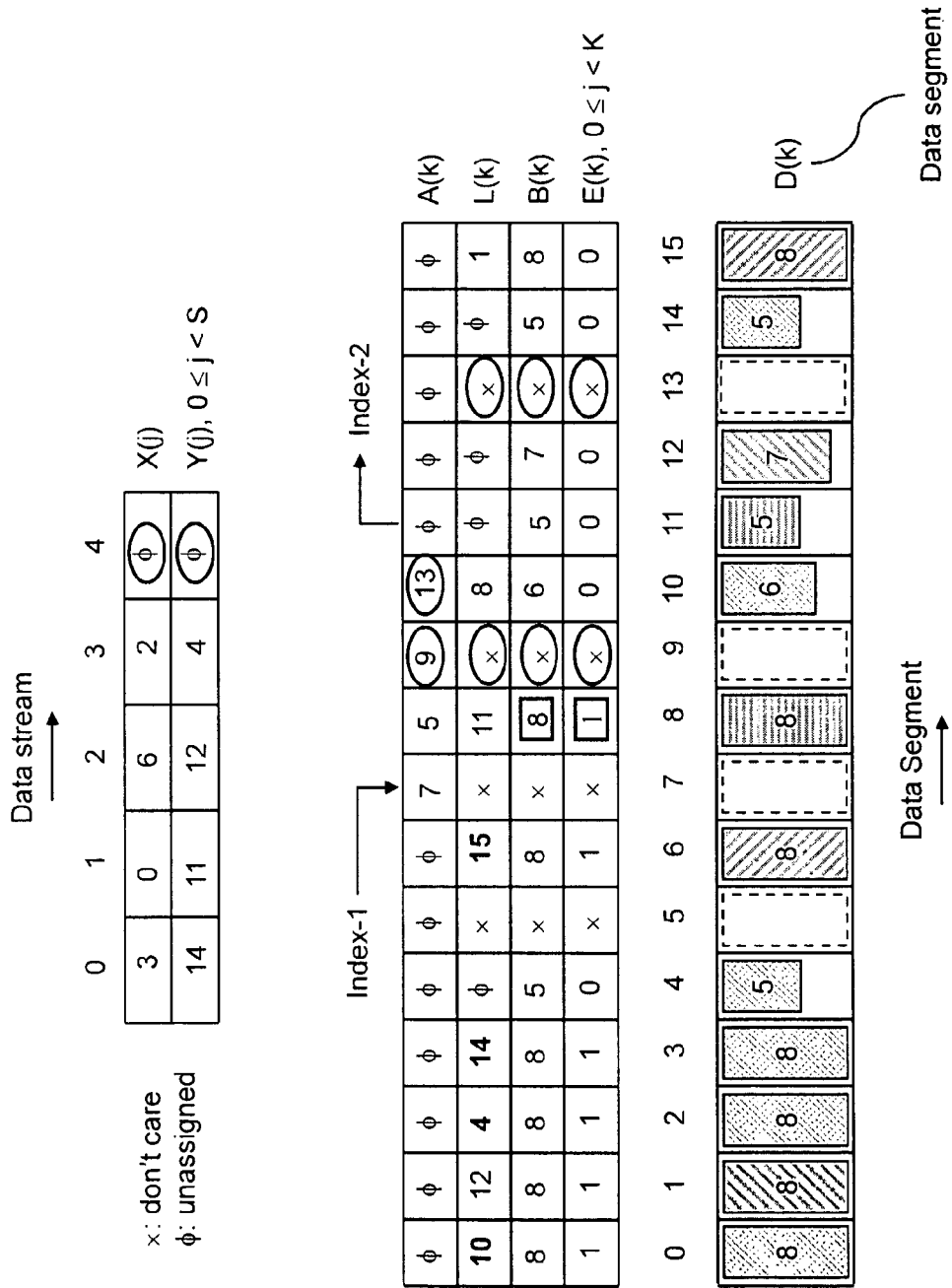
FIG. 8 illustrates a step of updating the data structure of FIG. 6 after removing a packet from the input buffer.

FIG. 8 illustrates the dequeueing of a packet belonging to stream 4. As shown in FIG. 6, the packets belonging to data stream 4 are stored in data buffer positions 9 and 13. Index_2 points to the element in array A in which the next vacated position in the data buffer is to be written. As shown in FIG. 6, the next position to be dequeued is 9 (X(4)=9) and A(Index_2) is thus set equal to 9. The value of L(9) is 13, indicating that there is a subsequent segment. The data segment in position 9 is dequeued and each of L(9), B(9), and E(9) is set to a don't-care indicator (x) (see FIG. 8). Index_2 is then increased by unity, and A(index_2) is set equal to 13 (Y(4)=13) (see FIG. 7). The segment of length 4 in position 13 is then readout and each of L(13), B(13), and E(13) is set to a don't-care indicator (x). Since the packet belonging to stream 4 has been dequeued, X(4) and Y(4) are set to a null value. The cumulative length of a dequeued packet of burst data may be determined for use in flow-rate accounting, as will be described below.

Figure 9:
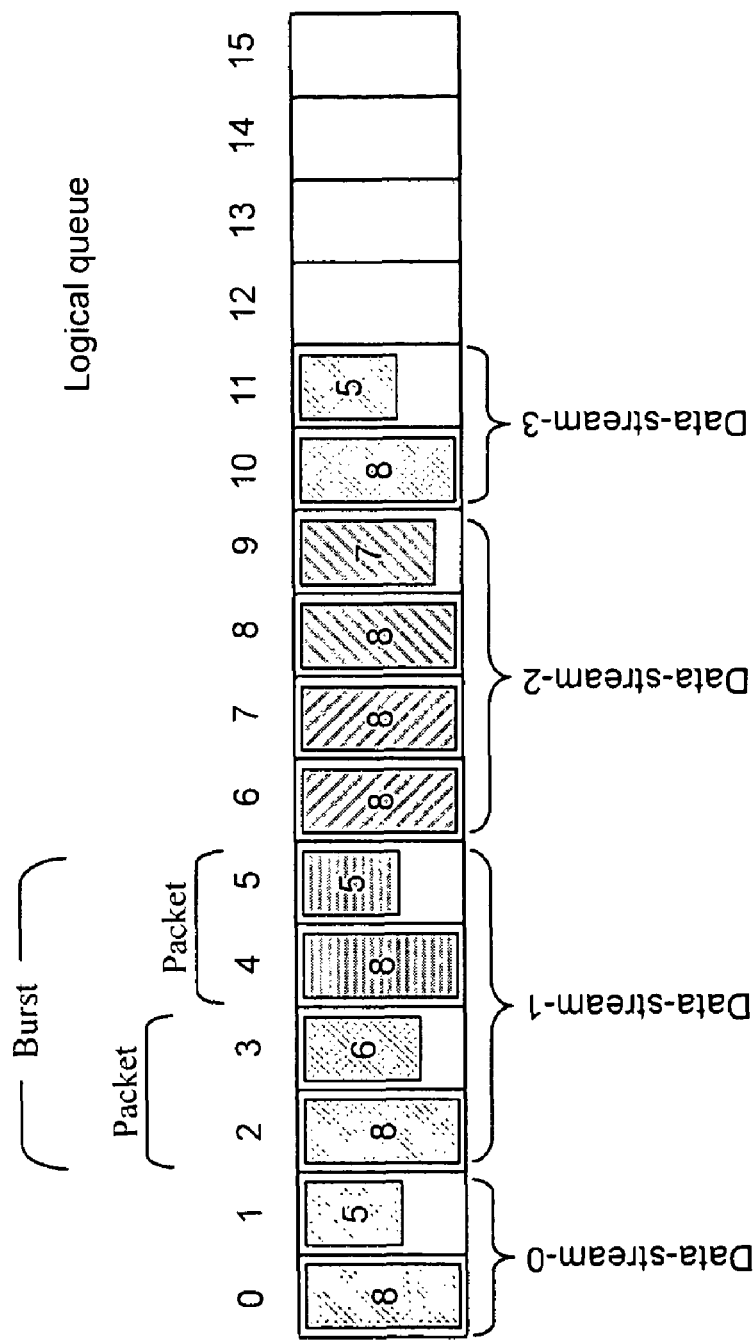
FIG. 9 is a logical representation of the data segments contained in the data structure of FIG. 8, the data segments sorted according to the data streams to which they belong.

FIG. 9 illustrates the segments held in the data buffer after the packet insertion of FIG. 7 and packet dequeueing of FIG. 8. For example, as discussed in relation to FIG. 6, the first packet belonging to stream 1 comprises the data stored in buffer positions 0 and 10 and the second packet comprises the data stored in positions 8 and 11. (packet 2). The structure 600 facilitates packet or burst parsing and flow-rate accounting. Other fields in each record array 620 can be added to account for other related variables.

Figure 10:
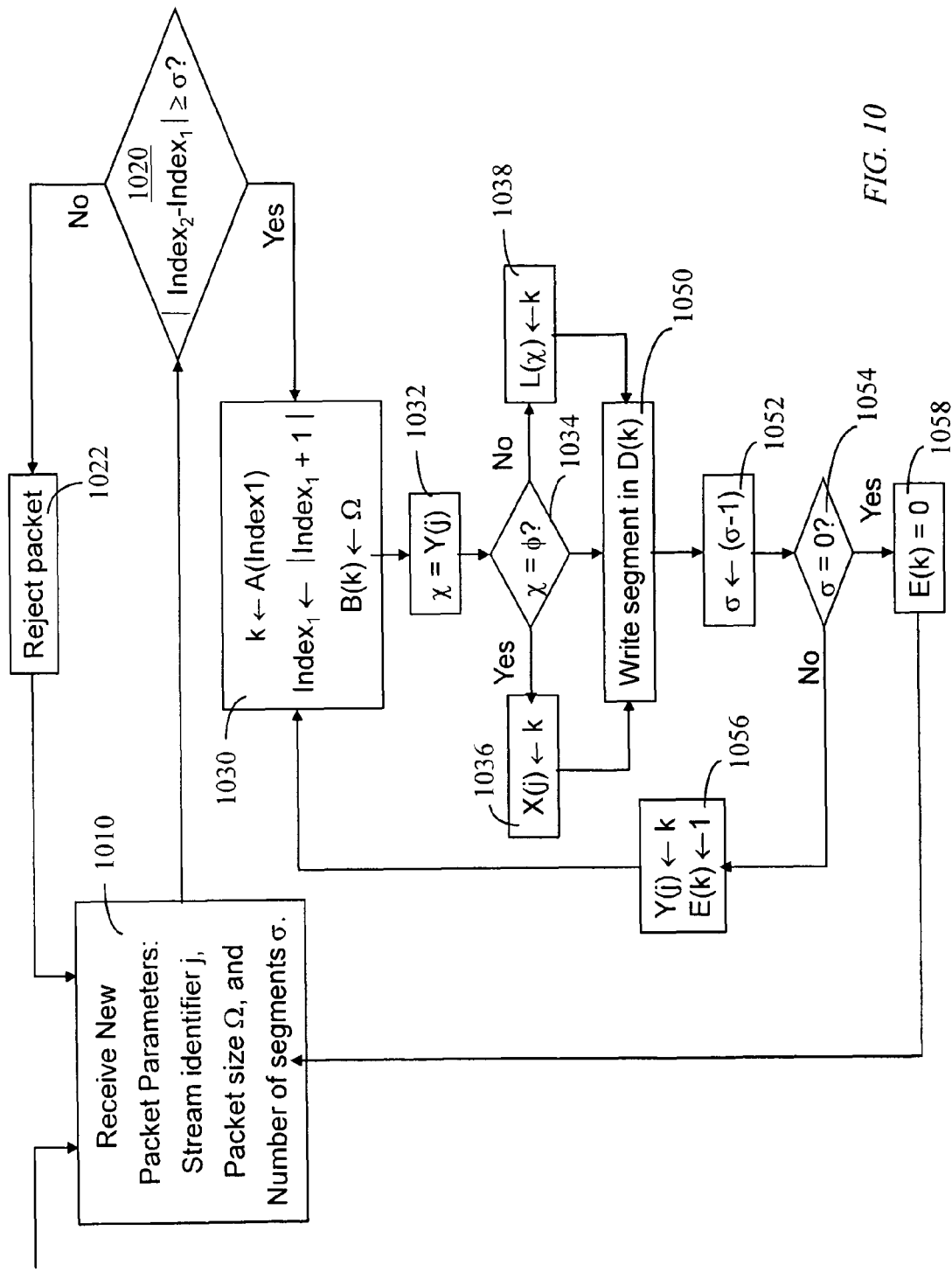
FIG. 10 is a flow chart describing a process of packet enqueueing.
Figure 11:
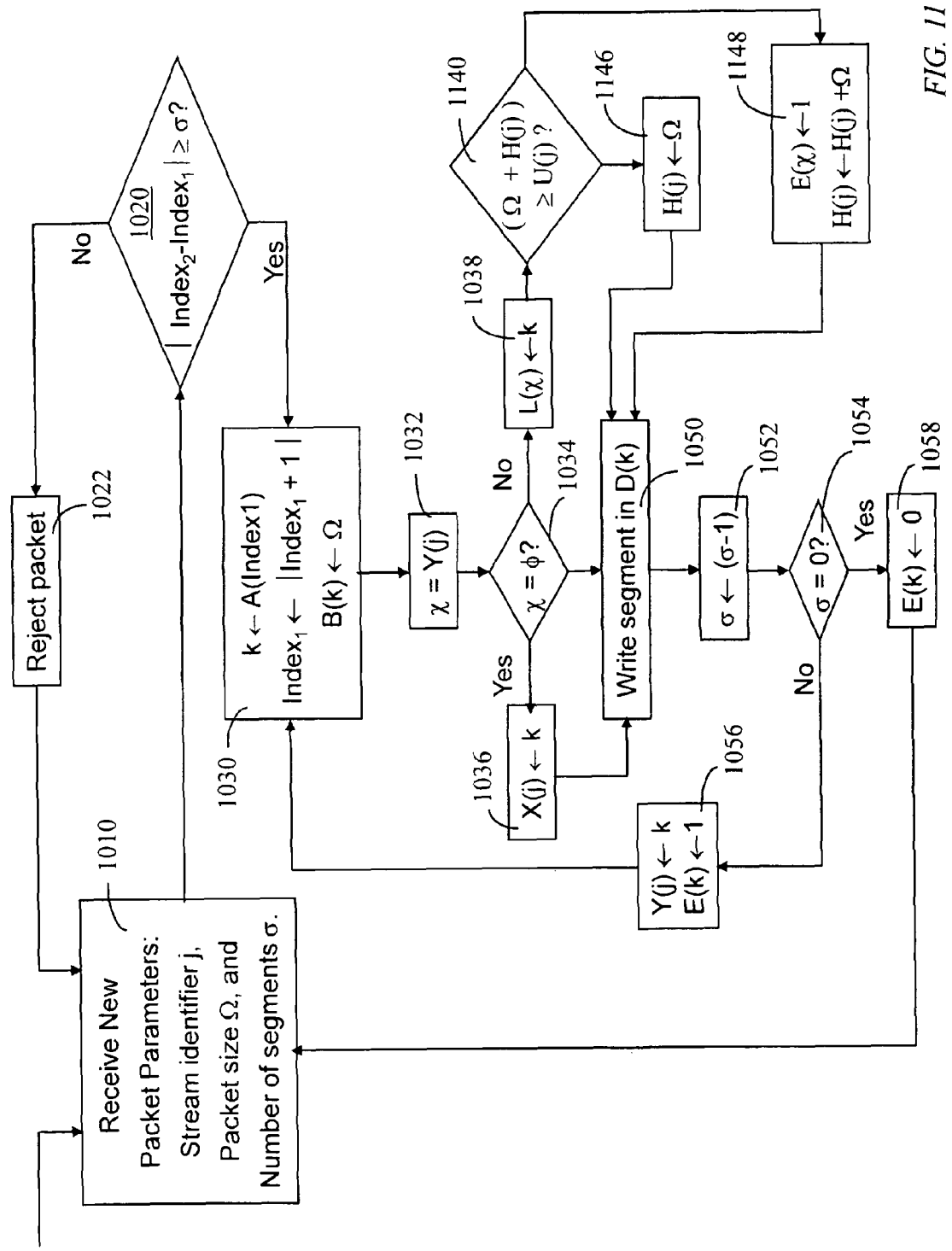
FIG. 11 is a flow chart describing a process of burst enqueueing in accordance with an embodiment of the present invention.

The process of insertion and removal of data packets is described below with reference to FIGS. 10 to 12.

Array A, having K entries, stores addresses of available blocks in the data buffer. The array contains a contiguous list of addresses of available blocks. As described earlier, two pointers, labeled Index_1 and Index_2, point to the first and last addresses, respectively, of the list. The two pointers are initialized as zero. The length of the list, i.e. the number of addresses in the list equals the difference [Index_2-Index_1] where |x| indicates a value x modulo K. Array A is initialized by a list of the addresses of all data blocks, labeled 0 to (K−1). The addresses may be listed in any order; for example a(j)=j, 0≦j<K. FIG. 10 is a flow chart describing a process of packet enqueueing. Array A is preferably stored in a separate memory device. In step 1010, packet parameters are received. The packet parameters include (1) an identifier j of a stream to which the packet belongs, (2) a packet size indicating the actual size Ω of the received packet, and (3) the number σ of data segments in which the packet is divided. The packet can only be enqueued if the data buffer has at least σ free data blocks. Thus, in step 1020, the number of free data blocks is determined as [Index_2-Index_1], and if this number is less than the required number of blocks, σ, the packet can not be stored and a rejection step 1022 may inform a packet source of the unavailability of storage space. The process then returns to step 1010. Otherwise, at step 1030 an address k of a free block in array D is read from array A at entry Index_1, Index_1 increased by 1, and the actual size of the packet is written in entry k of array B. The value Y(j) indicates the address in the data buffer in which the last data segment belonging to stream j is written. If the data buffer contains no packets belonging to stream j, Y(j) equals the null value φ. Thus, if Y(j) is found to equal φ, the received packet would be the only packet belonging to stream j and the address k is therefore written in X(j) as indicated in steps 1032, 1034, and 1036. If stream j has at least one packet already stored in the data buffer, Y(j) would contain the index of the data buffer at which the last data segment of stream j has been written. The new address k obtained from array A is then linked to position Y(j) as indicated in step 1038. The data segment is then written in the data buffer, array D, at address k (step 1050). In step 1052, the number a is reduced by one to determine the number of remaining data segments in the packet to be enqueued, if any. If it is determined in step 1054 that there is at least one segment remaining to be queued, the index of the last data segment of the packet is stored in Y(j) and packet continuation is indicated by setting E(k) equal to a (step 1056). A new vacant address is then obtained from array A in step 1030 and steps 1032, 1034, 1038, 1050, 1052, and 1054 are repeated. When step 1054 indicates that the packet has been fully entered in the data buffer (σ=0), the value of E(k) is set equal to zero at step 1058 to indicate that there is no continuation to address k in the data buffer D.

Each entry in array B is initialized as zero. A null value can be any unused number in Array A.

The process of aggregating packets to form a burst requires two additional arrays. An array U, having one entry per data stream, stores the permissible burst size per stream and an array H, also having one entry per data stream, stores the size of an incomplete burst for each data stream. The permissible size for a data stream may be determined according to different criteria; for example as a function of a flow rate allocated to the data stream. The data packets of a data stream may arrive at random and each packet is inserted in the data structure according to the process described above with reference to FIG. 10. When packets are aggregated to form a burst, only the entry of the packet-continuation indicator E corresponding to the address of the last block of the last packet of a burst is set equal to 1. The process of FIG. 10 is thus modified by adding the three steps 1140, 1146, and 1148, as indicated in FIG. 11. In step 1140, the actual size Ω of a received packet is added to the current actual cumulative size H(j) of a current incomplete burst. If the sum exceeds the permissible size U(j), the current incomplete burst is treated as a complete burst, and a new burst is formed by setting the size H(j) equal to the actual size of the new packet (step 1146). At this point, the continuation indicator of the last block of the burst already has a value of zero, being last set at step 1058. If the sum does not exceed the permissible size U(j), the new packet can be appended to the current incomplete burst. The continuation indicator of the last block of the burst is reset from 0 to 1

(E(χ)=1 in step 1148 and the current size of the burst is increased by the actual size Ω of the new packet.

Figure 12:
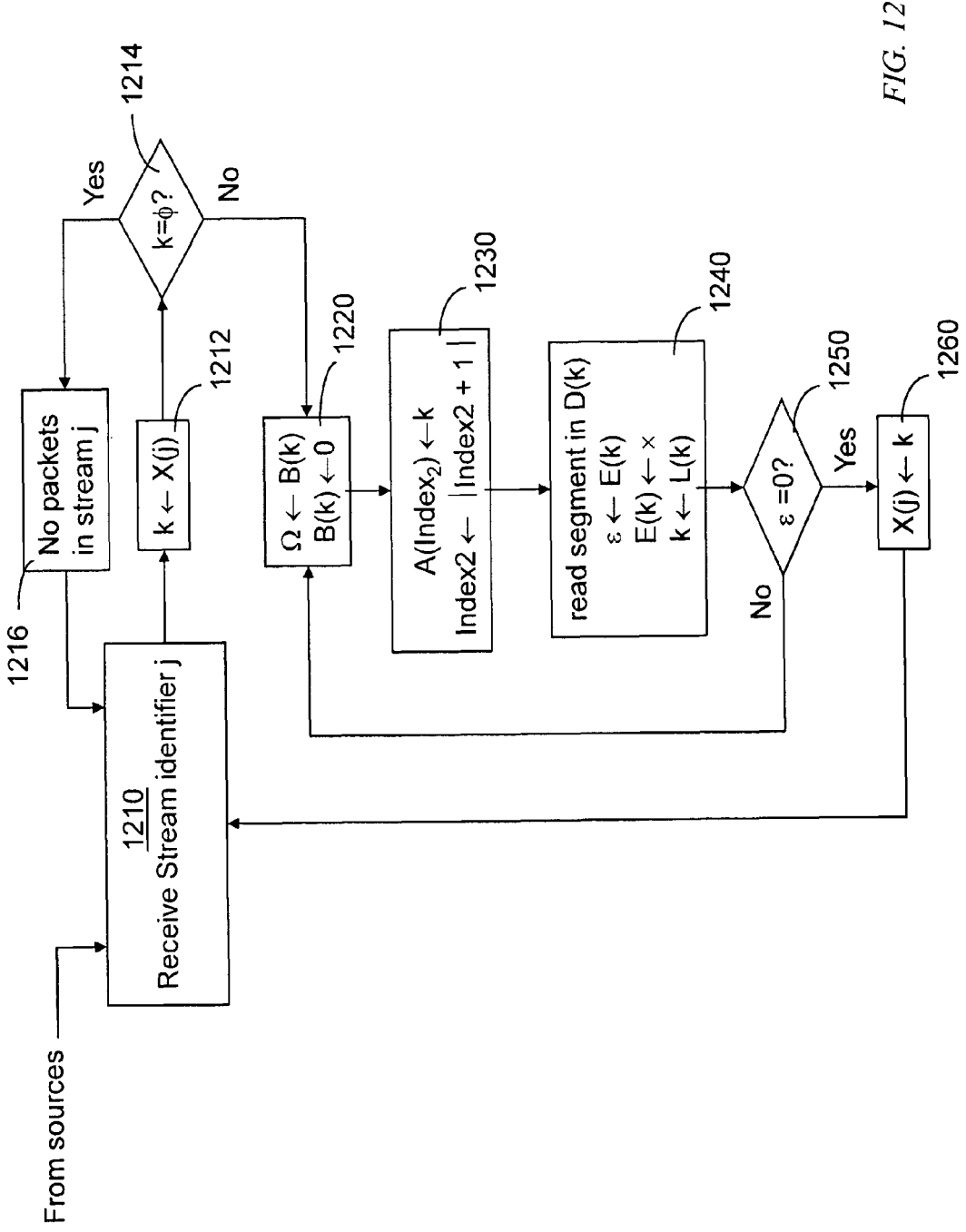
FIG. 12 is a flow chart describing a packet or burst release process.

FIG. 12 illustrates a packet-release process. When a request to release a packet belonging to stream j is received (step 1210), the address k of the first segment of the head packet of stream j is read from array X (step 1212). If there are no packets belonging to stream j, X(j) would have a null value φ and no packets are read (steps 1214 and 1216). If there is at least one packet belonging to stream j, the process continues to step 1220. The actual length of the packet, which includes the sum of all its constituent segments, is read from array B at entry k and entry B(k) is reset to zero (step 1220) for subsequent processes. At step 1230, the value of Index_2 which is the address of array A at which the last vacant data address has been written is increased by one (modulo K) and the index k is written in A(Index_2). At step 1240, a segment is read from the data buffer at address k, the current value of the continuation field E is retained in ϵ for further examination in step 1250. The continuation field E is then set to a 'don't care' value x, and the data address at which a subsequent segment of the packet is stored is determined from the link array L. When the last segment of a packet is read, the address of the first segment of the following packet, if any, is determined from operation k←L(k) of step 1240 and placed in X(j) as indicated in step 1260 if it is determined in step 1250 that the retained value ϵ is not equal to zero and, therefore, there is at least one more data segment to release. The process then continues to receive a new packet release request in step 1210. The index k in step 1260 would be equal to the null value φ if the data buffer contains no further packets belonging to stream j. If, in step 1250, ϵ is found to be zero, the process continues to step 1220.

Burst-Size Constraints

At an outbound port (e.g., port 314 of FIG. 3) of an edge node 208, data packets belonging to the same data stream are aggregated into data bursts. A data stream includes packets having the same destination and sharing the same route. As described earlier, any segmentation null-padding is preferably removed before transmitting the data burst along a wavelength channel leading to an optical switching node where the bursts are switched to respective destination nodes. Data bursts to different destination nodes are sequentially transmitted from an output buffer at the outbound port of the edge node. Delay jitter occurs when a given data burst waits until other data bursts are dequeued from the output buffer. To reduce the delay jitter, an upper bound may be imposed on the burst size so that the burst dequeueing time does not exceed a specified value. For example, if the capacity of the outbound port is 10 Gb/s, a wavelength channel emanating from the output port may carry data at a rate R=10 Gb/s. If the data-burst dequeueing time is specified as one microsecond, then the maximum size B of a burst would be 10 kilobits.

The switching latency at an optical core node 312 to which edge node 208 subtends can be considerable, of the order of 100 nanoseconds, for example. This necessitates that a guard time, at least equal to the switching latency, be allowed between successive data bursts transmitted from an outbound port. It is preferable, therefore, that the burst duration be as high as possible to reduce the relative capacity waste. In order to increase the burst sizes, packets belonging to each data stream may be held at an output buffer at an outbound port until a burst having a size close to B, 10 kilobits in the above example, can be formed. This burst-formation delay would be negligible for a data stream of a high flow rate. The burst formation delay for a data stream allocated a flow rate of p bits per second is d=b/p, where b is the burst size in bits. For a data stream of a relatively low rate, the burst-formation delay required to form a burst of a size comparable to the target burst size B may be unacceptable. For example, a data stream allocated a flow rate of 10 kilobits per second requires one second to form a burst of 10 kilobits. A burst-formation delay of this magnitude may be unacceptable, and an upper-bound, Λ, of the formation delay may be imposed. A reasonable value of Λ would be one millisecond.

Figure 13:
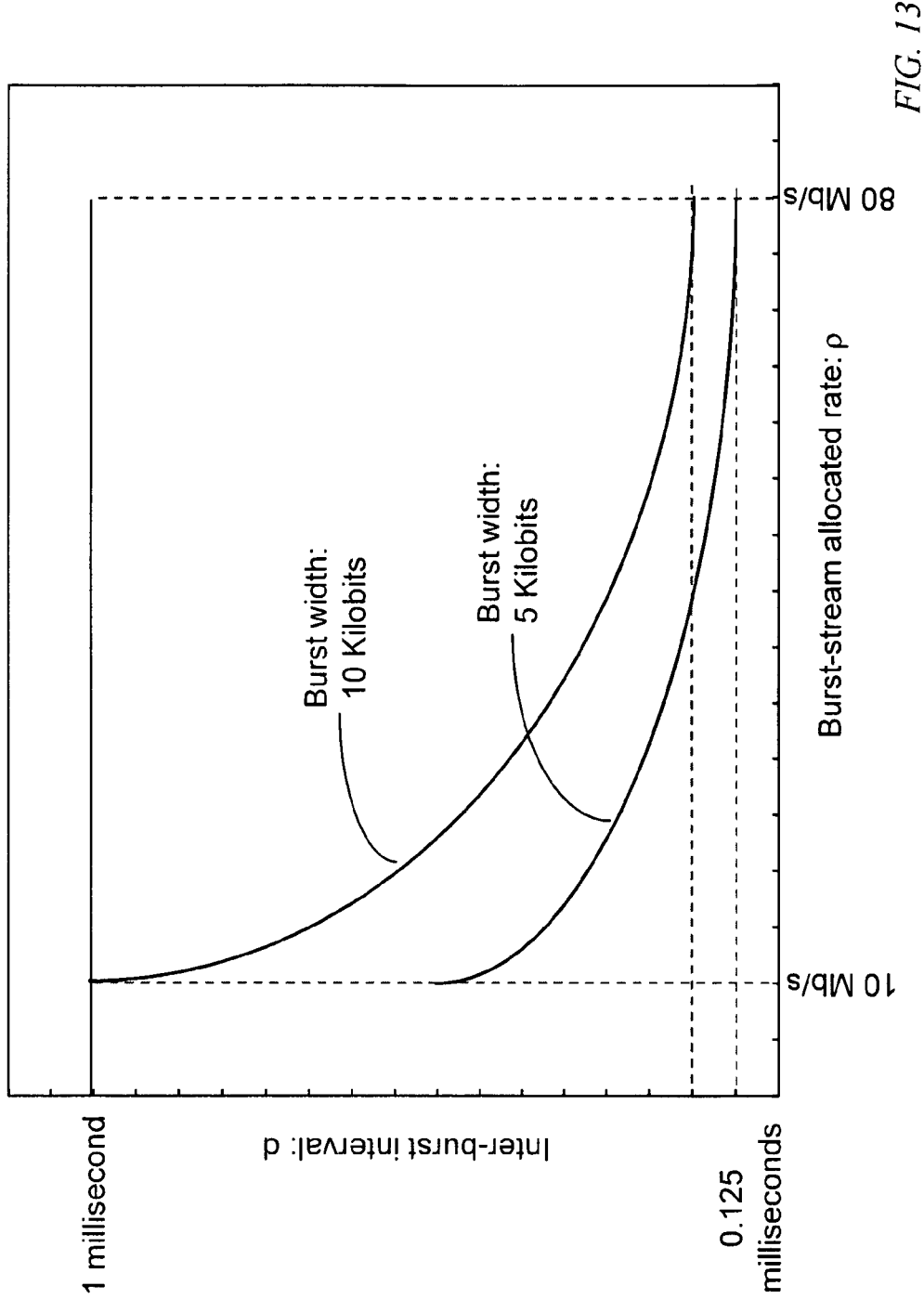
FIG. 13 illustrates the dependence of inter-burst intervals on a corresponding specified flow-rate requirement.

FIG. 13 illustrates the relation between the formation delay d and the allocated flow rate ρ for a data stream at a given burst size, with the maximum value of d=Λ selected to be 1 millisecond. In this example, if the target burst size is 10 kilobits, then a stream allocated 80 megabits per second (Mb/s) would require a formation delay of only 0.125 millisecond.

Denoting the allocated flow rate for stream j as $\rho_j$, $0 \leq j < S$, S being the number of data streams, then, in a worst-case scenario, an ingress port 102 of the edge node 208 would have one data stream directed to one of the output ports of the edge node 208 and having a flow-rate allocation slightly less than the bit-rate capacity of the output port. The remaining data streams from the same ingress port include a data stream having an insignificant, but non-zero, flow rate to each other output port of the same edge node 208. Thus, the flow-rate allocation $\rho_j$ are such that $$\sum_{j=1, j \neq j^*}^{S} \rho_j << R$$

with $\rho_{j^*} \approx R$, so that $$\sum_{j=1}^{S} \rho_j = R.$$

Because of the requirement that a burst-formation delay at input should not exceed a permissible upper bound under any traffic condition, a sufficient internal expansion is required at the edge node 208 as discussed in relation to FIG. 4.

An edge node allocates a permissible flow rate for each burst stream. The edge node may modify the flow-rate allocation for the burst stream as traffic changes with time. A method of determining the permissible flow rate is described in U.S. patent application Ser. No. 09/132,464, filed on Aug. 11, 1998 and titled "Routing and Rate Control in a Universal-Transfer-Mode Network". An edge node may connect to several optical core nodes, each core node having a core controller. An edge node selects a core node for each burst stream. The edge node then continually sends the flow-rate allocation for each burst stream to a respective core controller. The core controller determines a burst size corresponding to each allocated flow rate. The burst size is selected to meet two requirements. The first is the burst-formation delay upper bound $\Delta_1$ and the second is a transmission-duration upper bound $\Delta_2$. A burst may include several packets and the burst-formation delay upper bound $\Delta_1$ may be imposed so that the first packet in a burst may not have to wait at the source edge node for more than $\Delta_1$ before being eligible for transmission to the core. At a flow rate ρ, a burst of size B bits would have a mean formation time of b/ρ. The transmission-duration upper bound may be imposed to reduce delay jitter at outbound ports of the edge node. With a transmission rate of R bits per second, which is the speed of a channel connecting an outbound port to a core node, the transmission duration is b/R. Thus, the largest burst size B, also called a nominal burst size, must be selected so that B=min {ρ×Δ$_1$, R×Δ$_2$}. The nominal burst size B is determined by a burst-size calculator that may be placed either at an outbound port of an edge node or at a controller of a core node.

The burst-formation delay affects each burst individually while the burst-transmission affects all bursts waiting in an outbound queue. Therefore, Δ$_1$ would be selected to be much larger than Δ$_2$. For example, Δ$_1$ would be a millisecond while Δ$_2$ would be a microsecond. The value of Δ$_2$ must be much larger than the switching latency in the core.

Figure 14:
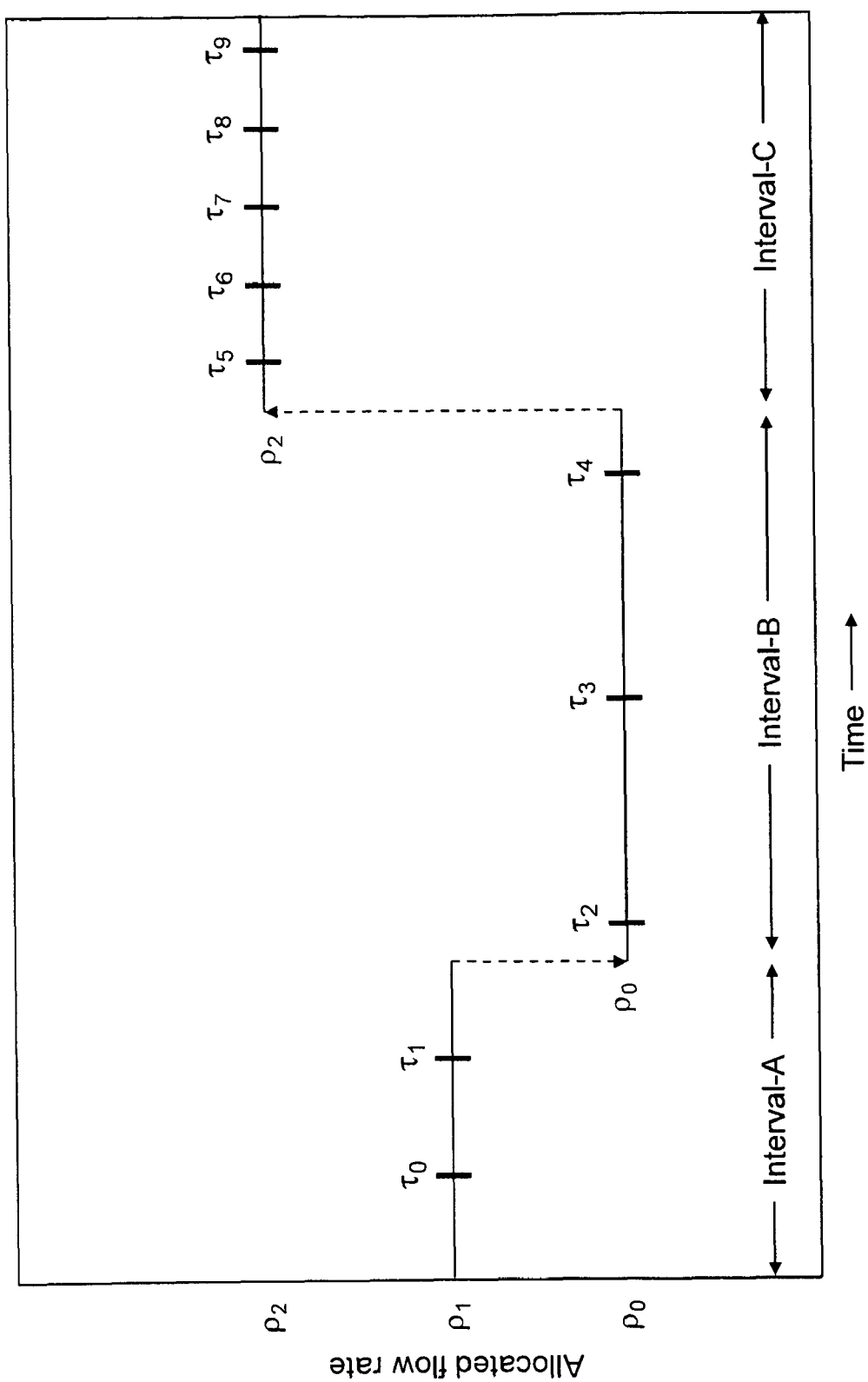
FIG. 14 illustrates the change of inter-burst intervals as the flow-rate allocations for a burst stream changes with time.

FIG. 14 illustrates the change of flow-rate allocations over successive intervals where the flow-rate allocation is ρ$_1$ in interval-A, ρ$_0$ in interval-B, and ρ$_2$, in interval-C, with ρ$_0$<ρ$_1$<ρ$_2$. With ρ$_{0=40}$ Mb/s, ρ$_2$=80 Mb/s, ρ$_2$=120 Mb/s, R=10 Gb/s, Δ$_1$=1 millisecond, and Δ$_2$=2 microsecond, for example, then at a flow-rate allocation of ρ$_0$, the nominal burst size B is 20,000 bits (the lesser of ρ$_0$×Δ$_1$=40,000 bits and R×Δ$_2$=20,000 bits). The nominal burst size would be 20,000 bits for flow-rate allocations exceeding 40 Mb/s. Thus, in this example, the nominal burst size remains unchanged over the three intervals.

Figure 16:
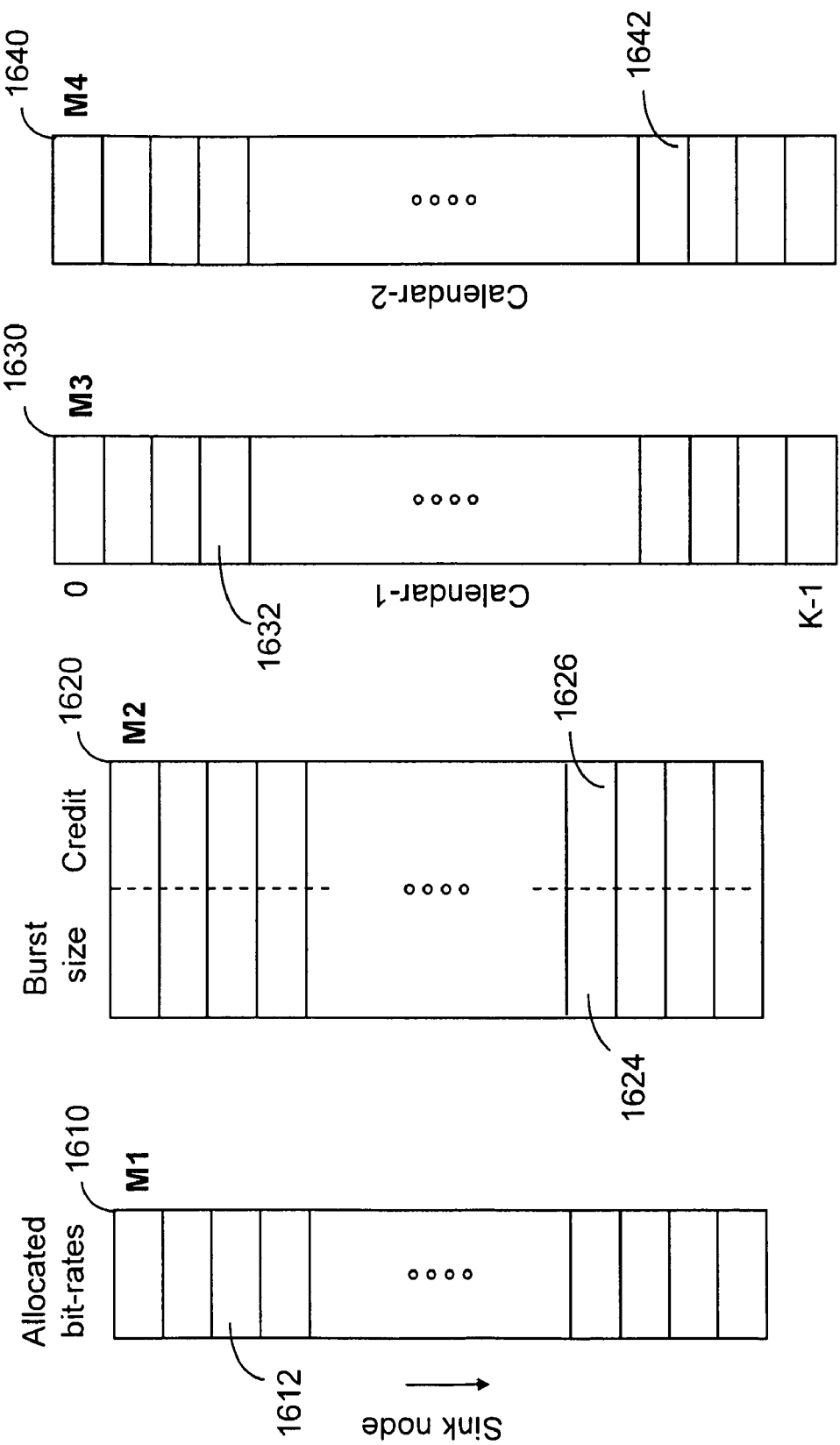
FIG. 16 illustrates a data structure for rate regulation of a packet stream or a burst stream according to an embodiment of the present invention.

The core controller generates burst descriptors, each burst descriptor including an input port, an output port, and a burst size. The burst descriptors are generated at intervals determined by the flow-rate allocation and the selected burst sizes B$_0$, B$_1$, and B$_2$ for allocated flow rates ρ$_0$, ρ$_1$, and ρ$_2$, respectively. In FIG. 16, the intervals τ$_0$, τ$_1$, τ$_2$, . . . , are selected such that:

$$(\tau_1-\tau_0)=B_1/\rho_1, (\tau_3-\tau_2)=(\tau_4-\tau_3)=B_0/\rho_0, (\tau_6-\tau_5)=(\tau_7-\tau_6)$$
$$=(\tau_8-\tau_7)=(\tau_9-\tau_8)=B_2/\rho_2.$$

The burst descriptors are submitted to a scheduler which determines the time at which a burst corresponding to each burst descriptor is switched across the optical switch fabric. The scheduled times are sent to corresponding edge nodes which transmit the bursts formed at outbound ports at corresponding times determined according to the time-locking process.

FIG. 15 illustrates the process of regulating the dequeueing of data bursts from a data-burst buffer to conform to an allocated flow rate. Each data burst is associated with a burst stream and each burst stream is allocated a flow rate. A calendar comprising a predetermined number of calendar slots is used to facilitate the process as described above. In operation, the calendar is continually scanned with calendar-slot duration of h seconds. Each time a burst-stream identifier is read, the burst stream gains one credit unit, which can be normalized to unity as described earlier. A burst becomes eligible for dequeueing when a fraction Φ of the credit Q of the burst stream to which it belongs is at least equal to the burst's size P (generally weight). FIGS. 15-A to 15-C illustrate the build up of credits with time for a burst stream. Credits are granted at discrete instants of time as illustrated by the small circles 1520. The discrete instants of time correspond to the calendar time slots at which an identifier of the burst stream is read from the calendar. Ideally, the discrete instants would be evenly spread along the calendar. However, exact even distribution may not be realizable with arbitrary flow-rate allocations to the multiplicity of burst streams sharing the calendar and an almost equalized distribution suffices. FIG. 15-A illustrates the case where Φ=1, i.e., a burst is eligible for dequeueing only when the corresponding burst stream has accumulated credits Q at least equal to P (Q≧P). Two bursts belonging to a specific burst streams arrive at the burst buffer at the instants indicated. The first burst 1510A arrives when the specific burst stream has a credit of less than two units. The burst size (weight) is 6.4 units. The burst has to wait until the specific burst stream accumulates enough credits. Meanwhile, a second burst 1510B having a size (weight) of 4.2 units arrives at the burst buffer at the instant indicated and it must wait until the first burst 1510A is dequeued and the burst stream has sufficient credits. The first burst 1510A is then dequeued when the burst stream accumulated 7 credit units. The remainder of 0.6 credit units is retailed for use by the second burst 1510B. The burst stream continues to accumulate credits as indicated and the second burst 1510B is dequeued when the burst stream accumulates 4.6 credits (four new credit units plus the remainder of 0.6 credit units). Naturally, dequeueing can occur only at the discrete instants. The burst stream now retains a credit of 0.4 units (4.6-4.2).

FIG. 15-B illustrates the case where the burst arrival process is as described with reference to FIG. 15-A, but using a value of Φ of 0.5. The first burst 1510A, which has a size (weight) of 6.4, can be served when the cumulative credit of the burst stream reaches a value of at least 3.2. The first burst 1510A is therefore dequeued when the credit Q=4. After dequeueing, the burst stream's credit becomes -2.4 (which is the credit value of 4 minus the weight 6.4 of the burst). The second burst 1510B arrives as indicated and the burst-stream continues to gain credits with each visit to a calendar slot that stores an identifier of the burst stream. The size (weight) of the second burst 1510B is 4.2, and the burst can be dequeued when the credit of the burst stream is at least 2.1. As indicated, the second burst is dequeued when the credit Q is 2.6; 5 credit units gained after five intervals minus the debit of 2.4. The credit Q is now -1.6 (which is 2.6-4.2).

FIG. 15-C illustrates the case where the burst arrival process is as described with reference to FIG. 15-A, but using a value of Φ of zero. Thus, a burst can be served as long as the credit Q of its burst stream is non-negative. The first burst 1510A, which has a size (weight) of 6.4, can be dequeued at the following instant where the credit Q=2. After dequeueing, the burst stream's credit becomes -4.4 (which is the credit value of 2 minus the weight 6.4 of the burst). The second burst 1510B arrives as indicated and the burst-stream continues to gain credits with each visit to a calendar slot that stores an identifier of the burst stream. The size (weight) of the second burst 1510B is 4.2, and the burst can be dequeued when the credit of the burst stream is at least zero. As indicated, the second burst is dequeued when the credit Q is 0.6; 5 credit units gained after five intervals minus the debit of 4.4. The credit Q is now -3.6 (which is 0.6-4.2). In general, the use of a value of Φ that is less than 1 reduces the queueing delay.

Rate-Regulation Device

In U.S. Pat. No. 6,034,960, issued to Beshai et al. on Mar. 7, 2000, and titled "ATM Service Scheduler Using Reverse-Binary Scattering and Time-Space Mapping," a method and apparatus for scheduling flow-rate-controlled data cells of fixed size are described. The method ensures a low-jitter transmission of data cells by appropriate spacing of data-cell transfer instants. In the present disclosure, the method is extended to enable low-jitter scheduling of variable-size data bursts belonging to a large number of burst streams that share a common high-speed channel so that each burst stream is allocated a bit-rate usage of the channel. The method enables the construction of fast burst-scheduling mechanisms.

The extended method is described with the help of FIG. 16, which illustrates four arrays: a flow-rate-allocation array 1610, a burst-description array 1620 (also called a burst-record array) holding a record for each data stream, each record including a candidate burst size 1624 and a credit 1626 of its associated data stream, and two calendar arrays 1630 and 1640. Each of arrays 1610 and 1620 has S entries, S being the number of data streams. Each of the calendar arrays 1630 and 1640 has a predefined number, K, of entries; the number K is preferably a power of 2. Arrays 1610, 1620, 1630, and 1640 are held in four memory devices labeled as M1, M2, M3, and M4, respectively. The flow-rate allocation array 1610, stored in memory M1, is used to construct a calendar (array 1630 or array 1640). Each entry 1612 in flow-rate allocation array 1610 corresponds to a burst stream and indicates the number of time slots in the calendar required to represent the flow-rate allocation for the burst stream. The number of allocated time slots for a burst stream need not be an integer. The number of time-slot allocations for a burst stream to be served at a normalized flow-rate q, expressed as a fraction of a shared channel having a capacity of R bits per second, is $q \times K$, $0 \leq q \leq 1$. With K selected to be a power of 2, the multiplication $q \times K$ reduces to a fast bit-shift operation. The integer part of the product $q \times K$ is stored in $\lceil \log_2 K \rceil$ bits, where $\lceil . \rceil$ denotes rounding-up to nearest integer, and the remainder is rounded up and represented by y bits. A reasonable value of y is 8 bits, which yields an accuracy of $1/(256 \times K)$ of the channel capacity. With K=16384, and q=0.000128, for example, the representative number of time slots is 2.097152. Using an 8-bit remainder representation, the remainder 0.097152 is represented by an integer value 25, and the actual representation is then 2.09765625 time slots leading to an artificial relative service-rate increase of 0.00024. The relative excess is smaller for burst streams allocated higher flow-rates.

The burst-description array 1620, stored in memory M2, has S records, S being the number of burst streams and each record corresponds to a burst stream. Each record has two fields 1624 and 1626. Field 1624 contains a size of a burst ready to be served, or a burst to be scheduled for service. The size is translated into a number, generally a real number, of calendar time slots. The field 1626 contains a credit for a corresponding burst stream.

The burst size for a burst stream in field 1624 is either obtained from the burst buffer (not illustrated) which may be structured as in FIG. 6 or computed directly from the flow-rate allocation in a corresponding field 1612. The burst size for a burst stream is set to zero if there are no waiting bursts belonging to the burst stream in the burst buffer or if burst stream is temporarily inactive, i.e., the corresponding allocated flow-rate in field 1612 is zero.

A burst is served only if its credit is positive and is not less than a fraction $\Phi$ of the burst size, $0 \leq \Phi \leq 1$. The fraction $\Phi$ is preferably either ½ or 1. If $\Phi$ is set equal to 1, a burst can be served, i.e., become a candidate for transfer to a subsequent processing stage, only if its credit equals or exceeds its size. A value of ½ indicates that a burst can be served when it has a credit of at least ½ the burst size. When a burst is served, its credit is adjusted accordingly. Thus, a given burst that is served when its credit is ½ its size, results in a debit that can be as large as ½ of the burst size. Thus, a credit can become negative after a burst is served if $\Phi$ is selected to be less than 1.

The time interval required to read a record in a calendar array 1630/1640 and execute other operations to process the read data is denoted "h" and is hereinafter referenced as a calendar time slot. With h=100 nanoseconds, and a speed of the shared service channel of 10 Gb/s, for example, every calendar time slot represents 1000 bits. A data burst is represented by a number, not necessarily an integer, of calendar slots. A burst of 16,800 bits, for example, requires 16.8 calendar slots if a calendar slot represents 1000 bits.

The calendar is used to schedule the bursts. The duration h of each calendar slot is selected to be sufficient to read an entry in a calendar and perform other related arithmetic and logic operations. The calendar is updated periodically, with an update period at least equal to the calendar period $K \times h$, where K is the number of calendar slots as defined earlier. With K=16384 and h of 64 nanoseconds, the calendar period is about one millisecond.

A calendar is updated either due to a change in traffic distribution, where the flow-rate allocations change for some data streams, or due to the allocation of a non-integer number of calendar slots for at least one data stream. The calendar update period is preferably an integer multiple of the calendar period. The calendar's content may be static, if the flow-rate allocation for each burst stream is time invariant. With time-varying flow-rate allocations, the calendar's content must be updated and the update interval is preferably an integer multiple of the calendar scanning period.

The two memory devices M3 and M4 are used to store the calendar data and each contains an array of K calendar slots with each entry containing an identifier of a burst stream. Each burst stream is then represented by a number of calendar slots. At any time, one of the two memories is in operation, i.e., used for service-rate regulation, while the other is in the update mode. The number, S, of burst streams is arbitrary. The number K is optional; however, it is preferable that K substantially exceed the number of burst streams to facilitate the process of handling fractional allocations, as will be described below. It is also preferable that K be a power of 2, as indicated earlier.

When a data-stream identifier is read from a calendar 1630/1640, the burst stream gains a credit unit. If burst size B is expressed in bits, then the credit unit is $\beta$. Preferably, the burst size B is expressed as $\xi \times \beta$ where $\xi$ is generally a real number and the burst size is then normalized to $\xi$. A burst of size $\xi \times \beta$ becomes eligible for dequeueing from the burst buffer after the identifier of the burst stream is encountered $\xi$ times in the process of continually scanning the calendar 1630/1640. With $\xi$ generally a real number, fractions of credit can be included in credit field 1626.

A calendar data unit $\beta$ is determined as $\beta = R \times h$. A calendar data unit is independent of the segment size. In the calendar of FIG. 16, a burst of size $B = \xi \times \beta \xi \times R \times h$. For a burst stream having an allocated flow rate $\rho$, the mean number of time slots between successive entries in the calendar containing the stream identifier is $R/\rho$. The mean period $\pi$ between successive entries of the burst stream in the calendar is then $\pi = h \times R/\rho$. Thus, $h \times R = \pi \times \rho$, and $B = \xi \times \pi \times \rho$. The mean time interval between successive burst selections is $\xi \times \pi$ and, hence the mean burst size is the product of the allocated flow rate and the mean time interval between successive burst dequeueing instants.

The calendar-rate unit, $\gamma$, is the flow rate of a burst stream allocated one calendar entry per calendar cycle. Thus, $\gamma = R/K$. A burst stream allocated a flow-rate $\rho$ is allocated $\rho/\gamma$ entries per calendar cycle. The ratio $\rho/\gamma$ is generally a real number and can be less than 1.0. If the ratio $\rho/\gamma$ is a non-integer, the number of calendar entries may differ in successive calendar cycles. If $\rho < \gamma$, the data-stream may not have an entry in the calendar in each calendar cycle. The mean number of calendar slots between successive entries of a given burst stream allocated a flow-rate $\rho$ is $\rho \times K/R$.

The calendar 1630 or 1640 is scanned over a time frame comprising a number of time slots equal to the number of calendar slots. Scanning the calendar is driven by a cyclic counter with a counter period having a number of time slots equal to the number of calendar slots. During every time slot of duration h, an entry 1632 or 1642 in the calendar is read at a memory address determined by a predefined scanning order. The entry 1632 or 1642 contains an identifier of a burst stream. When a data stream is read from an entry in a calendar array 1630/1640, a credit unit is added to field 1626 corresponding to the data stream. Thus, if, for example, a burst stream is listed four times in a calendar cycle, then during every calendar scanning cycle, of one millisecond duration for example, the burst stream gains four credit units. The same burst stream may be allocated five calendar slots in a subsequent calendar period, hence listed five times in the updated calendar 1640/1630 to be used for a subsequent calendar scanning. The change in the number of allocated calendar slots for a data stream may be required either due to a change in flow-rate allocation or due to a non-integer representation of flow-rate allocation. For example, an allocation requiring 4.25 time slots per calendar cycle, results in a representation of 4, 4, 4, and 5, in successive calendar cycles. Therefore, a calendar may be updated even if the flow-rate allocations for the burst streams remain unchanged for an extended period of time.

The number $\nu$ of calendar slots required to represent a data stream having a flow rate $\rho$ in a channel having a bit-rate capacity of R should equal $\rho \times K/R$. With $\rho/R=0.0485$, for example, then using a calendar of 256 calendar slots $\nu=12.416$, while using a calendar having, $2^{16}$, i.e., 65536 calendar slots, the value of $\nu$ would be 3178.496. The relative error in representing $\nu$ by an integer number generally decreases as the value of K increases. If the calendar length K is sufficiently large, K being equal to several millions for example, then calendar update would be needed only if the flow-rate allocations change. Using such a large memory is not desirable however and, in any case, a calendar update facility has to be provided anyway to handle variable flow-rate allocation.

To construct a calendar, two counters (not illustrated) are used. The first is a cyclic up-counter, ranging from 0 to K−1 and is $\lceil \log_2 K \rceil$ bits wide, where $\lceil . \rceil$ denotes rounding up to nearest integer. The second is a down-counter that starts with the integer part of allocated calendar slots (field 1612) plus any carryover credit in field 1626, normalized to time-slot data width. The down counter is also $\lceil \log_2 K \rceil$ bits wide to be able to handle a case where the flow-rate allocation for a burst stream is comparable to the entire capacity of the shared channel. The allocated rate '$\alpha$' (field 1612) is added to credit '$\chi$' (field 1626) and the integer $[\alpha+\chi]$, where [.] indicates rounding, is the start value of the down-counter. The remainder $\{(\alpha+\chi)-[\alpha+\chi]\}$ is stored back in a credit field 1626 in memory M2 corresponding to the stream. A positive reading of the down counter enables the up-counter and a zero reading disables the up-counter. For example, if the up-counter is reset to zero and a first stream is allocated five time slots, the down counter is initialized to read five ('00 . . . 00101'). The reading of the up-counter is the address in the calendar 1630 or 1640 generated in either of the memory devices M3 or M4.

In order to equitably space the interval between successive bursts in a burst stream, a scattering step is required. A simple scattering order can be derived by reading consecutive numbers in the reverse binary order, i.e., the least-significant bit becomes the most significant bit, and vice-versa.

Two methods of populating and operating the calendars may be used. In a first method, burst-stream identifiers are stored in consecutive positions but the calendar slots are read in a scattered order. In the second method, burst-stream identifiers are stored in scattered positions in the calendar but the calendar slots are read consecutively.

Thus, in one embodiment, in the process of populating or updating a calendar 1630 or 1640, burst-stream identifiers are written in a calendar (1630/1640) that is being updated at consecutive addresses determined by the reading of the up-counter. The calendar (1630/1640) under construction is initialized by null values; a null value may be selected to be any out-of-range value that is easily recognized. Naturally, an overwritten entry must have a null value, because successive reverse readings of the up-counter are unique. This verification, that an overwritten entry must contain null data, can be used to ensure device sanity.

In operation, a calendar 1630 or 1640 is scanned in a reverse binary order. Reading the calendar slots in a reverse-binary order tends to equalize the spacing, in the time domain, of consecutive bursts of the same burst stream. This results in low delay jitter. Without equitable spacing, packet or burst clustering can occur, leading to delay jitter. The read burst-stream identifier is used to index memory M2 and the corresponding credit at the indexed entry is increased by 1. The new total credit is compared with the burst size multiplied by the fraction $\Phi$ defined earlier. With $\Phi=\frac{1}{2}$, the binary number representing the burst size is just shifted one bit. If the credit is sufficient, the burst stream identifier is placed in a progress queue (not illustrated) for subsequent processing which includes dequeueing of burst descriptors, control-data updating using a data structure such as the one described in FIG. 6, etc.

In another embodiment, in the process of populating or updating a calendar 1630 or 1640, the up-counter is read in reverse-binary order and the reversed reading is used as an index to write the burst-stream identifier in the calendar (1630/1640) that is being updated. The reverse-binary reading leads to index scattering and, hence, nearly equalizes the spacing, in the time domain, of consecutive bursts of the same burst stream. This results in low delay jitter. Without equitable spacing, packet or burst clustering can occur, leading to delay jitter. The calendar (1630/1640) under construction is initialized by null values; a null value may be selected to be any out-of-range value that is easily recognized. Naturally, an overwritten entry must have a null value, because successive reverse readings of the up-counter are unique. This verification, that an overwritten entry must contain null data, can be used to ensure device sanity.

In operation, a calendar 1630 or 1640 is read sequentially every calendar time slot of h seconds (h=64 nanoseconds, for example). The read burst-stream identifier is used to index memory M2 and the corresponding credit at the indexed entry is increased by 1. The new total credit is compared with the burst size multiplied by the fraction $\Phi$ defined earlier. With $\Phi=\frac{1}{2}$, the binary number representing the burst size is just shifted one bit. If the credit is sufficient, the burst stream identifier is placed in a progress queue (not illustrated) for subsequent processing which includes dequeueing of burst descriptors, control-data updating using a data structure such as the one described in FIG. 6, etc.

The process of addition, comparison, and other related functions, may require a period of time exceeding the calendar time slot h. However, noting that a mean burst size would span several time slots, most calendar scanning steps require no action. Therefore, to better conserve time, when a comparison indicates a sufficient credit for a burst stream, the identifier of the burst stream is placed in a progress queue for subsequent processing as described above while the process of scanning the calendar continues. The subsequent processing includes dequeueing a burst or a burst descriptor and communicating with the remainder of the regulation mechanism.

Burst-Transfer Regulation Devices

In general, the term regulation refers to a process of dequeueing data from a data buffer at regular intervals. When the data buffer contains data belonging to several data streams, it may not be possible to dequeue data units of a given data stream at exactly equal intervals and the regulation process attempts to minimize the variance of successive dequeue intervals. The exact time at which a data unit may be transmitted from a data buffer to meet contention requirements in a subsequent processing stage is determined by a scheduling process.

Figure 17:
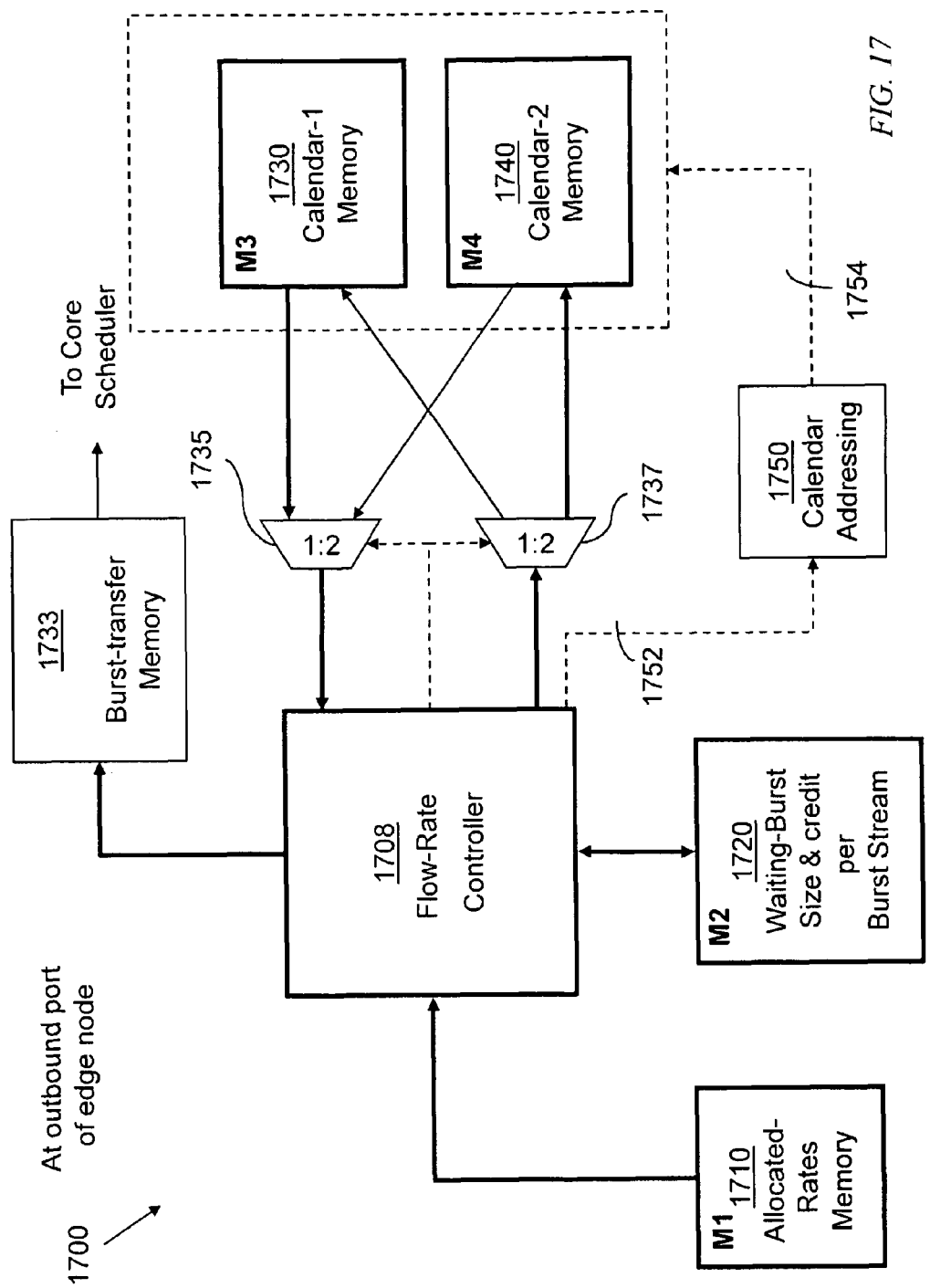
FIG. 17 illustrates a device for packet or burst rate regulation based on descriptors of individual packets or bursts, using the data structure of FIG. 16, according to an embodiment of the present invention.

The burst regulation method in accordance with the present invention applies to two applications. In the first application, the bursts are first received and stored in a buffer and their descriptors are determined. The burst regulator 1700 of FIG. 17 is then used to regulate the transfer of waiting bursts from the buffer. Thus, the burst size in field 1624 corresponds to a waiting burst. In a second application, the schedule is produced for forthcoming bursts and the burst sizes (burst lengths) are based on flow-rate allocations for each burst stream. The burst transfer-permit generator 1800 of FIG. 18 generates properly spaced burst descriptors which are then presented to a scheduler to produce the burst-transfer permits. In the first case, where bursts are already waiting in a burst buffer, the scheduled burst is dequeued from its corresponding burst buffer. In the second case, permits for transfer of tentative bursts are generated and the size of each burst is determined according to the flow-rate allocation for the corresponding burst stream. The tentative permits can be produced at an output port of an edge node 208 or at a core node 312.

Burst Regulator

Referring to FIG. 17, a memory device 1710, labeled M1, contains flow-rate allocations for each data stream (referenced as a flow-rate-allocation memory). The data streams are defined according to an independent admission process not described in this disclosure. The flow-rate allocations are either determined by data sources or estimated by an edge node hosting data sources. The flow-rate allocations are organized in an array 1610 as illustrated in FIG. 16.

A memory device 1720, labeled M2, contains, for each data stream, the size of a candidate burst and a current credit (referenced as a burst-record memory). The candidate burst is a burst waiting in a data memory (not illustrated) and the credit is computed by a processing circuit 1408. The burst-size and credit data are organized in an array 1620 as illustrated in FIG. 16. If the data memory contains no bursts for a given data stream, the corresponding size is set equal to zero and the corresponding credit is reset to zero. Thus, a positive credit for a given stream may be reset to zero if there are no waiting bursts, or if the stream is temporarily assigned a zero flow rate.

A memory device 1730, labeled M3, contains a calendar 1630 and a memory device 1740, labeled M4, stores a calendar 1640 (FIG. 16). Each of the two calendars has K>1 calendar slots, where the number K is selected to meet certain criteria as described earlier. The two memory devices 1730 and 1740 interchange their roles where one operates in an update mode, to modify a current calendar's content, while the other operates in a control mode, where its content is used to regulate the dequeueing of data bursts from a data buffer.

The burst flow-rate controller 1708 of FIG. 17 determines the instants of time at which segments of a data burst are released from the burst buffer. The burst flow-rate controller 1708 also performs rudimentary arithmetic and logic functions. The exchange of roles of calendar memories M3 and M4 is carried out by 1:2 selectors 1735 and 1737 as indicated, under control of the burst flow-rate controller 1708. Burst flow-rate controller 1708 directs selector 1737 to write calendar data in memory 1730 (array 1630) or 1740 (array 1640) and selector 1735 to connect the other memory to the burst flow-rate controller 1708. To update a calendar, burst flow-rate controller 1708 adds the allocated rate for each burst stream as read from memory 1710 to the credit 1626 read from array 1620 contained in memory 1720 of the burst stream, rounds the result of the addition to an integer value and returns a remainder, if any, to credit field 1624 in array 1620 contained in memory 1720. The burst flow-rate controller 1708 controls a calendar addressing unit 1750 through control links 1752 and 1754. The calendar addressing unit 1750 includes an up counter for addressing the operating calendar. The addressing unit 1750 also includes an up-counter controlled by a down counter to be used in the process of populating one of the two calendars 1630 and 1640 as described earlier. The calendar addressing unit 1750 is illustrated in further detail in FIG. 19. Concurrently, while one of the two calendars is updated, the other calendar is used to regulate the dequeueing a burst from a burst queue or to generate a burst descriptor to be communicated to a respective burst regulator. Details of the process of calendar 1630/1640 update are described below with reference to FIG. 20. The process of burst dequeueing using a calendar 1630/1640 is described below with reference to FIG. 21.

Burst-Permit Regulator

Figure 18:
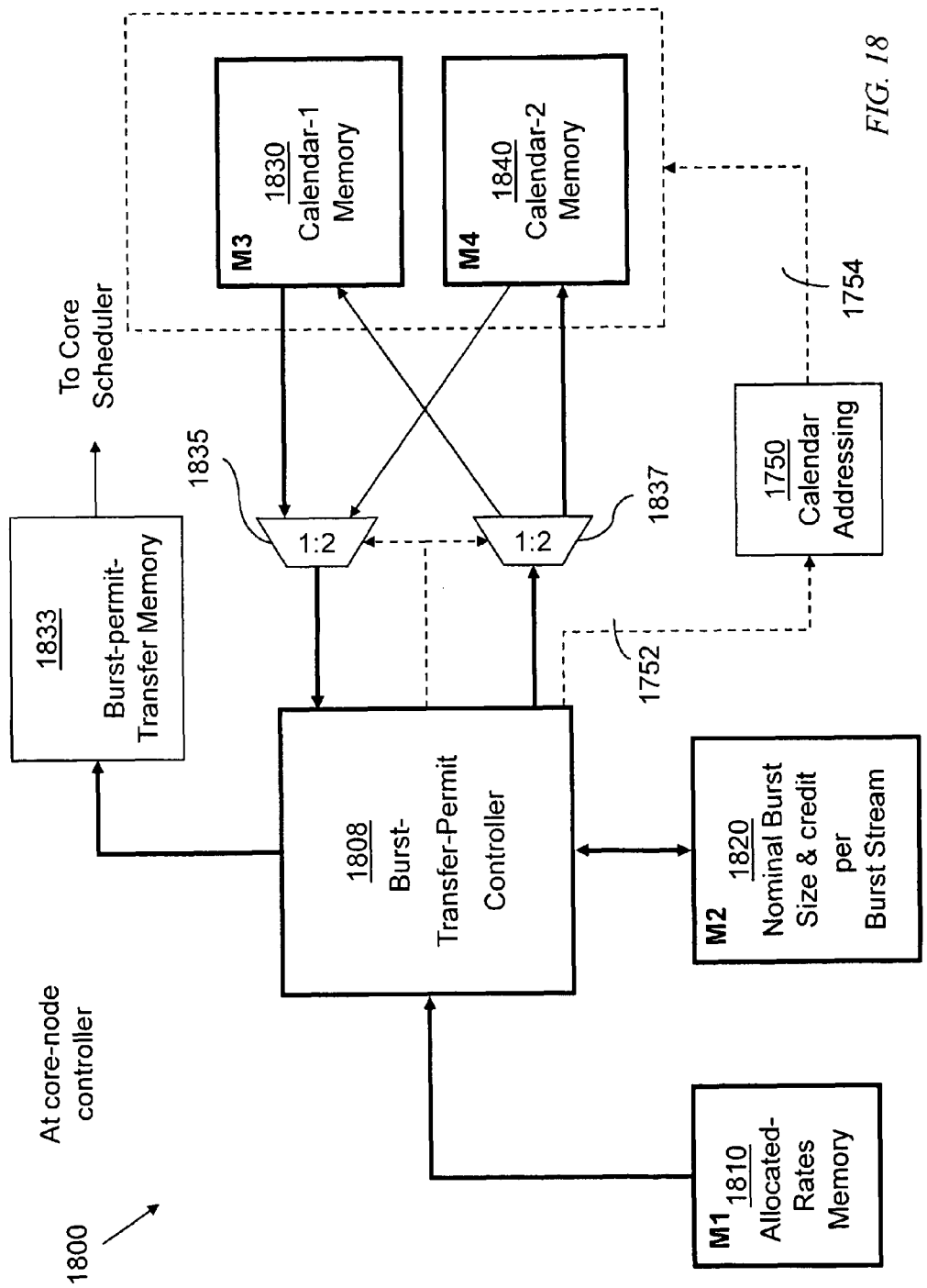
FIG. 18 illustrates a device for packet or burst rate regulation for multiple streams based on flow-rate-allocations, using the data structure of FIG. 16, according to an embodiment of the present invention.

FIG. 18 is a block diagram of a burst regulator quite similar to that of FIG. 17, with memory devices 1810, 1820, 1830, and 1840 corresponding to memory devices 1710, 1720, 1730, and 1740, respectively, and uses the same data structure of FIG. 16. Selectors 1835 and 1837 operate in a way similar to that of selectors 1735 and 1737, and circuits 1812 and 1712 also operate similarly. The two memory devices 1830 and 1840 interchange their roles as in the case of memory devices 1730 and 1740. The main differences are (1) field 1624 in an array 1620 stored in memory 1720 contains the size of a waiting burst while field 1624 in an array 1620 stored in memory 1820 contains the size of a forthcoming burst for which a burst permit is being prepared, and (2) the burst transfer-permit controller 1808 issues a timed burst permit while the burst flow-rate controller sends an indication of a release time of a specific waiting burst. The output of a burst regulator 1700 is presented to a burst scheduler (not illustrated) which determines the exact time of transmitting a burst that is already waiting while the output of a burst transfer-permit generator 1800 is presented to a burst scheduler (not illustrated) to determine the exact time at which a forthcoming burst whose size can not exceed the size indicated in a respective permit is to be transmitted. The process of burst-permit regulation is similar to the process of burst-regulation described with reference to FIG. 20 and FIG. 21. Details of a burst scheduler are described in Applicant's U.S. patent application Ser. No. 10/054,509.

Figure 19:
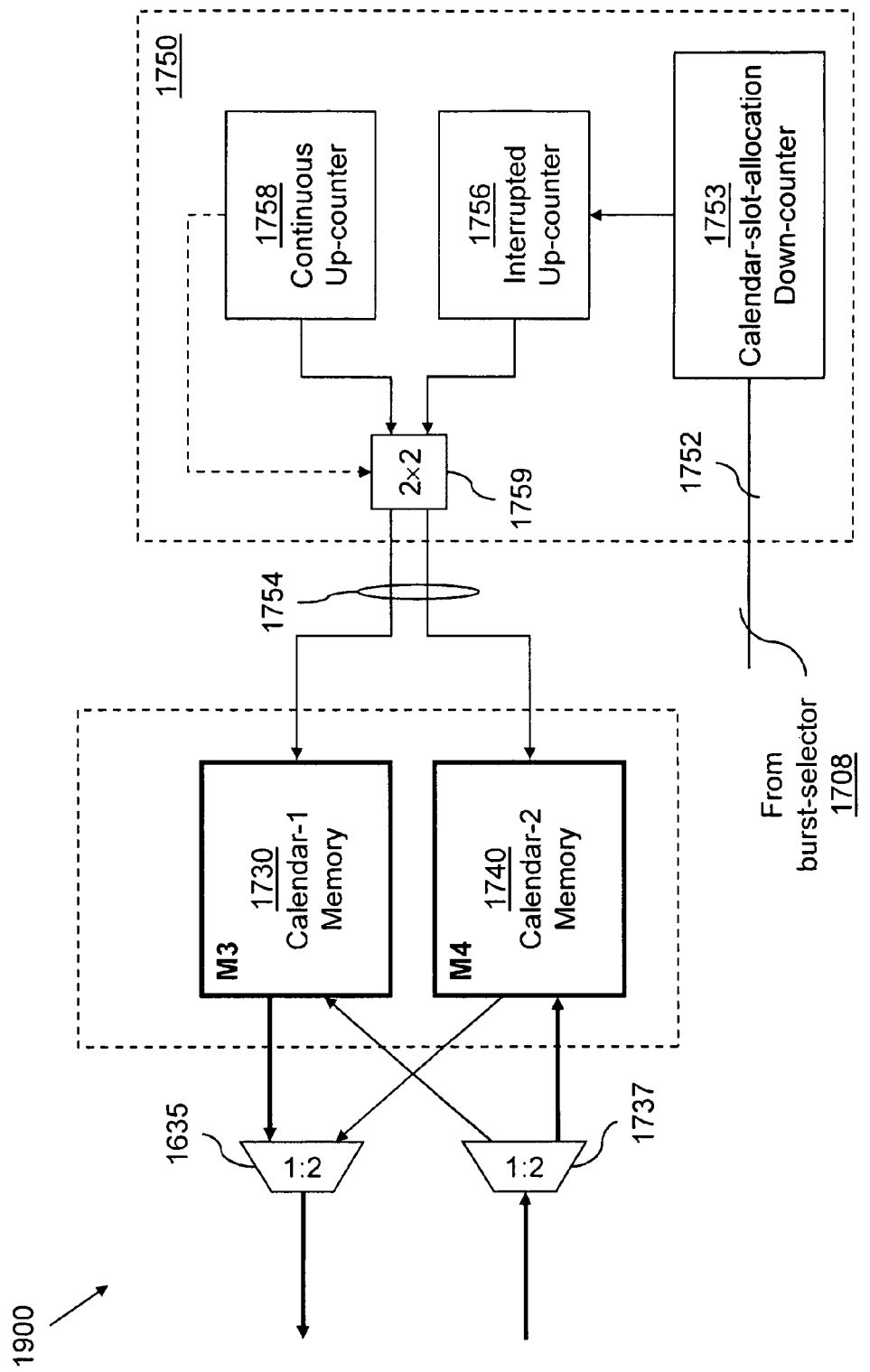
FIG. 19 illustrates a calendar-addressing unit used in the devices of FIG. 17 and FIG. 18, in accordance with an embodiment of the present invention.

FIG. 19 illustrates the calendar-addressing unit 1750 of FIGS. 17 and 18. The calendar-addressing unit 1750 is used in devices 1700 and 1800 and it suffices to describe it with reference to device 1700. While one of the calendar memories 1730/1740 is used for burst-transfer regulation, the other calendar may be updated to reflect new flow-rate allocations. A down counter 1753 and two up counters 1756 and 1758 are used for calendar addressing. Down counter 1753 and up counter 1756 are triggered with a period equal to a calendar time slot. Up counter 1758 is triggered by the reading of down-counter 1753. The reading of a continuous up-counter 1756 is used to determine the read addresses in the operating calendar 1730 or 1740. Down-counter 1753 and up-counter 1758 are used to determine the write-addresses in the calendar being updated. Burst flow-rate controller 1708 (FIG. 17) determines the required number $v_j$ of calendar slots per calendar cycle for each burst stream j, $0 \leq j < S$, where S is the total number of burst streams that may have bursts in the burst buffer. The number $v_j$ may vary in successive calendar cycles even if the flow-rate for its corresponding burst stream remains constant. This may occur when the burst stream requires a non-integer number of calendar slots per calendar cycle. The down counter is reset at the value $v_j$ and its reading decreases by one with every calendar-slot trigger. The reading of the down counter is used to trigger up counter 1758.

A passive 2×2 connector 1759 connects up-counter 1756 to calendar-memory 1730 and up-counter 1758 to calendar memory 1740 during a calendar cycle and in a subsequent calendar cycle connects up-counter 1756 to calendar-memory 1740 and up-counter 1758 to calendar memory 1730. Connector 2×2 is triggered to change connectivity every calendar cycle. The trigger may be derived from the reading of the continuous up-counter 1756, or in many other ways well known in the art.

In order to equalize the periods between successive scanning instants of each burst stream, the calendar addressing unit 1750 may be operated in one of two modes:

In the first mode, the output of the interrupted up counter is used directly to address the calendar memory 1730 or 1740 that is being updated. The output of the continuous up counter 1756 is mapped onto an address according to a one-to-one mapping function. A preferred one-to-one mapping function is a reverse-binary function, where a reverse binary function converts a first number to a second number such that the binary representation of said second number is derived from the binary representation of said first number by reversing the bit order, with the least significant bit of the first number becoming the most-significant bit of the second number. Thus, the calendar slots allocated to a burst stream occupy consecutive calendar slots but are read in a different order.

In the second mode, the output of the interrupted up counter 1758 is mapped onto an address according to a one-to-one mapping function, such as the reverse-binary function described above. The output of the continuous up counter is used directly to address the operating calendar memory 1730 or 1740. Thus, the calendar slots allocated to a burst stream occupy dispersed calendar slots and the operating calendar slots may, therefore, be read sequentially.

The one-to-one mapping function attempts to reduce the variance of the time interval between successive records for each burst stream.

It is important to note that a data burst generally includes several packets and each packet may be segmented into data segments of equal size with a last data segment of each packet being null padded with null bits. The null bits are preferably removed from a dequeued data burst and the rate regulation is preferably based on actual information bits only. The information bits include data headers generated at source. Device 1700 for burst-transfer regulation differs from the device for ATM-cell transfer regulation described in U.S. Pat. No. 6,034,960 in two aspects:

(1) in device 1700, a data burst is transferred only when a corresponding burst stream accumulates sufficient credits while in the ATM-cell transfer regulation device, a data cell is transferred when a corresponding stream identifier is read from a calendar, credits being earned with time, and (2) in device 1700, the weight of a data burst is a function of the number of information bits in a waiting burst, or a specified number of information bits for a future burst formation, while in the ATM-cell transfer regulation device the weight of a data cell has a fixed value which is independent of the information content of the data cell.

Notably, device 1700 determines dequeueing time instants for bursts already waiting in a data buffer while device 1800, for generating burst-transfer permits, determines dequeueing time instants for bursts to be formed, according to a size specified in each permit.

In summary, device 1700 of FIG. 17 regulates the flow rate of a plurality of burst streams having bursts of varying burst sizes. Each burst has an identifier associated with a respective data stream. The device comprises (1) a burst flow-rate controller 1708, (2) a flow-rate-allocation memory 1710 containing flow-rate allocations for each of the plurality of burst streams, (3) a burst-record memory 1720 containing a record of a selected burst from each active burst stream, (4) a first calendar memory 1730 organized into a predefined number of calendar slots, (5) a second calendar memory 1740 organized into a predefined number of calendar slots, and (6) a burst-transfer memory 1733 containing identifiers of data bursts eligible for transfer to a subsequent processing stage, such as a scheduling stage.

The burst flow-rate controller 1708 is operable to determine burst dequeueing instants from the burst buffer such that for each data stream, the flow-rate allocation multiplied by the time interval between successive instants equals the size of a specified burst selected during said time interval. The weight of a burst may be represented by its length (size), i.e., the number of bits it contains. Alternatively, the weight of a burst may be represented by its dequeueing time from its data buffer. For example, the weight of a burst of 10 kilobits transmitted on a 10 Gb/s channel may be represented as 10 kilobits or one microsecond. Either representation may be used in operating device 1700. The number of calendar slots representing a burst is the ratio of the burst size to the size of a data segment or, equivalently, the burst-transfer duration divided by the calendar time-slot duration.

The burst flow-rate controller includes (a) means for creating a vector of pointers, each entry of which corresponding to a burst stream, and indicating an address in said burst buffer of a next-burst to be transferred to said result buffer and the length of said next-burst to be placed in respective entries 1624, (b) means for creating a vector of credits, each entry 1626 of which corresponding to a burst stream, (c) means for creating a calendar having a predefined number of calendar slots each of which containing an identifier associated with a respective burst streams, with each of the burst streams given an allocated number of calendar slots, and (d) means for continually reading selected ones of the calendar slots. For each data stream identifier read from a selected calendar slot, the burst flow-rate controller 1708 is further operable to increase a previous entry of a credit vector credit, by a predetermined credit unit. The credit unit can be the size of a data segment, if the burst weight is selected to be the burst size. Alternatively, the credit unit can be the calendar time-slot duration. Preferably, the burst weight is normalized and expressed as a number of calendar slots. The burst flow-rate controller 1708 then determines a weight of a next-burst using said vector of pointers. If the credit exceeds the weight of the next-burst or a fraction Φ of the weight of the next burst, the next-burst is transferred from the burst buffer to the result buffer and the new credit is reduced by length of the next-burst.

Device 1800 of FIG. 18 is used for structuring each data stream into data bursts and regulating the transfer of the data bursts. Each data stream is assigned a nominal burst size determined as a function of a nominal flow rate of the data stream. Device 1800 comprises (1) a burst transfer-permit controller 1808, (2) a flow-rate-allocation memory 1810 containing flow-rate allocations for each of said plurality of burst streams, (3) a burst-record memory containing a record of a burst-descriptor from each active burst stream, (4) a burst-size calculator (not illustrated) that computes a nominal burst size for each data stream, (5) a first calendar memory 1830 organized into a predefined number of calendar slots, (6) a second calendar memory 1840 organized into a predefined number of calendar slots, and (7) a burst-permit transfer memory 1833 containing burst-transfer permits to be submitted to a subsequent processing stage such as burst scheduling.

The flow-rate allocations are received from an input port of the switching node hosting device 1800. The burst-size calculator determines a burst-size for each data stream as a function of the flow-rate allocation for the data stream. The burst transfer-permit controller 1808 is operable to determine burst-descriptor generation instants such that, for each data stream, the flow-rate allocation multiplied by the time interval between successive generation instants equals the length of a specified one of said data bursts selected during said time interval.

The burst transfer-permit generator includes (a) means for determining a nominal burst size for each data stream as a function of its flow rate, (b) means associating a credit with each data streams and updating the credit, (c) means for creating a calendar having a predefined number of calendar slots each of which containing a respective data stream identifier wherein each of said plurality of data streams is given an allocated number of calendar slots, and (d) means for continually scanning selected ones of the calendar slots to read data-stream identifier. For each data stream identifier, the burst transfer-permit generator is further operable to increase a previous entry of a credit by a predetermined amount, and if the credit exceeds the nominal burst size for the data stream, a burst-transfer permit comprising a data stream identifier and a nominal burst size is enqueued in the burst-descriptor memory and the new credit is reduced by the nominal size of the data burst.

Figure 20:
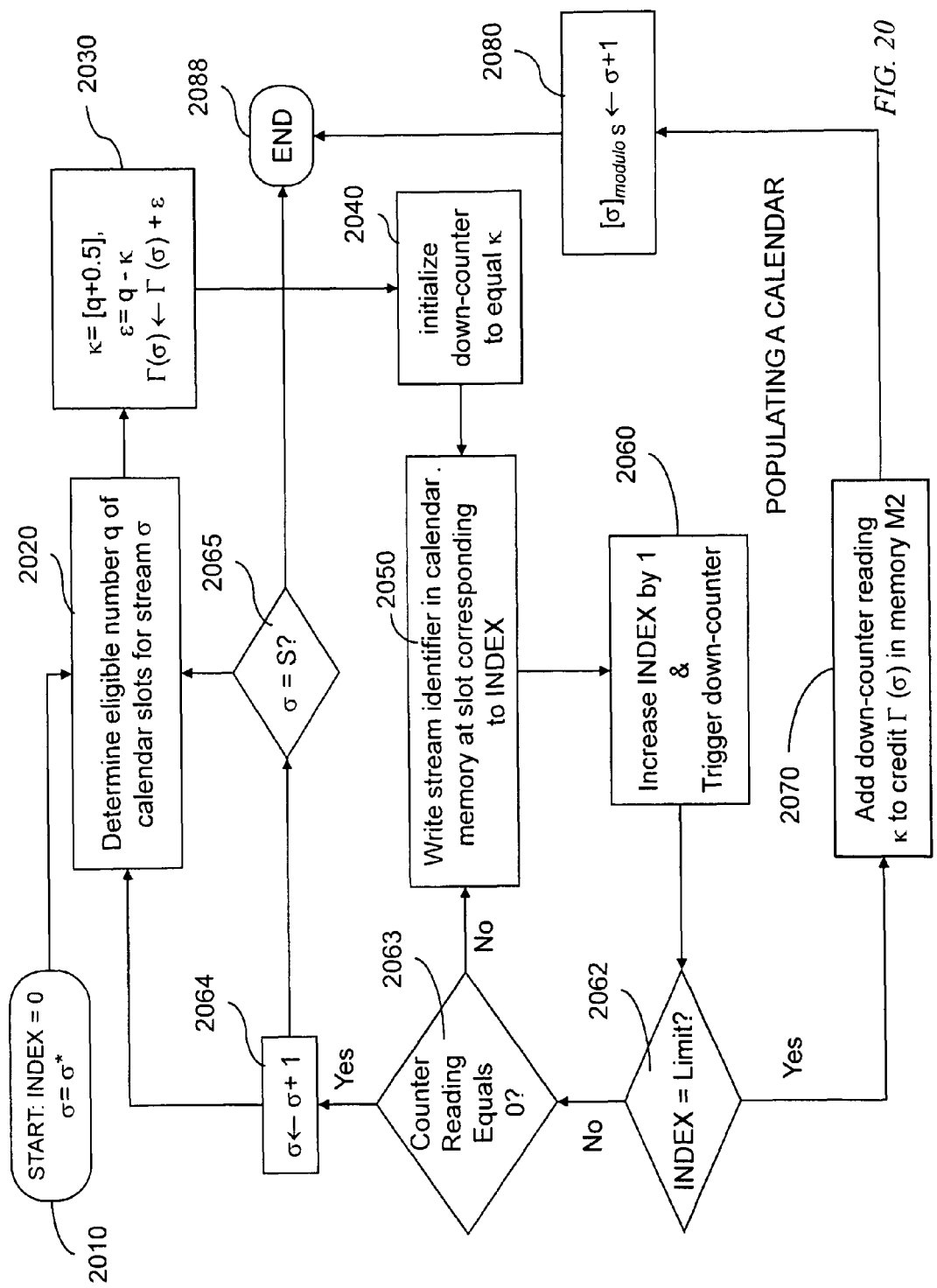
FIG. 20 is a flow chart illustrating a process of populating a scheduling calendar for the device of FIG. 17 of the device of FIG. 18, in accordance with an embodiment of the present invention.

FIG. 20 illustrates the main steps of populating the calendars 1630/1640 used in FIG. 17 or FIG. 18. In step 2010, calendar cell INDEX is initialized to zero and a data-stream index σ is initialized to a value σ* determined at the end of an immediately preceding process of populating calendars 1630/1640. In step 2020, the number q of calendar slots for stream σ is determined. The number q is generally a real number, and hence can not always be represented in a calendar having a finite number of cells. For example, with R=10 Gb/s, ρ=20 Mb/s, and S=8192, the number q is determined as q=S×ρ/R=16.384 calendar slots. In step 2030, a rounded value is derived from q, by simply rounding to the nearest integer κ which may be higher or lower than q. The rounding deviation, which may be positive or negative, is determined and added to a credit of stream a denoted Γ(σ). In step 2040, a down counter is initialized to equal κ and in step 2050, an identifier of stream a is written in location INDEX of the calendar being populated; 1630 (memory 1730) or 1640 (memory 1740). In step 2060 the INDEX is increased by one and the down counter is triggered, hence its reading is decreased by one. In step 2062, if the INDEX equals a predetermined limit, then control is transferred to step 1670. Otherwise, step 2063 is considered. The limit preferably equals the number of calendar slots in calendar 1630/1640. In step 2070, the down counter reading is added to the credit of Γ(σ) of stream σ and in step 2080, the next stream, σ+1, modulo S, is considered and the process ends, so that a subsequent calendar-populating process starts at the stream number where a previous process ends. If in a single populating process all streams are considered, a new populating process would always start at stream σ=0. If, in step 2063, it is determined that the down counter reading has reached zero, control is transferred to step 2064, otherwise, the stream identifier is written in location INDEX in the calendar memory 1630/1640 (step 2050). In step 2064, the next stream σ+1 is considered and if in step 2065 it is determined that all data streams have been considered, the process is terminated in step 'END'. If the new stream σ+1 is not the last stream, the entire process starting with step 2020 is repeated.

Figure 21:
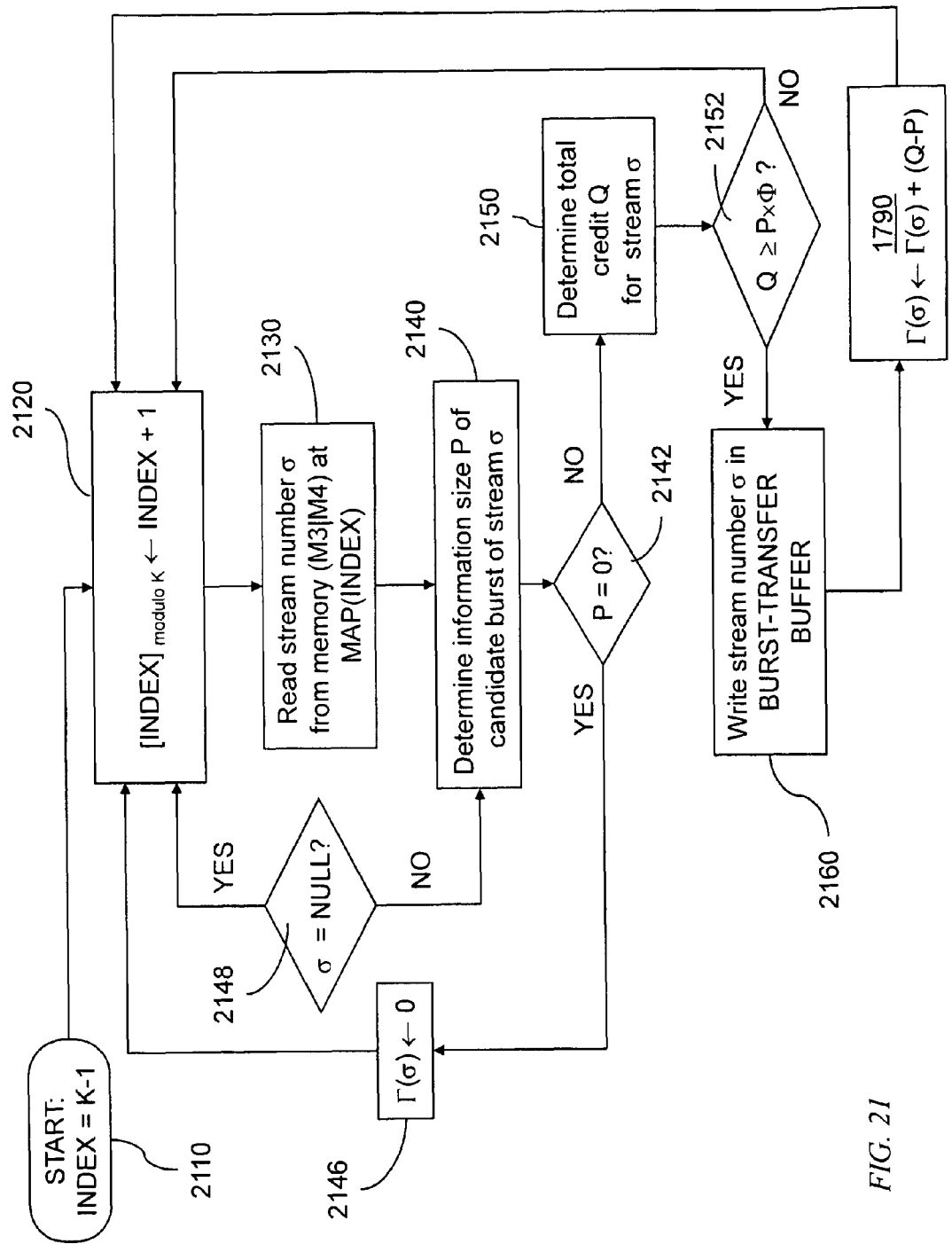
FIG. 21 is a flow chart illustrating the operation of the device of FIG. 17 or the device of FIG. 18, in accordance with an embodiment of the present invention.

FIG. 21 is a flow chart describing a process of selecting data segments to be dequeued from a data buffer holding segmented data bursts. One of the calendars 1630/1640 is scanned while the other is being updated, i.e., populated according to new time-slot allocations for at least one of the data streams as described above with reference to FIG. 20. In step 2110, the index of the operational calendar is initialized at (K−1), K being the number of calendar slots, with the calendar slots numbered 0 to (K−1). In step 2120, the index is increased by one to produce an updated index. The index is cyclic and, hence, the index is set equal to zero when the updated index takes a value equal to K. In step 2130, a stream number a is read from the operational calendar memory (M3 or M4, 1630/1640) at a location determined as a function of INDEX (denoted MAP (INDEX)). The function is a one-to-one mapping function that attempts to equalize the spacing of entries corresponding to the same data stream in the operational calendar 1630 or 1640. In step 2140, the true size, P, of a candidate burst belonging to stream σ is determined. The true size is a measure of the information bits in the data segments of the data burst. If there is no burst waiting, the credit of stream σ is reduced to zero, and a stream indicated at a subsequent INDEX is considered. A data stream earns a credit unit every time its identifier is encountered in scanning the operational calendar. If, in step 2142, it is determined that there is a burst, belonging to stream σ, then at step 2150 the total credit of stream a is determined by adding a credit unit to Γ(σ) and, if the determined total credit exceeds the burst size P, the burst is considered eligible for dequeueing. Alternatively, a waiting burst may be eligible for dequeueing before it accumulates sufficient credits, i.e., if Q is less than P. A data stream may borrow a credit of (1−Φ))×P, where Φ is a fraction less than 1 as described earlier, to enable a waiting burst to be served when its credit Q is less than its size P, and the data stream would have a negative credit after the burst is dequeued. Thus, in step 2152, the value of Q is compared with the product P×Φ and if Q is greater than or equal to P×Φ, the stream number σ is written in the burst-transfer buffer at step 2160, a new credit is computed as (Q−P), which can be positive, zero, or negative, and added to the stream credit Γ(σ) in step 2190. Otherwise, at step 2152 if Q is less than P×Φ, the burst has to wait until its corresponding stream number is encountered again in scanning the operational calendar 1630 or 1640, and a subsequent INDEX is determined in step 2120. A burst is dequeued by placing its pointer in a burst-transfer buffer and moving the pointer to a subsequent waiting burst, if any.

To summarize, in a data buffer receiving data segments each belonging to one of several data streams, regulating the rate of transfer of information bits for each data stream is implemented by providing a calendar having a plurality of calendar slots, granting each data stream a respective share of said calendar slots, and permitting the transfer from the data buffer of information bits of each data stream at a rate commensurate with its respective share. The respective share need not be an integer number and, therefore, an allocated number of calendar slots per data stream may vary in successive cycles of reading the calendar to render a mean value of the number of allocated calendar slots approximating the granted share. Either of two methods of populating the calendar 1630/1640 may be used.

In one method, the allocated number of calendar slots given to a data stream occupies consecutive calendar slots and the calendar slots are read according to a one-to-one mapping of a time-slot number as read from a cyclic counter to a calendar slot.

In another method, the allocated number of calendar slots given to a data stream occupies calendar slots determined by a one-to-one mapping function of consecutive time slots numbers as read from a cyclic counter and the calendar slots are read sequentially.

Flow-Rate-Regulation Devices in Nodes Switching Variable-Size Bursts

A common-memory edge node relies on massive data parallelism to enable high-speed data storage and retrieval. Data is stored in a common-memory comprising parallel memory devices which are identically addressed. Portions of a data segment are stored in corresponding addresses in the parallel memory devices constituting the common memory. During an access cycle, each of a plurality of input ports accesses the common memory to write a data segment and each of a plurality of output ports accesses the common memory to read a data segment. Writing a new data segment would be prohibited only if the entire common-memory storage is in use. This condition is avoided by appropriately selecting the storage capacity of the common-memory using analytical methods well known in the art. In a common-memory edge node, there is no internal contention and each stored data segment is guaranteed a path to its desired output port. Rate regulation would then be applied at each output port of the common-memory edge node. Data release from the common memory to any output port may be regulated by the high-speed rate regulator described earlier with reference to FIG. 17 or FIG. 18.

Prior-art common-memory switching devices use fixed size data blocks, such as ATM (asynchronous transfer mode) cells or STM (synchronous transfer mode) data blocks. For example, U.S. Pat. No. 5,144,619 titled "Common Memory Switch for Routing Data Signals Comprising ATM and STM Cells", issued to Munter on Sep. 1, 1992, describes a common memory switch that handles data segments of a fixed size. U.S. Pat. No. 6,118,792 titled "Method and Apparatus for a Flexible-Access Rate Common-Memory Packet Switch", issued on Sep. 12, 2000 to Beshai, describes a common-memory switch having a plurality of input ports and a plurality of output ports where the sum of the capacities of the input ports exceeds the internal capacity of the switch as determined by the speed of the common memory, and the sum of the capacities of the output ports may also exceed the internal capacity of the switch. An implicit concentration stage is realized by adaptively allocating permissible access rates for each input port. Each input port transfers data segments of equal size to the common memory at specified time slots and the allocated access rate of each port is based on the fixed data-segment size. The allocated access rate for an input port applies to the total traffic received at the input port and no mechanism is provided to account for the actual content of each data segment. The flexible access rate yields an efficient switch. The flexible common-memory switch can further be enhanced by sorting data segments waiting the common memory according to predefined data streams and implementing a rate-controlled data-segment release rate based on the actual data content of each data segment waiting in the common memory.

Both U.S. Pat. Nos. 5,144,619 and 6,118,792 deal strictly with fixed-size packets. U.S. Pat. No. 6,118,792 offers the added feature of rate regulation at the input ports and efficient sharing of the switch core. The present disclosure uses the device of FIG. 17 or FIG. 18 in conjunction with prior-art common-memory switch structures to create a common-memory edge node that handles variable-size packets and provide rate regulation based on actual information content instead of total data-block sizes.

Data Organization

To facilitate switching, time is preferably organized into time frames each comprising a number J of time slots of Δ seconds duration each. A data stream having a flow rate of R bits per second may be divided into data segments each data segment containing R×Δ bits, or into data frames each data frame containing S data segments, hence R×Δ×J bits. A data stream organized in data segments may be assigned designated time slots in a time frame at input and switched to designated time slots at output. The number of designated time slots at output may exceed the number of designated time slots at input in a multicast switching node. Traditionally, a data stream assigned a designated time slot in a predefined time frame has been referenced as a time-division-multiplexed (TDM) frame. A data stream organized in data segments may also be assigned time slots that do not necessarily bear any specific relationship to a time frame or any time reference. A stream of packets, generally of different sizes, and arriving at random may be segmented into data segments of equal size and switched as such within a switching node where, at output, the switched data segments are reassembled into their original packet format. The familiar Asynchronous Transfer Mode (ATM) segments packets of generally variable sizes into data segments called 'cells' and switches the cells within a switching node. In ATM, however, cells are reassembled into packets at the receiving end and not necessarily at the output of the switching node that receives the original packets. ATM cells are not required to follow a strict time reference. An ATM switching node, however, must attempt to reduce the cell delay variation to reduce packet-transfer jitter. When a data stream is organized in a TDM format, the TDM format is also referenced as a synchronous transfer mode (STM). Data segments that are aperiodically switched preferably carry an identifying header. In contrast, data segments that are periodically switched need not carry identifiers and are recognized in each switching node they traverse by the time slots they occupy in a recognizable data frame.

Figure 22:
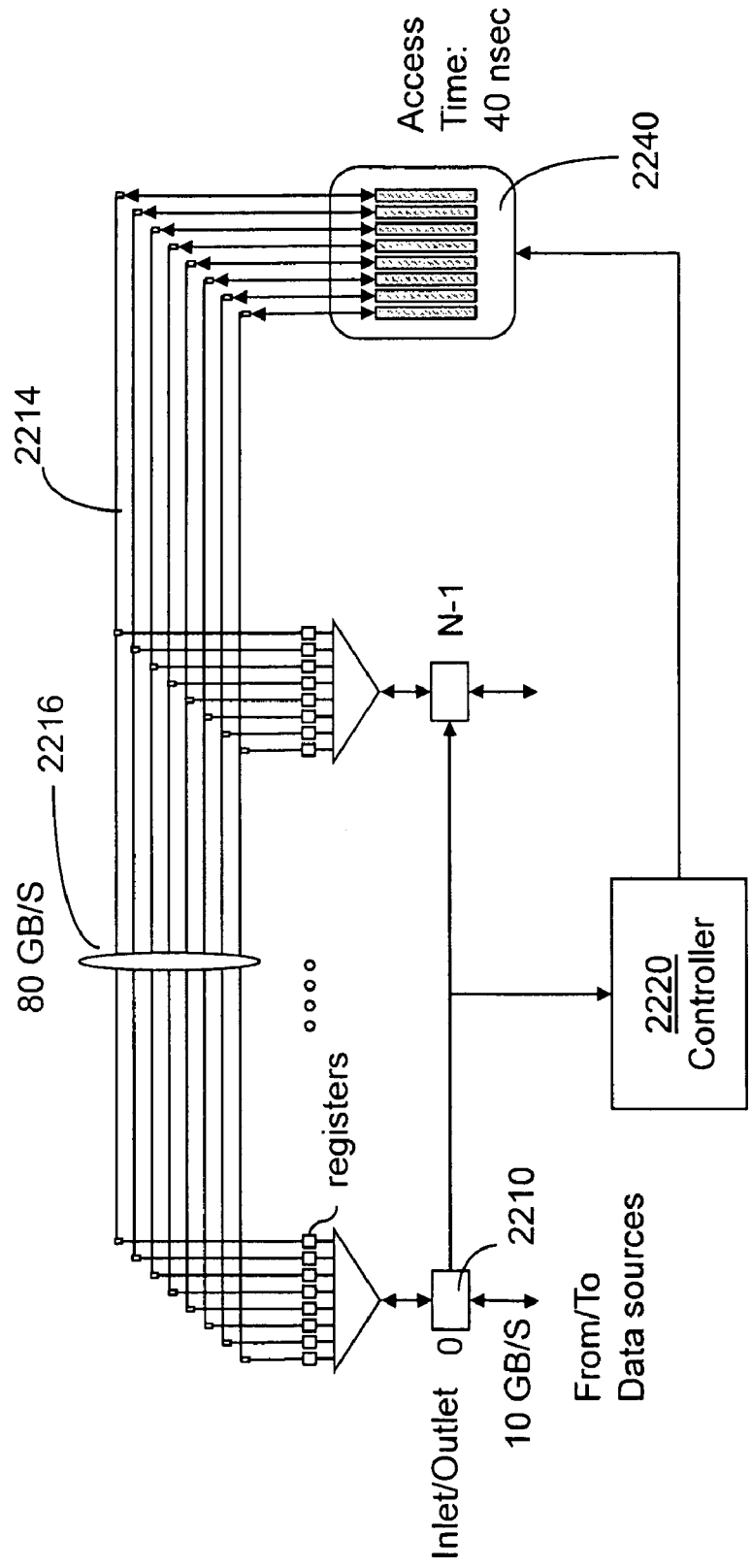
FIG. 22 illustrates a prior art flow-rate-controlled common-memory switch.

FIG. 22 illustrates a prior-art common-memory switch. Several switch modules 2210 cyclically access a bus 2216 to write a data segment in a shared memory 2230 and read another data segment from the shared memory 2240. During a memory-access cycle, each switch module accesses the shared memory 2240 during a respective designated time slot. A switch module 2210 may continuously receive data from subtending data sources (not illustrated) and continuously transmit data to subtending data sinks (not illustrated). However, the switch module accesses the bus to transfer data to, and receive data from, the shared memory 2240 during a designated time slot in each memory-access cycle. The switch module stores data to be written in shared memory 2240 and data read from shared memory 2240 in registers as indicated in FIG. 22. A controller 2220 may be used to regulate the rate of data transfer from the switch modules 2210 to the shared memory 2240.

Figure 23:
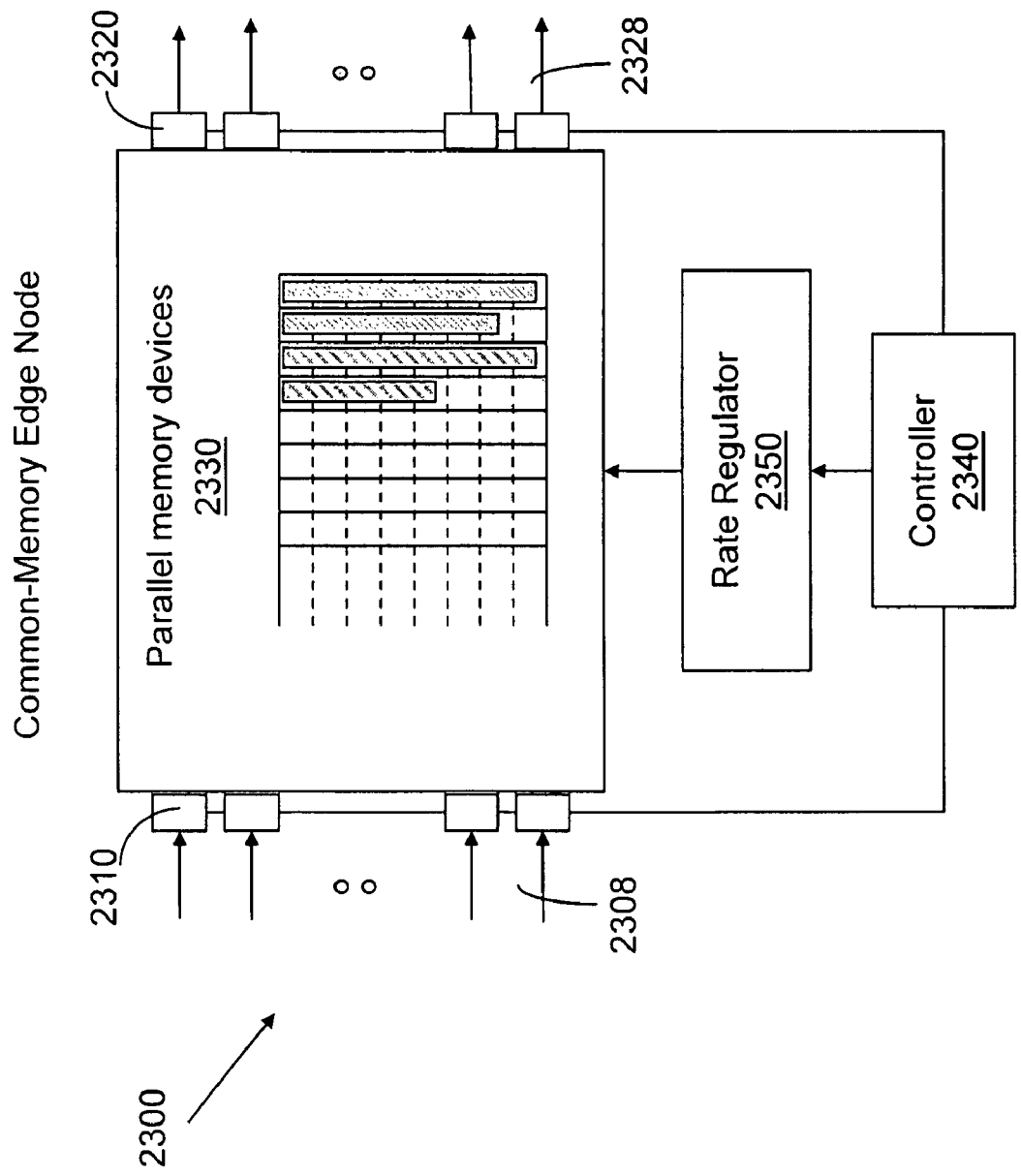
FIG. 23 illustrates a common-memory edge node provided with an edge-node controller that includes a rate regulator for regulating data transfer according to information-bit content, in accordance with an embodiment of the present invention.

FIG. 23 illustrates a common-memory edge node 2300 in accordance with the present invention. The node comprises M>1 input ports 2310, N>1 output ports 2320, and a common-memory 2330 that comprises a plurality of parallel memory devices (not illustrated in FIG. 23). In general the number M of input ports need not be equal to the number N of output ports. Each input port is preferably paired with an output port with which it shares memory and control, thus forming a dual port. The input ports and the output ports (i.e., the dual ports) exchange control messages with edge controller 2340. Each input port 2310 receives data packets from traffic sources and aggregates packets of the same destination sink node into data segments of equal width (size). The width of a data segment is dictated by the width of the common memory 2330. For example, a data segment may be 512 bytes wide if the combined width of the parallel memory devices constituting the common memory 2330 is at least equal to 512 bytes. Preferably, each data segment also contains a few bytes for enqueueing and dequeueing control. An incomplete data segment, having less than 512 bytes in the above example, still occupies the same storage in the common memory 2330.

The input ports 2310 and output ports 2320 access the common memory 2330 cyclically and is, therefore, contention free. The cyclic period, T*, is determined by the number of input ports and memory access time. With input and output ports operated at the same speed (bit rate), and with a write-access duration approximately equal to a read-access duration, each port, input or output, can access the common memory 2330 once every cyclic period of 2×N access durations, 2×N being the combined number of input ports 2310 and output ports 2320. With N>1 input ports and N output ports, and with each input port 2310 and each output port 2320 given an access duration of 10 nanoseconds for example, the cyclic period T* equal 20×N nanoseconds. With N=16, for example, the cyclic period is 320 nanoseconds, the total capacity is 160 Gb/s, and minimum width of the common memory is then 160×20=3200 bits (400 bytes).

The input ports 2310 may have different access rates. For example, in a node having 16 dual ports, an access cycle may have 32 access intervals with four ports assigned one access interval each, eight ports assigned two access intervals each, four ports assigned three access intervals each. Likewise, the output ports 2320 may be assigned different access-intervals, independent of the input-port assignment; the number of access intervals for an input port 2310 and an associated output port 2320 need not be equal.

As depicted in FIG. 23, a rate regulator 2350, under control of edge-node controller 2340, determines the instants of release of the data segments in the common memory 2330 based on flow-rate allocations for each data stream. The flow-rate allocations are normally based on actual information content and the rate regulator 2350 differs from conventional rate regulators in that it commands the release of data segments based on their actual information content rather than the sizes of the data segments. Such a rate regulator must operate at a high speed. In the above example of 160 Gb/s switch, using data blocks of 400 bytes each, the rate of release of data segments is 50 million data blocks per second. Rate regulator 2350 may be based on the rate-regulation apparatus of FIG. 17.

The capacity of a common-memory switch 2300 with a memory width of W bits and memory access time (read plus write) of $\delta$ seconds is $W/\delta$. If the switch has N input ports and N output ports, with each input port receiving data at a rate of R bits per second and each output port transmitting data at the same rate of R bits per second, then the capacity C of the switch is $C=W/\delta \geq N \times R$. In a common-memory switch 2300, the input ports 2310 and output ports 2320 access the common memory 2330 in a cyclic manner and there is no internal contention. However, segmenting input packets results in segmentation waste, as described earlier, and an internal expansion (also called dilation) is required to offset the segmentation waste. An internal expansion can be realized with a wider memory, having W bits, so that $W>N \times R \times \delta$ as some segments would be partially populated with information bits and padded with null bits. The ratio $W/(N \times R \times \delta)$ is decided by the segmentation method.

An internal expansion is preferably provided by increasing the width of the common memory. Increasing the width from 512 bits to 640 bits, for example, provides each input port with an inner capacity that is 1.25 times the outer capacity to offset the waste of incomplete data segments. At the output ports, the data segments are converted into a serial bit stream and any null padding is removed. Several techniques, known in the art, may be used to reduce the overhead of null padding.

If packets are sorted at each input port 2310 according to their designated output ports 2320, and if packets directed to the same output port are concatenated and parsed at output, then the worst-case packet-segmentation waste occurs when the packets at an input port 2310 are predominantly directed to a single output port 2320, with a negligible, but positive, packet flow directed to each other output port 2320. The packets received at each input port 2310 are delayed for a time interval D to accumulate sufficient data to form a data segment.

The capacity R of an input port 2310 that is less than the ratio W/T, where W is the width of the common-memory edge node 2300 and T is the common-memory period, which is the time required for each input port and each output port to access the common-memory during each common-memory cycle, so that an internal expansion is realized:

$$(R \times T)/W \leq 1-(N-1) \times T/D,$$

where N is the number of output ports 2320. The value of T is determined as:

$$T=M \times \delta_1 + N \times \delta_2,$$

M being the number of input ports, N the number of output ports, $\delta_1$ the write-access duration, and $\delta_2$ the read-access duration With M=N=64, and $\delta=\delta_1+\delta_2=20$ nanoseconds, the required expansion ratio to handle a worst-case queueing delay of 1 millisecond (D=1 millisecond), is approximately 1.088.

Temporal Burst Switching

A burst is a data block that contains at least one packet. A burst may contain numerous packets, possibly from different users, that have a common destination and belong to a common data stream. Consider an ingress module in a centralized or distributed switching node. The ingress module has a single input channel and a single output channel. The ingress module receives a signal from an input channel and transmits a signal over an output channel. A high-capacity channel can be time shared by a large number of data streams, each data stream having bursts directed to the same destination. Successive data bursts received from an input channel may then belong to different data streams and may be directed to different output channels. The data bursts may have different sizes. One way to provide reliable communications in a network of signal switches is to regulate the rate at which each data stream flows. The flow rate is preferably measured in terms of bits per second rather than bursts per second because bursts may have different sizes.

The bursts of different data streams are not necessarily dequeued from an ingress module in the same order in which they formed at the ingress module. Rather, the bursts may be dequeued at instants of time required to satisfy certain constraints. Such constraints include a requirement to regulate the flow rate of each data stream. A burst may also have to wait for a free output port in a subsequent switching stage. To facilitate the process of dequeueing the bursts of each stream, the received bursts are sorted according to the data streams to which they belong. In order to regulate the flow rate of each data stream an output rate controller is required to determine the time instants at which the bursts of each stream should be dequeued. To comply with scheduling requirements, the data switch may be provided with means for receiving and interpreting a burst transmission schedule from a subsequent switching stage. The process of dequeueing bursts at arbitrary instants of time is hereinafter referenced as temporal switching.

In order to facilitate switching bursts within a data switch, each burst may be segmented into data segments of a predefined size; W bits. A last data segment in each segmented burst may contain less than W bits and is then padded with null bits. Each data segment, then, contains a number of information bits not exceeding a predefined upper bound W. The data segments of bursts received from each input channel may be stored in a memory device.

The segments of a burst may be stored at arbitrary addresses in a memory device. The memory addresses need not be consecutive. However, the segments of each burst must be dequeued consecutively. To manage the enqueueing and dequeueing of bursts, the bursts of each data stream are linked in a manner well known in the art so that they can be accessed in a predetermined order. Therefore, when a burst contains more than one data segment, the data segments of the burst may be chained so that they can be read consecutively. Thus, the data segments are stored in a memory device according to the linking and chaining order, as described above with reference to FIGS. 5 to 10. The addresses of data streams in memory are indexed. Data bursts are retrieved from the memory device in an order determined according to the pre-assigned stream flow rate of each of the data streams. The order is determined by a rate-regulation device associated with the memory device. At output, the null bits are removed from each data segment in the process of retrieving the bursts from the memory device.

Temporal switching of variable-size bursts under flow-rate control must take into account the effect of null-padding. The allocated flow-rate for a burst stream excludes null bits and applies only to the information bits of a segmented burst. This requires that the number of information bits in each data segment be recorded and flow rate be computed according to the information bits only. The access capacity of the memory devices storing the segmented bursts must exceed the combined flow-rate allocation of the multiplicity of data streams by a factor determined by the proportion of the null bits in the data segments. The access capacity being the maximum segment width W divided by the minimum time required to write and read a data segment.

Spatial Burst Switching

The ingress module described above has a single input channel and a single output channel. A general signal switch receives signals from a plurality of input channels and selectively directs each received signal to one of a plurality of output channels. A common-memory switch having multiple input channels and multiple output channels can be viewed as an extension of the ingress module described above, which has a single input and a single output. Each of the multiple input channels cyclically access the memory device to write a predefined number of data segments and each of the output channels cyclically access the memory device to read a predefined number of data segments. This process constitutes spatial switching. A combination of temporal switching and spatial switching enables the realization of fine-granularity switching. Temporal switching enables time-sharing of a channel by several data streams. Without temporal switching, an entire channel must be assigned to a data stream. The use of high-capacity time-shared input and output channels enables the realization of an economical high-capacity network.

In the common-memory switch, the succession of bursts is received from at least two input channels, each of which having a corresponding input-channel capacity. The input channels access the memory device in an arbitrary input-access order, such as a cyclic order. Bursts are retrieved by at least two output channels, each of which having a corresponding output-channel capacity. The output channels may access the memory device in an arbitrary output-access order, such as a cyclic order.

Internal-Expansion of the Common-Memory Switch

During a common-memory access cycle, each input ports gains write-access and each output port gains read-access to the common memory. With input ports and output ports operated at the same speed, and with a write-access interval of $\delta_1$ and read-access interval of $\delta_2$, the period T of a common-memory access cycle is determined as: $T \geq (M \times \delta_1 + N \times \delta_2)$, where M is the number of input ports and N is the number of output ports. Consider an input port that receives, from data sources, data packets at a flow rate close to the capacity of the input port with a high proportion of the data destined to a specific output port and an insignificant, but non-zero, proportion of the data destined to the remaining (N−1) output ports. Consider also a delay constraint where no data packet can be delayed at the input port for a period exceeding $D_1$ time units. Under such constraint, at least one data packet is sent to each of the (N−1) output port each $D_1$ time units, i.e., the input port transmits (N−1) under-utilized data segments occupying (N−1)×T time units during the $D_1$ interval. To compensate for this waste, resulting from the permissible-delay constraint, the common memory speed must exceed the combined input speed by the ratio: D/(D−(N−1)×T). With M=N, which would typically be the case, $T = N \times (\delta_1 + \delta_2) = N \times \delta$, $\delta$ being the memory access time required to write and read a data segment.

Capacity of the Common-Memory Switch

Referring again to FIG. 23, a common-memory edge node 2300 adapted for flow-rate regulation is illustrated. The edge node 2300 comprises M>1 input ports 2310, N≧1 output ports 2320, a memory device 2330, of width W, storing data segments each having a segment size of W bits, and a controller 2340 that is associated with an output flow-rate regulation device 2350. Each of the data segments is associated with one of a plurality of predefined data streams. The controller 2340 is adapted to assign a nominal flow-rate for each of the plurality of predefined data streams. The flow-rate regulation device 2350 is adapted to use the number of information bits in each data segment and the nominal flow rate of a data stream to which each data segment belongs to select data segments for dequeueing. The controller 2340 may have a single flow-rate-regulation device to govern the dequeueing from all output ports 2320. The controller 2340 may also use two or more flow-rate-regulation devices each covering a subset of the output ports 2320; perhaps one for each output port 2320. An output port 2320 collates information bits from different data segments to form bursts containing only information bits so that only the information bits in each data segment are transmitted by an output port 2320. It is noted that the term 'information bits' refers to both payload data and any required headers but excludes any null padding that may be inserted to facilitate switching within a node.

To form data segments, each input port 2310 receives data bursts, associates each received data burst with one of the predefined data streams and delays the received data packets of each of the predefined data streams for a time interval not exceeding an upper bound D to accumulate sufficient data to form a data segment.

The plurality of input ports 2310 transfers data to the memory device at a rate that is less than the ratio W/δ so that $$\sum_{j=1}^{M} r_j \leq (W/\delta) \times (1 - (N-1) \times T/D),$$

where D>(N−1)×T is a permissible segment queueing delay at any of the M input ports 2310, and $r_j$, 1≦j≦N, is the rate at which an input port 2310 transfers data to the common memory 2330. The period T of the common-memory-switch is determined as: T=M×$\delta_1$+N×$\delta_2$, where $\delta_1$ is the write-access time and $\delta_2$ is the read-access time of the common memory. With M=N, and $\delta_1$=$\delta_2$, T=N×δ, where δ=$\delta_1$+$\delta_2$ is the time required to access the common memory 2330 to write and read a data segment. Thus, the width W of the common-memory is determined as:

$$W \geq \delta \times \sum_{j=1}^{M} r_j / (1 - (N-1) \times N \times \delta / D).$$

With input ports 2310 and output ports 2320 of the same speed (bit rate) R, each of the input ports 2310 preferably has an inner capacity to the common memory 2330 that exceeds R to offset the effect of segmentation waste under extreme spatial traffic imbalance. The required width W of the common memory 2330 is then determined as:

$W \geq (R \times M \times \delta)/(1-(N-1) \times N \times \delta/D)$.

With M=64, δ=20 nanoseconds, D=1 millisecond, an expansion of 1.0877 would be required.

In an additional embodiment, at least two of the M input ports 2310 have different bit-rate capacities, and at least two of the N output ports 2320 have different bit-rate capacities. Each input port 2310 may be operable to write at most a first constrained number of data segments in the common memory 2330 during a predefined time frame, the first constrained number being specific to each input port 2310. Likewise, each output port 2320 may be operable to read at most a second constrained number of selected data segments from the common memory 2330 during the predefined time frame, the second constrained number being specific to each output port 2320. However, the sum, over the M input ports 2310, of the first constrained number of data segments does not exceed a predefined upper bound and the sum, over the N output ports 2320, of the second constrained number of selected data segments does not exceed the predefined upper bound.

Burst-Switching Edge Node Comprising a Space Switch

Figure 24:
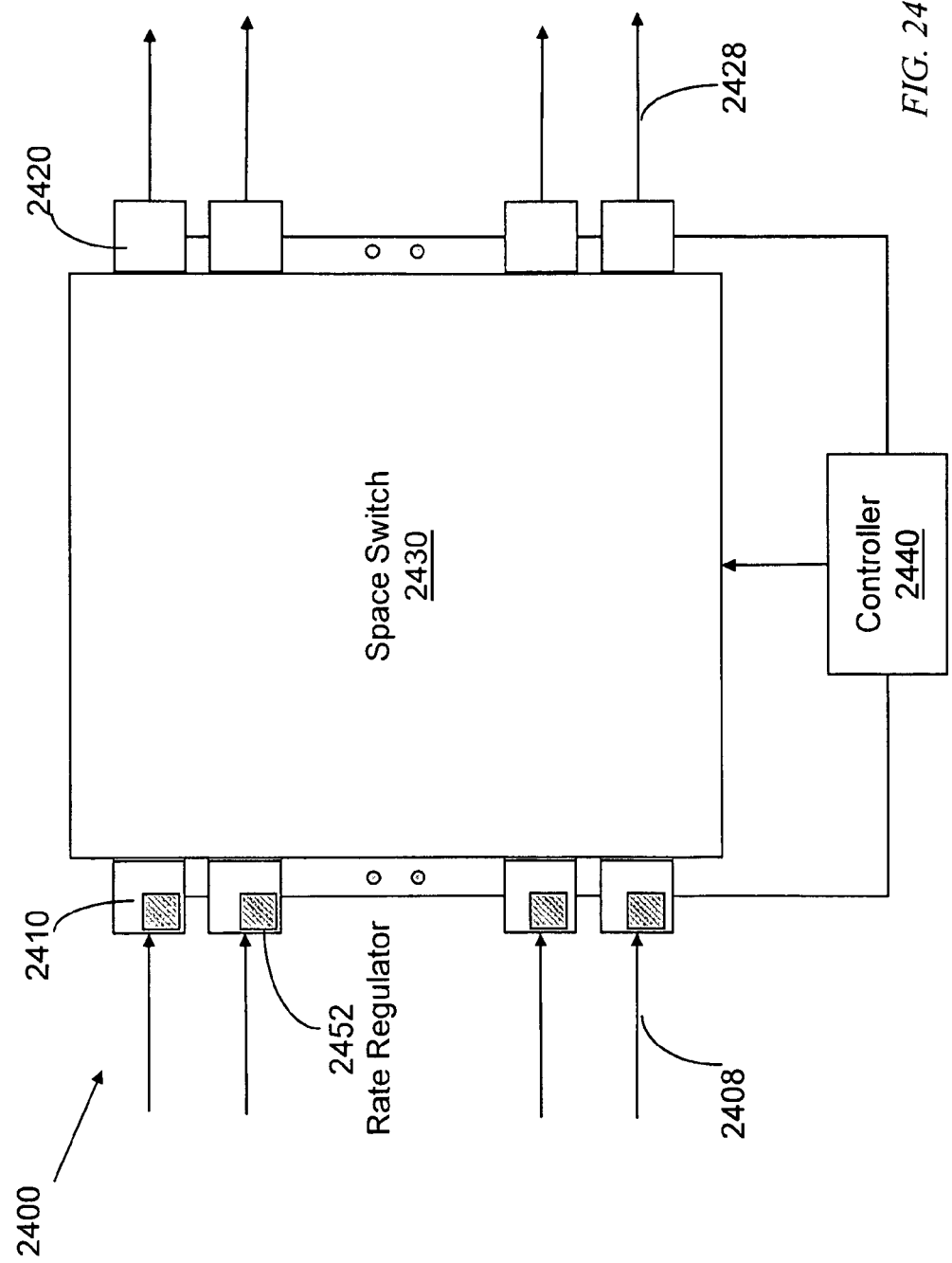
FIG. 24 illustrates an edge node comprising input ports and output ports interconnected through a space switch and communicating with an edge node controller, with each input port provided with a rate regulator based on information-flow-rate accounting, in accordance with an embodiment of the present invention.

FIG. 24 illustrates an edge node 2400 comprising input ports 2410 and output ports 2420 that interconnect through a space switch 2430 and communicate with an edge node controller 2440 that also controls the connectivity of the space switch 2430. Each input port 2410 receives variable size packets, as in the case of an input port 2310 (FIG. 23), and forms data segments that may also include null bits. The main difference in the data segment formation at an input port 2310 (FIG. 23) and a input port 2410 is that the size of the data segment in the former would be much larger than the size of a data segment in the latter. In the common-memory edge node 2300 of FIG. 23, a wide data memory is used and the data of a given data stream is organized in wide data segments to realize a capacity that is much higher than the capacity of a single port. In the edge node 2400, each of the individual N ports stores its data in an input buffer. Each input port 2410 has a controller (not illustrated) and a rate regulator 2452. In the common-memory edge node 2300 of FIG. 23, data is transferred from input to output in a cyclic manner and the switch 2330 is internally contention free. Unlike common memory edge node 2300, edge node 2400 requires a scheduling process for the transfer of data from input to output due to potential contention for an output port. The rate regulator 2452 determines the instants at which each segment of each data stream becomes eligible for transfer to a respective output. The input-port controller (not illustrated) transfers descriptors of the eligible data segments to the edge-node controller 2440 which computes schedules for the segments and sends the resulting schedules to respective input ports 2410. An input port may accumulate packets to form bursts, resulting in burst-formation delay. The formed bursts are then scheduled for transfer across the space switch 2430. To ensure an acceptable scheduling delay, an internal expansion is provided in the space switch 2330 in a manner well known in the art.

In an edge node having a multi-stage space switch, the packet transfer regulator is preferably provided at each input port of the edge node. Packet transfer across the space switch requires scheduling and, therefore, the transfer of packet pointers and descriptors to the packet transmitter is effected only after successful scheduling.

Figure 25:
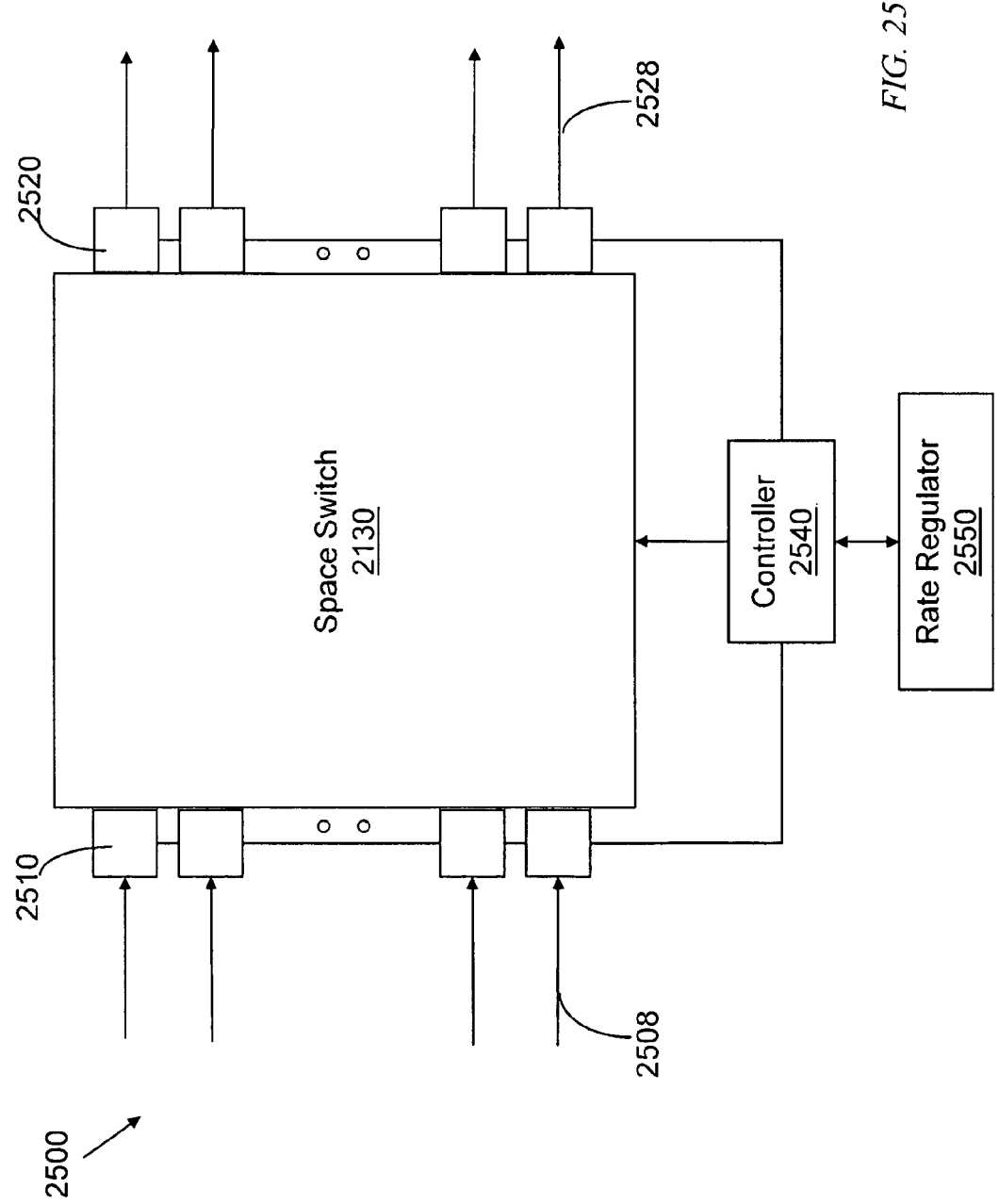
FIG. 25 illustrates an edge node similar to the edge node of FIG. 24 except that none of the input ports is provided with a rate regulator, and a shared rate-regulator is associated with the edge-node controller, in accordance with an embodiment of the present invention.

FIG. 25 illustrates an edge node 2500 having a similar structure to that of FIG. 24. The process of burst formation in edge node 2500 is, however, different from that of edge node 2400. Each input port 2510 transfers descriptors of all the packets it receives to an edge node controller 2540, which directs the requests to a common rate regular 2550. Rate regulator 2550 authorizes the scheduling of data segments, resulting from internal packet segmentation, based on actual information content. The rate regulator 2550 may comprise several modules, each module handling a subset of input ports 2510.

The edge nodes 2300, 2400 and 2500 depicted in FIGS. 23 through 25 preferably have an internal expansion sufficient to offset rounding waste and to avoid internal contention as described earlier. Internal expansion in a common-memory node 2300 implies that the rate of data transfer from the input ports to the common memory is higher than the rate of receiving data from data sources at the input ports. Internal expansion in edge nodes 2400 or 2500 implies that the space switch 2430 operate at a rate higher than that of an input port or an output port.

In review, an edge node receives packets of variable lengths each belonging to a data stream and places them in input buffers. Packets are aggregated into bursts and the edge node includes a scheduler to schedule the transfer of bursts from input ports to output ports. In one configuration, each input port includes a rate regulator which determines which of the waiting bursts is eligible for scheduling. Descriptors of the selected bursts, each descriptor including an output port and a burst length, are sent to the edge-node controller, and thence the edge-node scheduler. In another configuration, each input port sends descriptors of all its waiting bursts to the edge-node controller which determines the instants of time at which each packet is eligible for scheduling. In either configuration, the packet-transfer schedules are communicated to the input ports through internal signaling paths.

In the edge node 2400 and 2500 of FIGS. 24 and 25, bursts are sorted at each input port according to their designated output ports, and bursts directed to the same output port are concatenated and parsed at output. The required internal expansion to offset extreme segmentation waste is determined as $$E=D_1/\{D_1-(N_2-1)\times\delta\},$$

where $N_2$ is the number of output ports, $\delta$ is the time required to write and read a data segment in an input buffer, and $D_1$ is a permissible waiting time at an input buffer. Thus, an input buffer at each input port receives data from traffic sources at a rate $R_1$ and transmits data to space switch 2430 at a rate not exceeding $Q_1$ such that the ratio $Q_1/R_1$ equals or exceeds $1/\{1-(N_2-1)\times\delta/D_1\}$.

In an edge node 2400 (FIG. 24) or 2500 (FIG. 25), packets are sorted at each output port according to their originating input ports. An output buffer at each of the output ports receives data from space switch 2430 at a rate not exceeding $Q_2$ and transmits data to traffic sinks at a rate not exceeding $R_2$. To offset the segmentation waste under extreme spatial traffic distribution imbalance, the ratio $Q_2/R_2$ equals or exceeds $1/(1-(N_1-1)\times\delta^*/D_2)$, where $N_1$ is the number of said input ports, $\delta^*$ is the time required to write and read a data segment in an output buffer, and $D_2$ is the permissible waiting time in the output buffer. Normally, $\delta$ and $\delta^*$ are equal in the same switching node.

The required internal expansion is the larger of the ratio $Q_1/R_1$ and $Q_2/R_2$. With $N_1=N_2$ and $D_1=D_2$, the ratio $Q_2/R_2$ equals the ratio $Q_1/R_1$.

With N=512, and $\delta$=64 nanoseconds, for example, the required expansion to offset a worst-case queueing delay of 1 millisecond (D=1 millisecond), is approximately 0.033, and with a more stringent delay tolerance of 250 microseconds, the required expansion is about 0.13. Unlike the edge node 2300 of FIG. 23, the edge-nodes 2400 of FIGS. 24 and 2500 of FIG. 25 further require an additional expansion to offset the mismatch waste, and a total expansion of approximately 0.25 would be adequate.

The width $W_1$ of the input buffer is then determined as:

$$W_1 \geq (R_1 \times \delta)/(1-(N_2-1)\times\delta/D_1),$$

where $\delta$ is the time required to access the input buffer to write and read a data segment.

The width $W_2$ of the output buffer is determined as:

$$W_2 \geq (R_2 \times \delta)/(1-(N_1-1)\times\delta/D_2),$$

where $\delta$ is the time required to access the output buffer to write and read a data segment.

The common-memory switch 2300 of FIG. 23 has no internal contention. This valuable feature is realized at the expense of using large data segments which, in turn, results in a high segmentation waste. Switches 2400 and 2500 are based on time-shared space switches and may use data segments of relatively small sizes; hence the segmentation waste is relatively low. However, the contention loss (also called matching loss) can be relatively high. Thus, both the common-memory switch 2300 and the switch 2400 or 2500 based on time-shared space-switching fabrics may require a substantial internal expansion where the ratio of the capacity of an internal channel (not illustrated) between each port and the space-switching fabric to the capacity of an external channel 2408 or 2428 may be in the order of 1.2 or so.

Burst Transmission from Edge Nodes

Any of the switching nodes 2300, 2400, or 2500 of FIGS. 23, 24, and 25 may serve as an edge node of a burst-switching network. If a burst is transmitted from an edge node through an output port connecting to an external node having a receiving buffer, then the burst can be transmitted at any time after its formation at the output port of the edge node. However, if the output port connects to a bufferless external node, the timing of burst transmission from the output port of the edge node must be precisely selected so that the burst arrives at the bufferless external node exactly at an instant of time determined by a controller of the external node. The bufferless external node may receive bursts from several edge nodes and the received bursts must be switched across the switching fabric of the bufferless external node without collision.

Timing burst transmission is enabled by time locking an output port connecting to an external node by providing a time counter at the output port and a time counter at the external node and exchanging time-counter readings. A technique for time locking is described in applicant's U.S. application Ser. No. 09/286,431 titled "Self-Configuring Distributed Switch", filed on Apr. 6, 1999. The technique realizes time locking regardless of the propagation delay between the edge node and the external node.

Time locking may be desirable even if the external node has a receiving buffer.

Burst-Switching Network

A burst may be a packet of a large number of bits, 4000 bytes for example, or an aggregation of a large number of packets, with the latter being more likely. If the channel-switching cross-connectors, implicit in FIG. 2, are replaced by fast optical switches 312, as illustrated in FIG. 3, a finer granularity of the paths among the edge nodes 208 can be realized and the need for tandem switching at the electronic edge nodes 208 can be significantly reduced. Transferring individual packets of relatively small sizes through the fast switching core, however, may require an extensive scheduling effort. A practical alternative is to aggregate packets at a source edge node that are destined to the same sink edge node to form data bursts. Prior art burst-switching includes two techniques, illustrated in FIG. 26-A and FIG. 26-B. In the first technique, depicted in FIG. 26-A, an edge node 208 sends a request to a core node 312 for permission to transfer a data burst and waits until the permission is received. A reserved path remains idle until the edge node starts transmitting the burst. In the second technique, depicted in FIG. 26-B, an edge node 208 sends a burst descriptor to a core node 312, waits for a period of time to allow a controller of the core node 312 to schedule the transfer of the requested burst, then sends the data burst itself. Each edge node 208 would continually send such requests, and when the core node 312 fails to accommodate a forthcoming burst because of other requests competing for the same output port of the optical switch core node 312, the burst is simply dropped. Neither of the two techniques is suitable because the first technique may result in excessive delay and excessive idle time, and the second technique can result in excessive data loss.

Figure 27:
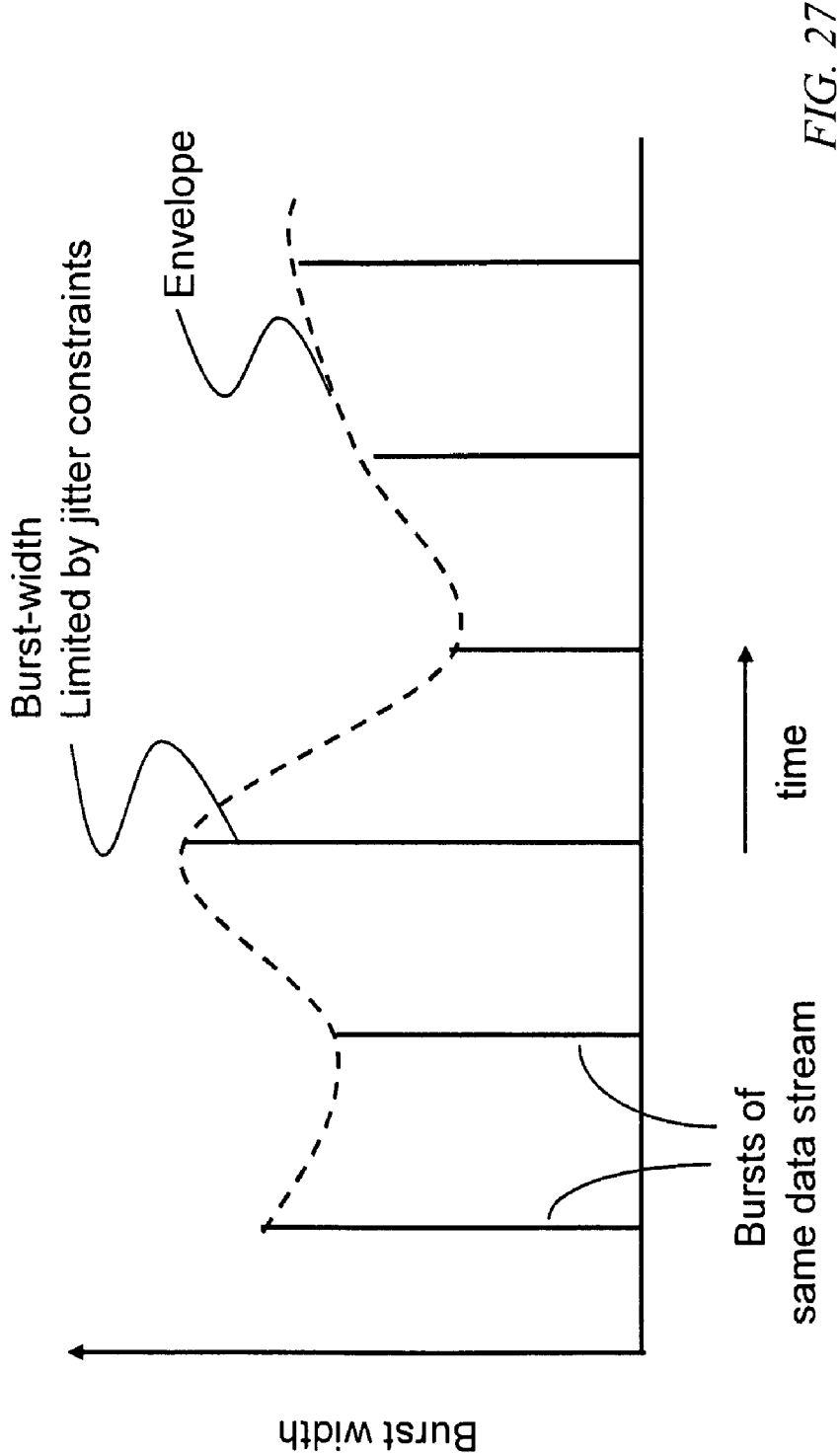
FIG. 27 illustrates a burst-width modulation system where the burst-size varies with the flow-rate variation of a data stream, according to an embodiment of the present invention.

FIG. 27 illustrates an underlying principle of the burst-switching method of the present invention where burst sizes are determined according to flow-rate allocations for each stream. In one approach, data bursts of time-varying lengths are generated at equally spaced instants of time in a given data stream. The burst-width variation, as illustrated by the indicated envelope of burst-width variation with time, reflects time-varying flow-rate allocations. In another approach, for a given stream, bursts of equal width are spaced at time-varying intervals according to time-varying flow-rate allocations. The two approaches are depicted in FIG. 28-A and FIG. 28-B. In FIG. 28-A a core node 312 that receives flow-rate allocations for a given stream transmits burst-transfer permits to the corresponding edge node 208 at equal intervals. The burst widths of successive permits may vary as illustrated. In FIG. 28-B, permits are granted at time-varying periods but the permitted burst sizes are equal. The two approaches are preferably combined in order to realize low delay.

Preferred Optical Core Node

Figure 29:
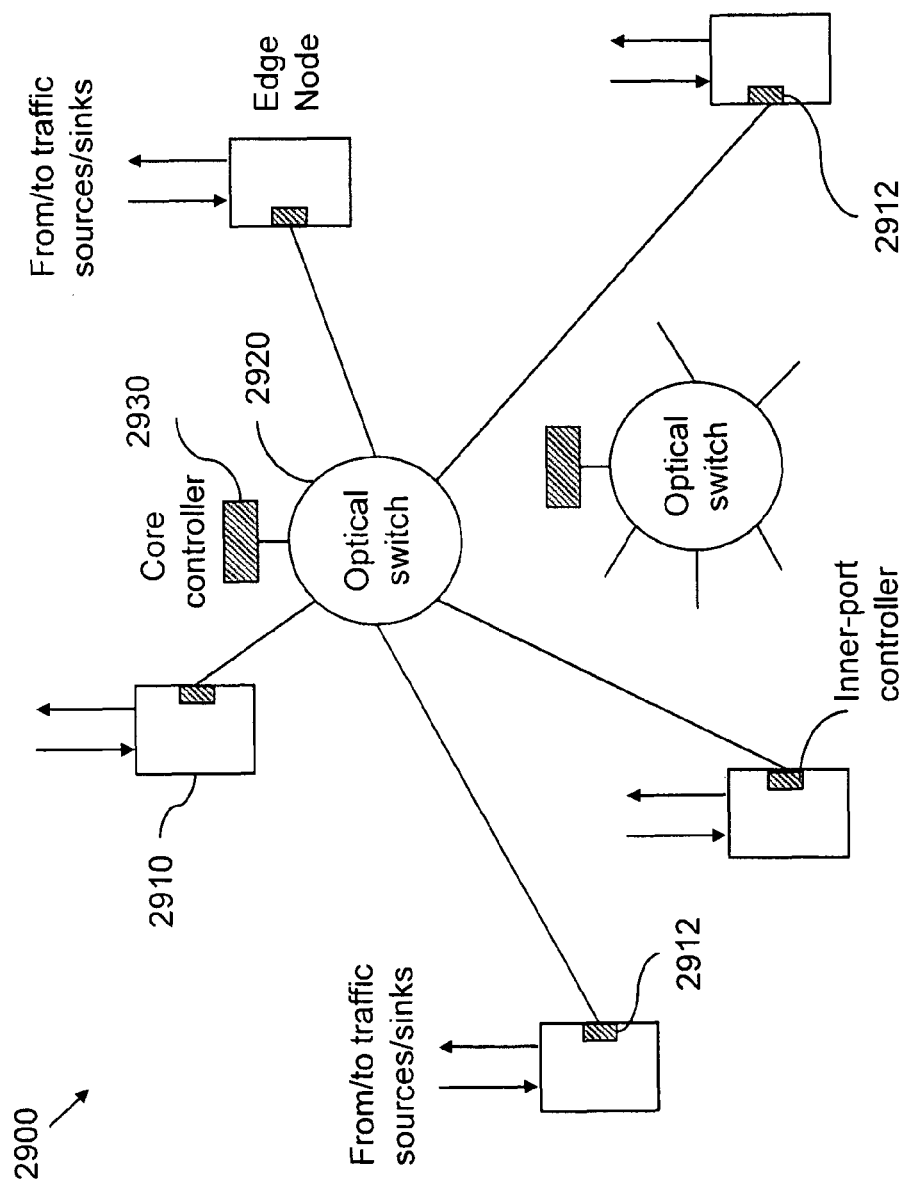
FIG. 29 illustrates a network having edge nodes and bufferless core nodes with rate regulators provided at each edge node, according to an embodiment of the present invention.

FIG. 29 illustrates a network 2900 of edge nodes 2910 interconnected by fast optical switches 2920. An edge node 2910 may transmit a stream of data bursts to another edge node 2910 through a selected one of the optical switches 2920. The data bursts are rate regulated so that, for each stream, the flow-rate allocation multiplied by the time interval between any two successive burst transmission instants equals the length of the second of the two successive bursts. In general, this condition can not be exactly realized for all streams and a small timing jitter may be tolerated.

Flow-rate control may be exercised at an inner port 2912 of an edge node 2910 or at a core controller 2930 depending on whether bursts are generated autonomously at the edge node or generated under control of the core controller. Recall that an inner port 2912 comprises an inbound port and an outbound port. A port controller (not illustrated) handles burst formation and communication with the core nodes 2920 or possibly with other edge nodes.

Two modes of burst-transfer control which avoid burst loss can be used. These are described in Applicant's U.S. patent application Ser. No. 09/750,071, filed on Dec. 29, 2000 and titled "Burst Switching in a High Capacity Network", and Ser. No. 10/054,509, filed on Nov. 13, 2001 and titled "Rate Regulated Burst Switching". In the first mode of burst-transfer control, packets are aggregated into data bursts at the output ports of the edge node 2910, a request to transfer each burst is sent to a selected optical switch 2920, and a burst is released at an instant of time determined by the selected optical switch 2920. In the second mode of burst-transfer control, a required flow-rate allocation for each data stream is determined by a source edge node 2910 and communicated to a selected optical switch 2920. If the required rate is accepted by a selected optical switch 2920, the selected optical switch 2920 computes a nominal burst length, schedules a stream of nominal bursts, and communicates the schedule to the source edge node 2910. At the source edge node 2910, the output ports leading to the selected optical switch 2920 aggregates packets into data bursts so that the length of each burst does not exceed the nominal burst size determined by the optical switch 2920. The assembled bursts are then transmitted at the instants of time indicated in the received schedule. The length of the assembled packets may be less than the nominal burst length and the difference is wasted. In either mode, packets received at the ingress ports of a source edge node 2910 are switched to outbound ports of the source edge node 2910 under rate regulation with rate regulators provided either at the input ports or at an inner-port controller of the source edge node 2910.

According to the first mode, burst-transfer requests are sent continually from a source edge node 2910 to an optical switch 2920, each request specifying a burst length and a desired destination. A controller 2930 of the core node 2920 schedules the transfer of bursts and communicates schedules to edge nodes 2910. A burst-transfer request may be scheduled for transfer from its source edge node 2910 at any future time. A request may specify a scheduling-delay tolerance beyond which the source edge node 2910 would cancel the request. For example, a request may indicate that a delay tolerance of 16 milliseconds is acceptable. A burst-transfer request is blocked only if the request specifies a delay limit.

According to the second mode, a source edge node 2910 only specifies flow-rates for each data stream defined according to a destination edge node 2910 and, possibly, a specific path to destination. The flow-rates may be adapted continuously to changing traffic condition at the source edge node 2910. The core node 2920 produces burst-transfer permits that are adapted to the changing flow-rate-allocation requests and sends the permits to respective source edge nodes 2910. Thus, the core node 2920 does not process individual burst-transfer requests.

The advantage of the first mode is that only bursts that are already received at edge nodes 2910 are scheduled, thus resulting in a negligible capacity waste. The disadvantage is that each burst is transferred after an overhead delay at least equal to the round-trip propagation delay between a source edge node 2910 and the selected core node 2910. The first mode is preferred when a source edge node 2910 is close to the core node 2920, for example within a round-trip propagation delay of less than one millisecond, corresponding to a one-way distance of about 100 kilometers, which covers most metropolitan areas.

The advantage of the second mode is a low delay, realized by the steady granting of burst-transfer permits. The disadvantage is that each permits specifies a nominal burst size and the source edge node 2910 may not have already received enough data to form a burst of the granted size. Thus, there may be a slight waste due to underutilized bursts. The second mode is preferred when the source edge node 2910 is distant from a core node 2920, incurring a round trip delay exceeding 1 millisecond, for example.

Burst Formation

If the edge node 2910 belongs to a network 2900 operating, at least partly, in a burst-switching mode, then at least one outbound port of edge node 2910 includes a burst-formation device wherein packets of the same stream can be aggregated into bursts that are transmitted without inter-packet gaps.

The burst-formation device in an outbound port aggregates a number of packets into an assembled burst having a size not exceeding a nominal burst size for a corresponding stream. In the first mode of burst transfer, the burst-formation device includes a burst-size calculator operable to compute a nominal burst size for each of said streams. In the second mode of burst transfer, the burst-formation device receives from a core node controller 2930 a nominal burst-size and a corresponding transmission schedule for each of said streams.

Packets received at each ingress port of an edge node are segmented into equal-size segments and some segments may be null-padded where necessary. Segments of packets that are destined to an egress port of the same edge node are switched directly to their egress ports and assembled into packets where any null-padding is removed. Segments of packets that are destined to other edge nodes are assembled at outbound ports into data bursts, where a data burst may contain several packets having the same destination sink node and are directed to inbound ports of other edge nodes. Thus, the inbound ports of an edge node receive data bursts. If the inbound port is required to transfer a burst to an outbound port towards a core node or another edge node, the burst is preferably transferred in its entirety to the outbound port. The burst may still be segmented to facilitate switching within the switching fabric of the edge node. A burst received at an inbound port may contain packets that are destined to several egress ports. Thus, when a burst received at an inbound port is directed to egress ports of the same edge node, the burst is disassembled into packets at the inbound port, then each packet is segmented and switched to its designated egress port.

Figure 30:
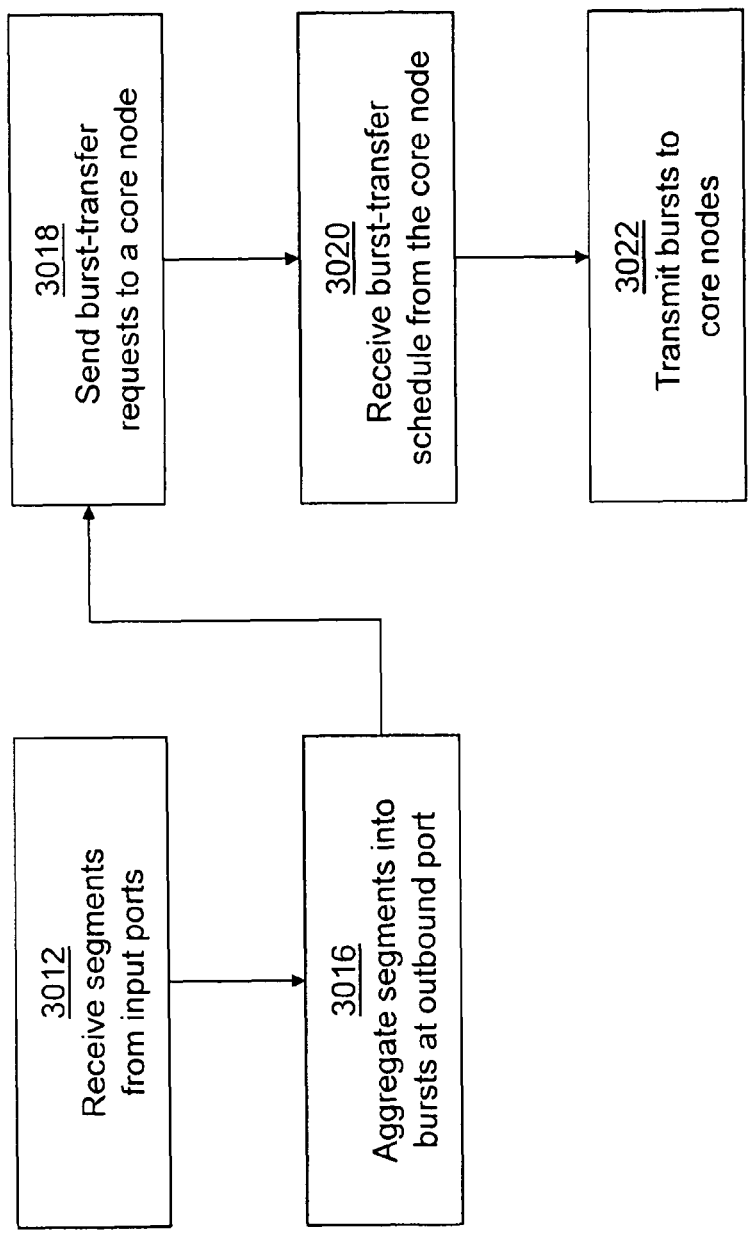
FIG. 30 is a flow chart of the main steps of burst formation at an outbound port of an edge node.

FIG. 30 is a flow chart illustrating the main steps of packet formation at an outbound port of an edge node. An outbound port receives data segments from ingress ports and from inbound ports through the switching fabric (step 3012). At the outbound port, data segments are assembled into bursts after removing any null padding (step 3016). Burst-transfer requests are then sent to a core-node controller (step 3018). The outbound port, receives burst-transfer schedules from the core node through either an associated inbound port or through an edge-node controller (step 3020). Subsequently, the outbound port, which is time-locked to the core node, transmits bursts according to schedule (3022).

Figure 31:
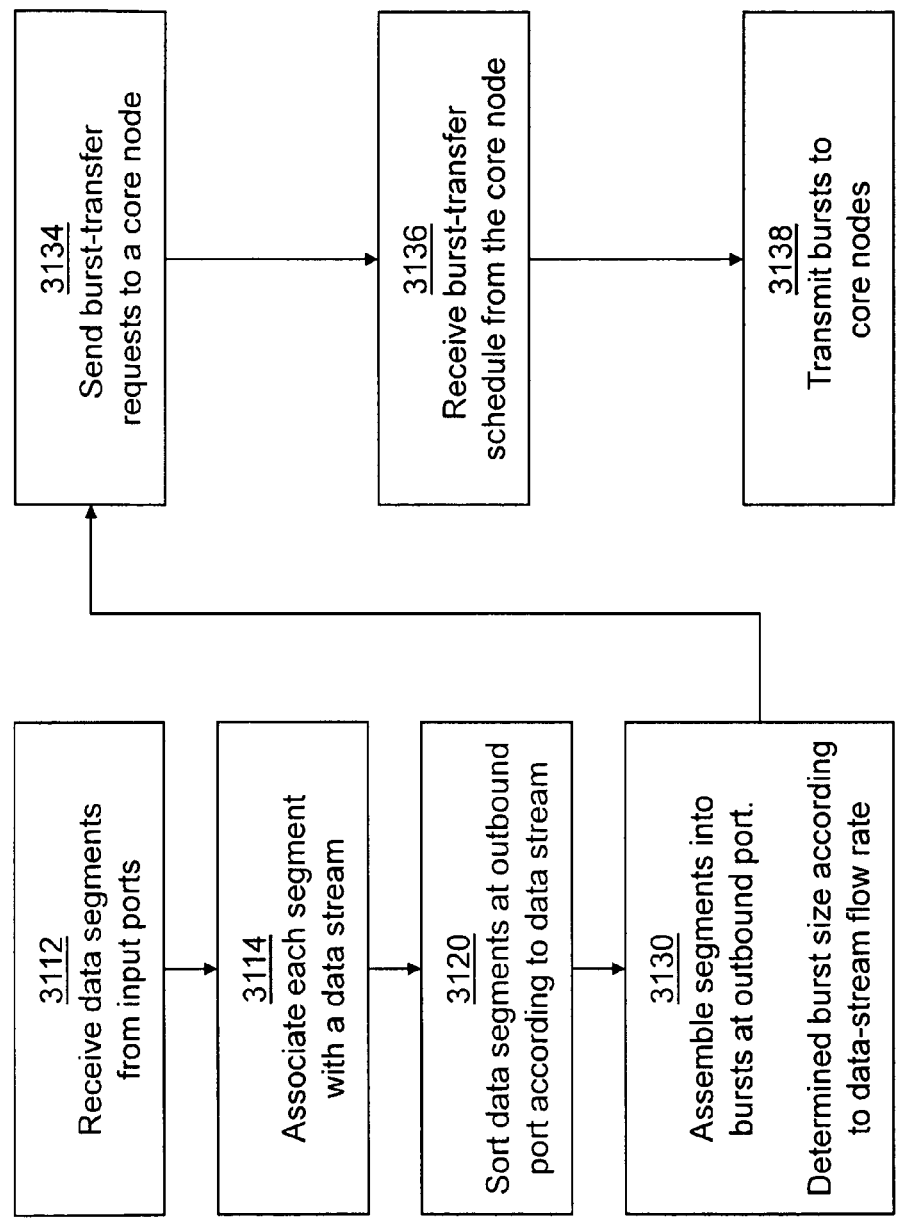
FIG. 31 is a flow chart of the main steps of burst formation at an outbound port of an edge node under flow-rate constraints, according to an embodiment of the present invention.

In a first mode of burst switching (FIG. 31), an outbound port receives data segments from ingress ports through the switching fabric (step 3112). The outbound port associates each data segment with a data stream (step 3114). At the outbound port, data segments are sorted according to their data-stream affiliation (step 3120), and the data bursts are assembled into data bursts that exclude null padding (step 3130). A nominal burst size is determined according to the flow-rate allocation for each data stream. The burst size corresponding to the flow rate may be read from a look-up table that is updated only when a flow-rate allocation changes. Assembled bursts are held in a burst buffer at the outbound port and, for each assembled burst, the outbound port sends a burst-transfer request to the core node to which it is connected (step 3134). The burst-transfer request includes the actual size of the burst assembled and its destination; an assembled burst of a given data stream may not equal the corresponding nominal burst size. Responsive to the burst-transfer request, the core node controller returns a burst-transfer schedule. The outbound port receives a burst transfer schedule, indicating a scheduled transfer time for each assembled burst for which a burst-transfer request was sent (step 3136) and transmits bursts according to schedule (step 3138). The outbound port may receive signals from a core node either through an inbound port associated with the outbound port, or through the controller of the edge node. Thus, the outbound port may transmit a continuous flow of burst-transfer requests and receive a continuous flow of scheduled transfer times from the core node. Each transfer time corresponds to the instant of time at which the core node must receive a corresponding burst. When the outbound port is time-locked to the core node, a signal transmitted at an instant of the local time of the outbound port, determined by a reading of a time counter located at the outbound port, arrives at the core node at the same instant of its local time, i.e., the reading of an identical time counter at the core node is equal to the reading of time counter of the outbound port. The process of acquiring and maintaining time locking is described in applicant's U.S. patent application Ser. No. 09/286,431, filed on Apr. 6, 1999, and Ser. No.10/054,509, filed on Nov. 13, 2001.

Figure 32:
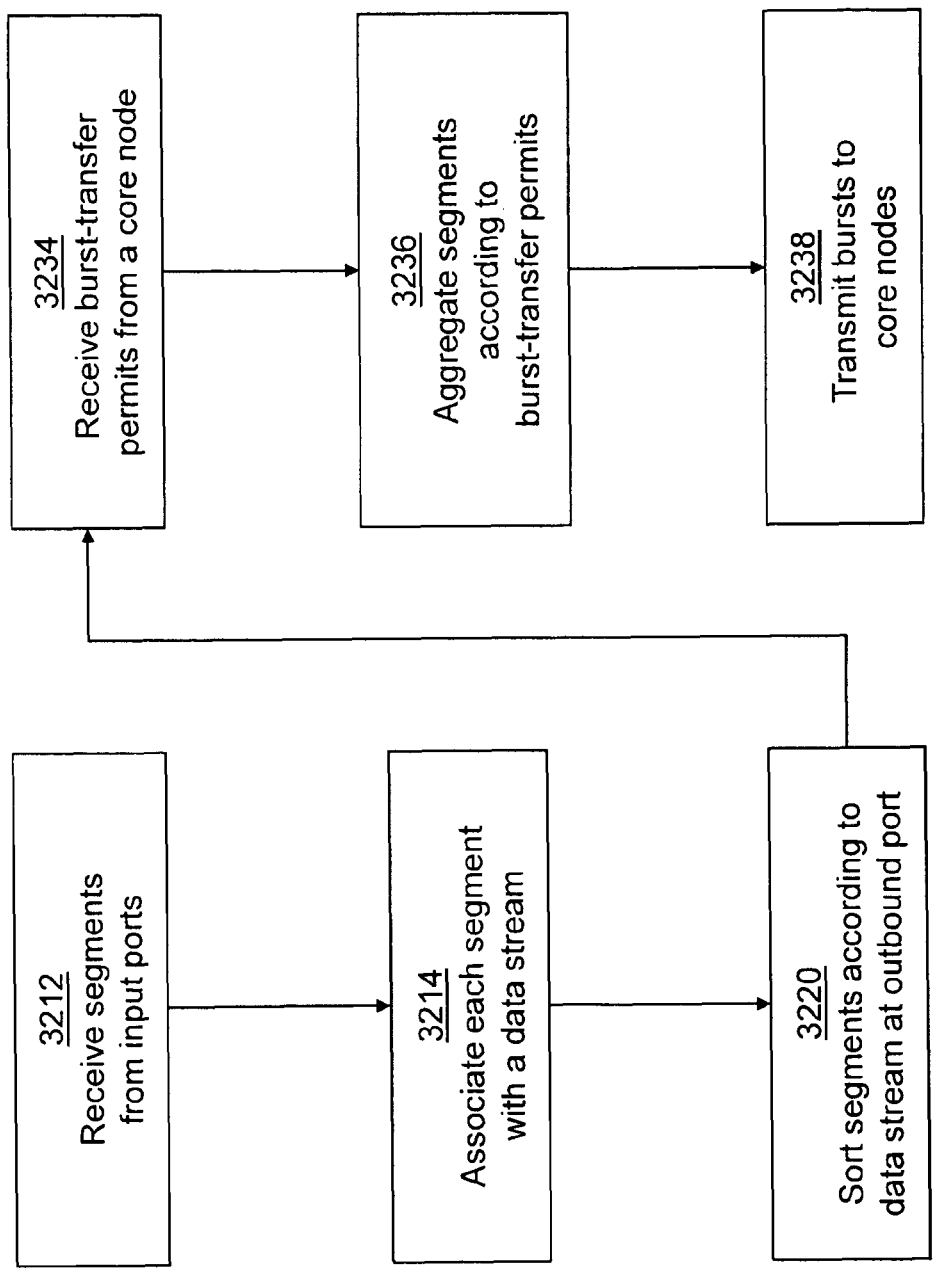
FIG. 32 is a flow chart of the main steps of burst formation at an outbound port of an edge node under flow-rate constraints where burst descriptors are generated at a controller of a core node, according to an embodiment of the present invention.

In a second mode of burst switching (FIG. 32), an outbound port receives data segments from ingress ports through the switching fabric (step 3212). Each data segment may have an identifier of a data stream to which it belongs. At the outbound port, each data segment is associated with a data stream (step 3214) and the data segments are sorted according to their data-stream affiliation (step 3220). The outbound port receives, from the core node to which it is connected, burst-transfer permits for each data stream having non-zero flow-rate allocation (step 3234). A burst-transfer permit contains a nominal burst size and an instant of time, specified as a reading of a time-counter located at the core node, at which a burst having a size not exceeding the specified nominal burst size, should be received at the core node. The data segments held in the data buffer are then assembled into bursts according to the burst-transfer permits received (step 3236) and transmits the assembled bursts according to the received schedule (step 3238). The burst size is determined by the core node according to the flow-rate allocation for the data stream. The burst size corresponding to the flow rate may be read from a look-up table that is updated only when a flow-rate allocation changes. Thus, the outbound port may transmit a flow-rate-allocation request for a data stream and receive a continuous flow of burst-transfer permits from the core node.

It is noted that schedules computed at the core-node controller correspond to the nominal burst sizes and not the actual burst sizes. An actual burst size may be less than the nominal burst size.

The invention thus provides methods and apparatus for controlling the transfer of data bursts of variable sizes so that data bursts traversing a network path from a source node to a sink node are constrained by an allocated flow rate. While data bursts are segmented and, where necessary, null-padded to facilitate switching at edge nodes, the data bursts are transferred across a network in their native form and rate regulated as such. The methods and apparatus further enable the construction of a flow-rate-regulated burst-switching node based on a common-memory or a time-shared space switch that can serve as an edge node in an optical-core burst-switching network.

Other modifications will be apparent to those skilled in the art and, therefore, the invention is defined in the claims.

What is claimed is:

1. A method of burst switching comprising:
   receiving at a core controller of a fast-switching optical core node, connecting to a plurality of edge nodes, flow-rate requirements for a set of data streams, each data stream defined by a source edge node and a destination edge node;
   determining, for said each data stream, a respective burst size;
   determining, for said each data stream, a respective inter-burst interval;
   presenting said respective burst size and said respective inter-burst interval to a scheduler for determining instants of time at which bursts belonging to said each data stream are to be received at the optical core node;
   communicating indications of said respective burst size and said instants of time to a source edge node of said each data stream;
   receiving, at each edge node, data packets of arbitrary sizes from respective data sources;
   associating each data packet with a data stream from among a number S, S>1, of predefined data streams;
   segmenting each data packet into data segments each of a predefined maximum size;
   storing said data segments and respective sizes into a data memory organized into K memory segments, K>S, each for storing a data segment; and
   storing in at least one control memory:
      two stream-tracking arrays each having S entries and indicating an address in said data memory of a front data segment and a last data segment belonging to each of said S data streams;
      a linkage array having K entries indicating addresses in said data memory of intervening data segments for each data stream; and
      an occupancy tracking array indicating unused segments of said data memory.

2. The method of claim 1 further comprising:
receiving at said core controller a reading of an edge time counter coupled to an edge controller of a respective edge node from among said plurality of edge nodes;
transmitting to said edge controller a corresponding reading of a core time counter coupled to said core controller; and
determining, that said edge controller is time locked to said core controller when said reading of said edge time counter equals said corresponding reading of a core time counter.

3. The method of claim 1 wherein said respective burst size equals a predefined value for said each data stream and said respective inter-burst interval equals said predefined value divided by said a flow-rate requirement of said each data stream.

4. The method of claim 1 wherein said respective burst size is proportional to a flow-rate requirement of said each data stream so that said respective inter-burst interval is constant for said bursts belonging to said each data stream.

5. The method of claim 1 further comprising allowing a guard time, at least equal to switching latency of said optical core node, between said successive bursts.

6. The method of claim 1 further comprising imposing a lower bound, exceeding switching latency of said optical core node, on said respective burst size.

7. The method of claim 1 further comprising imposing a first upper bound on said respective burst size and imposing a second upper bound on said inter-burst interval.

8. The method of claim 2 further comprising an edge controller of each edge node of said plurality of edge nodes exchanging time-counter reading with said core controller in order to maintain time locking of said each edge node to said core controller.

9. The method of claim 1 further comprising each edge node of said plurality of edge nodes:
defining a subset of data streams emanating from said each edge node;
receiving data packets of arbitrary sizes from respective data sources;
associating each data packet with a data stream from among said subset of data streams;
determining flow-rate requirements for said subset of data streams;
communicating said flow-rate requirements for said subset of data streams to said core controller;
receiving from said core controller indications of a permissible burst size and scheduled instants of time for receiving bursts belonging to each data stream of said subset of data streams;
aggregating data packets of said each data stream of said subset of data streams into bursts constrained by said permissible burst size; and
transmitting said bursts to said optical core node at said scheduled instants of time.

10. The method of claim 1 further comprising:
padding an incomplete last segment of a packet with null bits; and
selecting said data memory so that a ratio of said predefined maximum size to the time required to write and read a data segment exceeds the combined flow rate allocations of said S data streams by an amount sufficient to offset segmentation waste caused by said null bits.

11. The method of claim 1 further comprising:
selecting said respective inter-burst interval to equal a same fixed interval for said each data stream; and
determining said respective burst size according to said fixed interval and a flow-rate requirement corresponding to said each data stream.

\* \* \* \* \*